US011412482B2

United States Patent
Jo et al.

(10) Patent No.: US 11,412,482 B2
(45) Date of Patent: Aug. 9, 2022

(54) METHOD OF OPERATING NODE IN WIRELESS COMMUNICATION SYSTEM AND DEVICE USING THE SAME

(71) Applicant: LG Electronics Inc., Seoul (KR)

(72) Inventors: Soonki Jo, Seoul (KR); Huayue Song, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/639,030

(22) PCT Filed: Aug. 7, 2019

(86) PCT No.: PCT/KR2019/009916
§ 371 (c)(1),
(2) Date: Feb. 13, 2020

(87) PCT Pub. No.: WO2020/032594
PCT Pub. Date: Feb. 13, 2020

(65) Prior Publication Data
US 2021/0368481 A1 Nov. 25, 2021

(30) Foreign Application Priority Data

Aug. 7, 2018 (KR) .......... 10-2018-0091860
Nov. 2, 2018 (KR) .......... 10-2018-0133776

(51) Int. Cl.
*H04W 72/04* (2009.01)
(52) U.S. Cl.
CPC ......... *H04W 72/04* (2013.01); *H04W 72/042* (2013.01); *H04W 72/0413* (2013.01); *H04W 72/0426* (2013.01)
(58) Field of Classification Search
CPC ............. H04W 72/0413; H04W 72/04; H04W 72/042; H04W 72/0426; H04W 72/0433
See application file for complete search history.

(56) References Cited

U.S. PATENT DOCUMENTS

2002/0061025 A1* 5/2002 Masunaga ......... H04L 12/40091
370/402
2002/0181419 A1* 12/2002 Zhang ..................... H04L 29/06
370/331
(Continued)

FOREIGN PATENT DOCUMENTS

EP 3301874 4/2018
EP 3648529 5/2020
(Continued)

OTHER PUBLICATIONS

LG Electronics, "Discussions on NR IAB support", R1-1806649, 3GPP TSG RAN WG1 Meeting #93, Busan, Korea, May 21-25, 2018, 12 pages.
(Continued)

*Primary Examiner* — Raj Jain
(74) *Attorney, Agent, or Firm* — Fish & Richardson P.C.

(57) ABSTRACT

Provided are a method of operating a node in a wireless communication system and a device using the same. The method includes: connecting to a parent node through an initial access process; receiving, from the parent node, first allocation information related with communication with the parent node and second allocation information related with communication with a child node; and communicating with the parent node or the child node using a specific resource based on the first allocation information and the second allocation information. When the second allocation information indicates the specific resource as a hard resource that is always available for communication with the child node, the specific resource is used for communication with the child node regardless of the first allocation information.

13 Claims, 31 Drawing Sheets

(56) References Cited

U.S. PATENT DOCUMENTS

| | | | |
|---|---|---|---|
| 2007/0155390 | A1 | 7/2007 | Kodikara Patabandi et al. |
| 2010/0142497 | A1* | 6/2010 | Kim ................. H04W 72/0406 |
| | | | 370/337 |
| 2016/0150526 | A1* | 5/2016 | Koudouridis ..... H04W 72/0413 |
| | | | 370/329 |
| 2018/0092139 | A1 | 3/2018 | Novlan et al. |
| 2018/0192412 | A1 | 7/2018 | Novlan et al. |
| 2021/0153189 | A1* | 5/2021 | Jo ........................ H04W 74/08 |

FOREIGN PATENT DOCUMENTS

| | | |
|---|---|---|
| EP | 3672343 | 6/2020 |
| KR | 1020140077327 | 6/2014 |
| KR | 20140129911 | 11/2014 |
| WO | WO2018084952 | 5/2018 |
| WO | WO2020145556 | 7/2020 |
| WO | WO2020205607 | 10/2020 |

OTHER PUBLICATIONS

ZTE, "Discussion on IAB node initial access process", R1-1806026, 3GPP TSG RAN WG1 Meeting #93, Busan, Korea, May 21-25, 2018, 10 pages.

ZTE, "Overview of physical layer enhancements for IAB", R1-1806024, 3GPP TSG RAN WG1 Meeting #93, Busan, Korean, May 21-25, 2018, 9 pages.

EP Office Action in European Appln. No. 19842771.8, dated Apr. 16, 2021, 4 pages.

European Extended Search Report in European Patent Appln. No. 19842771.8, dated Oct. 15, 2020, 6 pages.

Huawei, HiSilicon, "Physical layer enhancement on IAB," R1-1803695, 3GPP TSG RAN WG1 Meeting #92bis, Sanya, China,, Apr. 16-20, 2018, 6 pages.

Qualcomm Incorporated, "IAB resource partitioning for architecture group 1," R2-1808006, 3GPP TSG RAN WG2 Meeting #102, Busan, South Korea, May 21-25, 2018, 3 pages.

Qualcomm Incorporated, "Resource Coordination across IAB Topology," R2-1808007, 3GPP TSG-RAN WG2 Meeting #102, Busan, South Korea, May 21-25, 2018, 6 pages.

Vivo, "Discussion on IAB node access and resource allocation," R2-1809864, 3GPP TSG-RAN WG2 NR AH1807 Meeting, Montreal, Canada, Jul. 2-6, 2018, 3 pages.

Qualcomm Incorporated, "IAB topology adaptation for architecture group 1," R3-183731, 3GPP TSG-RAN WG3 Meeting #AH1807, Montreal, Canada, Jul. 2-6, 2018, 8 pages.

Ericsson, "Updated summary of 7.2.3.1 Enhancements to support NR backhaul links," R1-1812042, 3GPP TSG RAN WG1 Meeting #94bis, Chengdu, China, Oct. 8-12, 2018, 22 pages.

Korean Notice of Allowance in Korean Patent Appln. No. 10-2019-0096341, dated Aug. 28, 2020, 6 pages (with English translation).

* cited by examiner

FIG. 23

| MT-ASPECT RESOURCE TYPE | D (MT-D) | U (MT-U) | F (MT-F) |

(a)

| DU-ASPECT RESOURCE TYPE | H-D | H-U | H-F | N/A |
| | S-D | S-U | S-F | |

(b)

METHOD OF OPERATING NODE IN WIRELESS COMMUNICATION SYSTEM AND DEVICE USING THE SAME

CROSS-REFERENCE TO RELATED APPLICATIONS

This application is a National Stage application under 35 U.S.C. § 371 of International Application No. PCT/KR2019/009916, filed on Aug. 7, 2019, which claims the benefit of Korean Patent Applications No. 10-2018-0091860, filed on Aug. 7, 2018 and No. 10-2018-0133776, filed on Nov. 2, 2018. The disclosures of the prior applications are incorporated by reference in their entirety.

BACKGROUND OF THE DISCLOSURE

Field of the Disclosure

The present disclosure relates to wireless communication and, more particularly, to a node operation method in a wireless communication system and an apparatus using the method.

Related Art

As communication devices have increasingly required greater communication capacity, the necessity for improved mobile broadband communication, relative to an existing radio access technology (RAT), has emerged. Also, massive machine type communications (MTC), which provides many different services by connecting multiple devices and objects, is also one of the major issues to be considered in next generation communications.

In addition, communication system design considering services/terminals sensitive to reliability and latency is also under discussion. Thus, the introduction of next-generation radio access technology considering enhanced mobile broadband (eMBB) communication, massive MTC, ultra-reliable and low latency communication (URLLC), and the like is being discussed. In the present disclosure, for simplicity, this technology will be referred to as new RAT or NR. The NR is also referred to as a fifth generation (5G) system.

The next-generation wireless communication system such as NR may introduce Bandwidth Part (BWP). The BWP may be used by a broadband wireless communication system to allocate part of bandwidth to terminals having difficulty in using the broadband.

Meanwhile, NR may use broader bandwidth than the Long Term Evolution (LTE) and also use massive Multi-Input Multi-Output (MIMO), multi-beams.

Meanwhile, the NR requires higher data rates and capacity, and thereby, the introduction of integrated access and backhaul (IAB) is under consideration. Here, the access may mean, for example, base station-terminal, and the backhaul may mean, for example, base station-base station or base station-core network. The NR may use different radio resources/radio channels for the access and the backhaul, but is also considering using the same radio resource and/or radio channel. For example, a radio resource and a radio channel used by a first base station to serve a terminal connected through an access link may also be used for a backhaul link between the first base station and a second base station.

Here, terms such as a base station and terminal are used for the purpose of convenience and may be replaced with another term such as a node. For example, suppose the second base station controls/schedules a terminal connected to the first base station through an access link via a backhaul link to the first base station. In this case, the second base station may be referred to as a parent node or donor node from the viewpoint of the first base station while the terminal may be referred to as a child node. And the first base station may also be referred to as a relay node or IAB node.

In an IAB environment, the IAB node may operate like a mobile terminal (MT) in the relationship with the parent node, and may operate like a distributed unit (DU), that is, a base station, in the relationship with the child node. In this regard, resource allocation to the IAB node may also be given as MT-aspect resource allocation and DU-aspect resource allocation.

In the IAB environment, it is required to specify how to determine a way of using the resource.

SUMMARY OF THE DISCLOSURE

An object of the present disclosure is to provide a node operation method in a wireless communication system and an apparatus using the method.

In one aspect, provided is a method of operating a node in a wireless communication system. The method includes connecting to a parent node through an initial access process, receiving, from the parent node, first allocation information associated with communication with the parent node and second allocation information associated with communication with a child node and communicating with the parent node or the child node using a specific resource based on the first allocation information and the second allocation information. When the second allocation information informs the specific resource as a hard resource that is always available for communication with the child node, the specific resource is used for communication with the child node regardless of the first allocation information.

A transmission direction in the specific resource may be determined based on both the first allocation information and the second allocation information.

The first allocation information may indicate the specific resource as one of three types of resources, and the second allocation information indicates the specific resource as one of seven types of resources.

The first allocation information may indicate the specific resource as one of a downlink type, an uplink type, and a flexible type.

The second allocation information may indicate the specific resource as one of a hard downlink type, a soft downlink type, a hard uplink type, a soft uplink type, a hard flexible type, a soft flexible type, and a not-available type.

The hard downlink type may indicate that the specific resource is a resource that is always available for the node to transmit a signal to the child node, and the soft downlink type indicates that the specific resource is a resource for the node to be controlled by the parent node in transmitting a signal to the child node.

When the second allocation information indicates the specific resource as the hard downlink type, although the first allocation information indicates the specific resource as a downlink or uplink resource, the specific resource may be usable to transmit a signal to the chide node.

The hard uplink type may indicate that the specific resource is a resource that is always available for the node to receive a signal from the child node, and the soft uplink type may indicate that the specific resource is a resource for the node to be controlled by the parent node in receiving a signal from the child node.

When the second allocation information indicates the specific resource as the hard uplink type, although the first allocation information indicates the specific resource as a downlink or uplink resource, the specific resource may be usable to receive a signal from the chide node.

The hard flexible type may indicate that the specific resource is a resource that is always flexible in a relationship between the node and the child node, and the soft flexible type may indicate that the specific resource is a resource that is controlled by the parent node as to whether or not the specific resource is a flexible resource in the relationship between the node and the child node.

The not-available type may indicate that the specific resource is a resource that is not available in a relationship between the node and the child node.

When the second allocation information indicates the specific resource as a soft downlink, soft uplink, or soft flexible resource, if the specific resource is allocated to the node based on the first allocation information, the specific resource may be considered as being used for communication with the parent node.

When the second allocation information indicates the specific resource as a soft downlink, soft uplink, or soft flexible resource, if the specific resource is not allocated to the node based on the first allocation information, the specific resource may be considered as being used for communication with the child node.

In another aspect, provided is a node. The node includes a transceiver transmitting and receiving a wireless signal and a processor operating in conjunction with the transceiver. The processor connects to a parent node through an initial access process, receives, from the parent node, first allocation information associated with communication with the parent node and second allocation information associated with communication with a child node and communicates with the parent node or the child node using a specific resource based on the first allocation information and the second allocation information. When the second allocation information indicates the specific resource as a hard resource that is always available for communication with the child node, the specific resource is used for communication with the child node regardless of the first allocation information.

In still another aspect, provided is a processor. The processor controlling a wireless device to: connect to a parent node through an initial access process, receive, from the parent node, first allocation information associated with communication with the parent node and second allocation information associated with communication with a child node and communicate with the parent node or the child node using a specific resource based on the first allocation information and the second allocation information. When the second allocation information indicates the specific resource as a hard resource that is always available for communication with the child node, the specific resource is used for communication with the child node regardless of the first allocation information.

According to the present disclosure, it is possible to very flexibly change/determine a direction of transmission from the resource in consideration of both the backhaul link and the access link, and thereby, scheduling flexibility is high. In addition, even when the resource allocation for the access link and the resource allocation for the backhaul link for a specific resource do not indicate the same resource direction or resource type, it is possible to use the specific resource without ambiguity.

BRIEF DESCRIPTION OF THE DRAWINGS

FIG. 23 illustrates resource types included in the MT-aspect D/U allocation and the DU-aspect D/U allocation that the IAB node gets.

DESCRIPTION OF EXEMPLARY EMBODIMENTS

Figure 1:
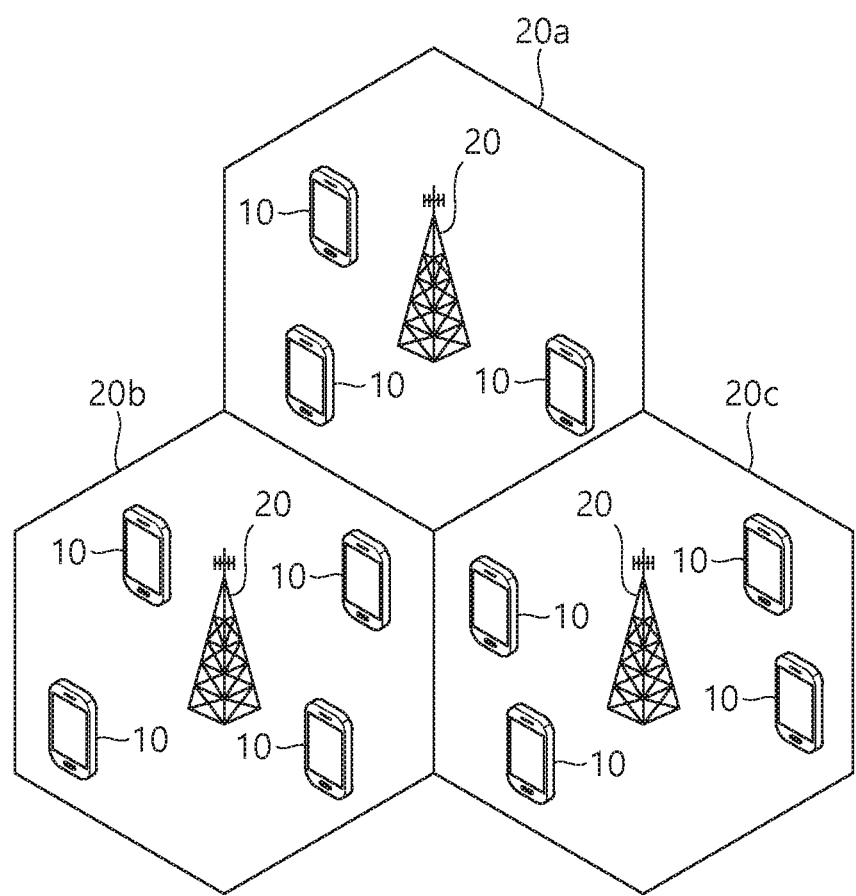
FIG. 1 shows a conventional wireless communication system.

FIG. 1 shows a conventional wireless communication system. The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Existing wireless communication systems may be replaced or coexist with systems using new radio access technology (new RAT) or new radio (NR) systems. Hereinafter, the NR system will be described.

As much more communication devices require greater communication capacity, there is a need for mobile broadband communication enhanced over existing radio access technology (RAT). Massive machine-type communications (MTC), which provides a variety of services anywhere and anytime by connecting multiple devices and objects, is also one of the main issues to be considered for next-generation communication. In addition, communication system design considering services/terminals sensitive to reliability and latency is under discussion. Thus, the introduction of next-generation radio access technology considering enhanced mobile broadband communication, massive MTC, ultra-reliable and low latency communication (URLLC), and the like is being discussed. In the present disclosure, for simplicity, this technology will be referred to as new RAT or NR.

Figure 2:
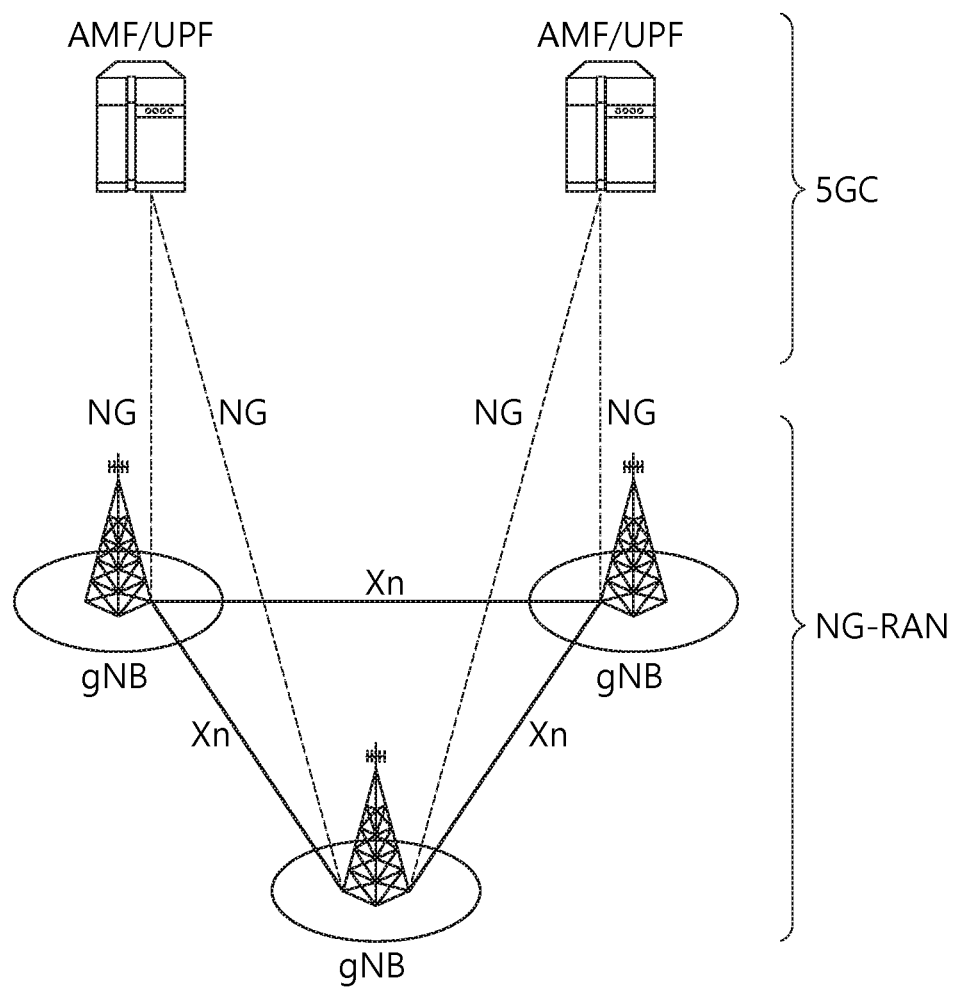
FIG. 2 illustrates a system structure of a next generation radio access network (NG-RAN) to which NR is applied.

FIG. 2 illustrates a system structure of a new generation radio access network (NG-RAN) to which the NR is applied.

Figure 4:
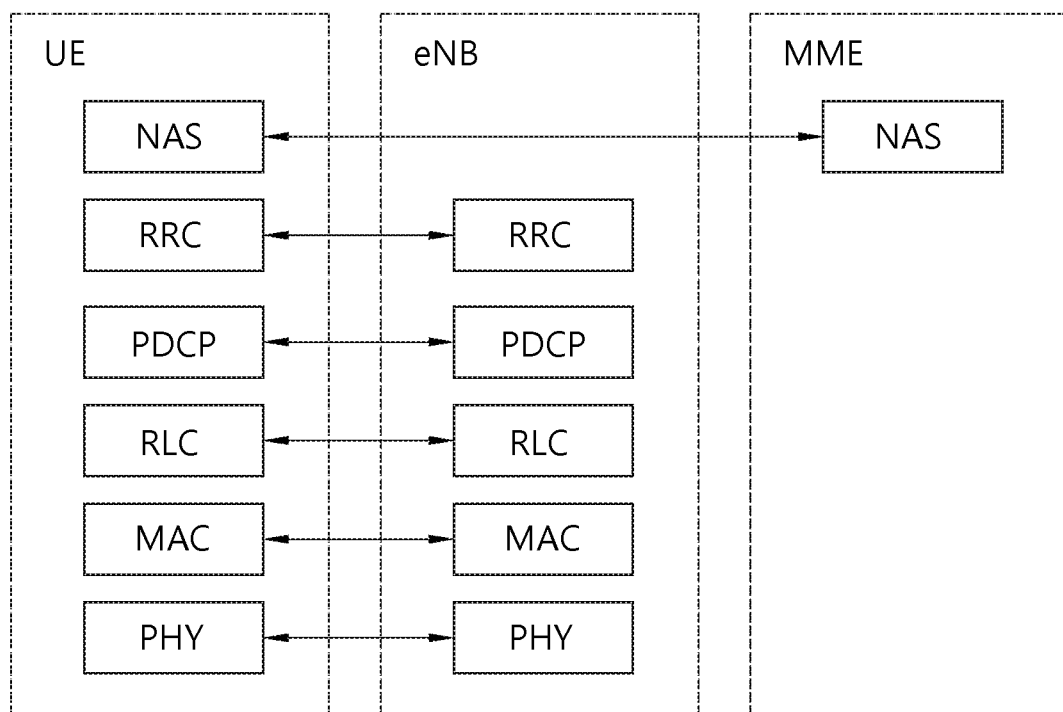
FIG. 4 is a diagram showing a radio protocol architecture for a control plane.

Referring to FIG. 2, the NG-RAN may include a gNB and/or an eNB providing user plane and control plane protocol termination to a UE. FIG. 4 illustrates a case where only the gNB is included. The gNB and the eNB are connected to each other by an Xn interface. The gNB and eNB are connected to a 5G core network (5GC) via an NG interface. More specifically, the gNB and the eNB are connected to an access and mobility management functions (AMF) via an NG-C interface, and connected to a user plane function (UPF) via an NG-U interface.

The gNB may provide functionality such as inter-cell radio resource management (RRM), radio bearer (RB) control, connection mobility control, radio admission control, measurement configuration & provision, and dynamic resource allocation, and the like. The AMF may provide functionality such as non-access stratum (NAS) security and idle state mobility handling. The UPF may provide functionality such as mobility anchoring and protocol data unit (PDU) processing.

Figure 3:
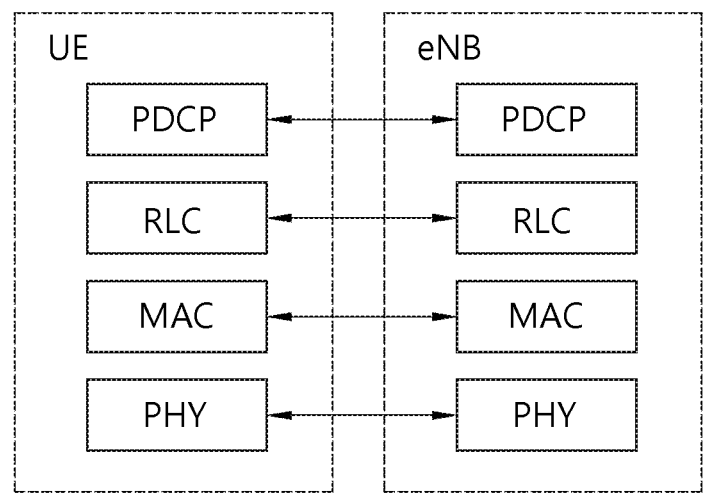
FIG. 3 is a diagram showing a radio protocol architecture for a user plane.

FIG. 3 is a diagram showing a radio protocol architecture for a user plane. FIG. 4 is a diagram showing a radio protocol architecture for a control plane. The user plane is a protocol stack for user data transmission. The control plane is a protocol stack for control signal transmission.

Referring to FIGS. 3 and 4, a PHY layer provides a higher layer with an information transfer service through a physical channel. The PHY layer is connected to a medium access control (MAC) layer which is a higher layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Figure 5:
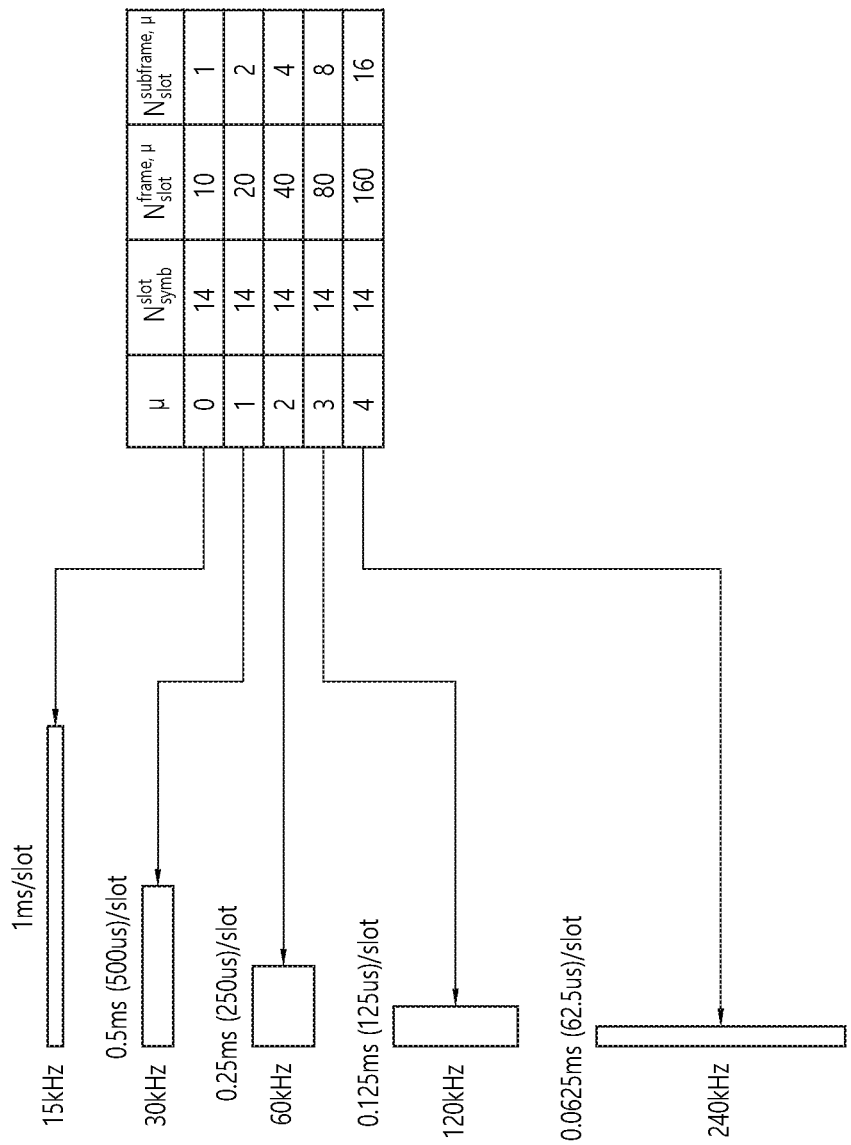
FIG. 5 illustrates a frame structure that may be applied in NR.

FIG. 5 illustrates a frame structure that may be applied in NR.

Referring to FIG. 5, a frame may be composed of 10 milliseconds (ms) and include 10 subframes each composed of 1 ms. Various fields in the time domain may be represented by the time unit $T_c = 1/(\Delta f_{max} \cdot N_f)$, where $\Delta f_{max} = 480 \times 10^3$ Hz, and $N_f = 4096$.

A carrier component may have one set of frames in the uplink and another set of frames in the downlink. Transmission of an uplink frame i may be started before the start of the corresponding downlink frame i by $T_{TA} = (N_{TA} + N_{TA,offset}) T_c$.

One or a plurality of slots may be included in a subframe according to subcarrier spacings.

The following table illustrates a subcarrier spacing configuration $\mu$.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Extended |
| 4 | 240 | normal |

The table 2-1 below shows the number of slots within a frame $N_{slot}^{frame,\mu}$, number of slots within a subframe $N_{slot}^{subframe,\mu}$, and number of symbols within a slot $N_{symb}^{slot}$ according to the subcarrier spacing configuration in the case of normal Cyclic Prefix (CP). The table 2-2 below shows the number of slots within a frame $N_{slot}^{frame,\mu}$, number of slots within a subframe $N_{slot}^{subframe,\mu}$, and number of symbols within a slot $N_{symb}^{slot}$ according to the subcarrier spacing configuration $\mu$ in the case of extended CP.

TABLE 2-1

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2-2

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

In FIG. 5, $\mu=0, 1, 2, 3$ or 4 is illustrated. A length of the slot in the time domain may be in inverse proportion to the subcarrier spacing. For example, when $\mu=0$, the length of the slot in the time domain may be 1 ms and the subcarrier spacing may be 15 kHz, and when $\mu=1$, the length of the slot in the time domain may be 0.5 ms and the subcarrier spacing may be 30 kHz.

A slot may include a plurality of Orthogonal Frequency Division Multiplexing (OFDM) symbols. A plurality of OFDM symbols within a slot may be divided into downlink (denoted by D), flexible (denoted by X), and uplink (denoted by U) symbols. The format of the slot may be determined according to which of the D, X, and U OFDM symbols constitute the slot.

The table below illustrates one example of the slot format.

TABLE 3

| | Symbol number in a slot | | | | | | | | | | | | | |
|---|---|---|---|---|---|---|---|---|---|---|---|---|---|---|
| format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |

TABLE 3-continued

| | Symbol number in a slot | | | | | | | | | | | | | |
|---|---|---|---|---|---|---|---|---|---|---|---|---|---|---|
| format | 0 | 1 | 2 | 3 | 4 | 5 | 6 | 7 | 8 | 9 | 10 | 11 | 12 | 13 |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | X | X | X | U | U | U | U | U | U | U | U | U | U |
| 42 | D | D | D | X | X | X | U | U | U | U | U | U | U | U |
| 43 | D | D | D | D | D | D | D | D | X | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | X | U | D | D | D | D | D | X | X | U |
| 47 | D | D | X | U | U | U | U | D | D | X | U | U | U | U |
| 48 | D | X | U | U | U | U | U | D | X | U | U | U | U | U |
| 49 | D | D | D | X | X | U | U | D | D | D | D | X | X | U |
| 50 | D | D | X | X | U | U | U | D | D | X | X | U | U | U |
| 51 | D | X | X | U | U | U | U | D | X | U | U | U | U | U |
| 52 | D | X | X | X | X | X | U | D | X | X | X | X | U | U |
| 53 | D | D | X | X | X | X | U | D | D | X | X | X | U | U |
| 54 | X | X | X | X | X | X | X | D | D | D | D | D | D | D |
| 55 | D | D | X | X | X | U | U | U | D | D | D | D | D | D |
| 56-255 | | | | | | Reserved | | | | | | | | |

(Blank)

A UE may be configured with the format of a slot through a higher layer signal, DCI, or a combination of the higher layer signal and DCI.

An antenna port is defined so that a channel transmitting a symbol on the antenna port may be inferred from a channel transmitting other symbol on the same antenna port. If large part of characteristics of a channel to which a symbol on one antenna port is transmitted may be inferred from a channel to which a symbol on another antenna port is transmitted, the two antenna ports are said to be quasi co-located. The large part of characteristics may include at least one or more of delay spread, Doppler spread, Doppler shift, average gain, average delay, and spatial Rx parameters.

A resource grid may be defined to include a specific number of subcarriers and OFDM symbols with respect to each numerology and subcarrier, which may start from a common resource block indicated by higher layer signaling.

Each element of the resource grid with respect to configuration of an antenna port and subcarrier spacing is called a resource element (RE), which may support complex values.

A resource block (RB) may be defined as contiguous subcarriers (for example, 12) in the frequency domain. A reference resource block may be numbered from zero to higher numbers in the frequency domain. The subcarrier 0 of the reference resource block 0 may be denoted by 'reference point A' and may be applied commonly to all of the subcarrier spacing configurations. Also, the reference point A may be used as a reference point for other resource block grids, where the reference point A may be obtained from a higher layer parameter.

A common resource block may be numbered from 0 to higher numbers in the frequency domain for subcarrier spacing configuration. The subcarrier 0 of the common resource block 0 for subcarrier spacing configuration may coincide with the 'reference point A'.

A physical resource block and virtual resource block may be defined within the part of subcarrier bandwidth and may be numbered from 0 to higher numbers.

According to carrier aggregation, up to 15 secondary cells may be aggregated in addition to a primary cell. In other words, up to 16 serving cells may be aggregated for a UE.

A physical downlink control channel (PDCCH) may include one or more control channel elements (CCEs) as illustrated in the following table.

TABLE 4

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called a control resource set (CORESET) may be introduced. The terminal may receive the PDCCH in the CORESET.

Figure 6:
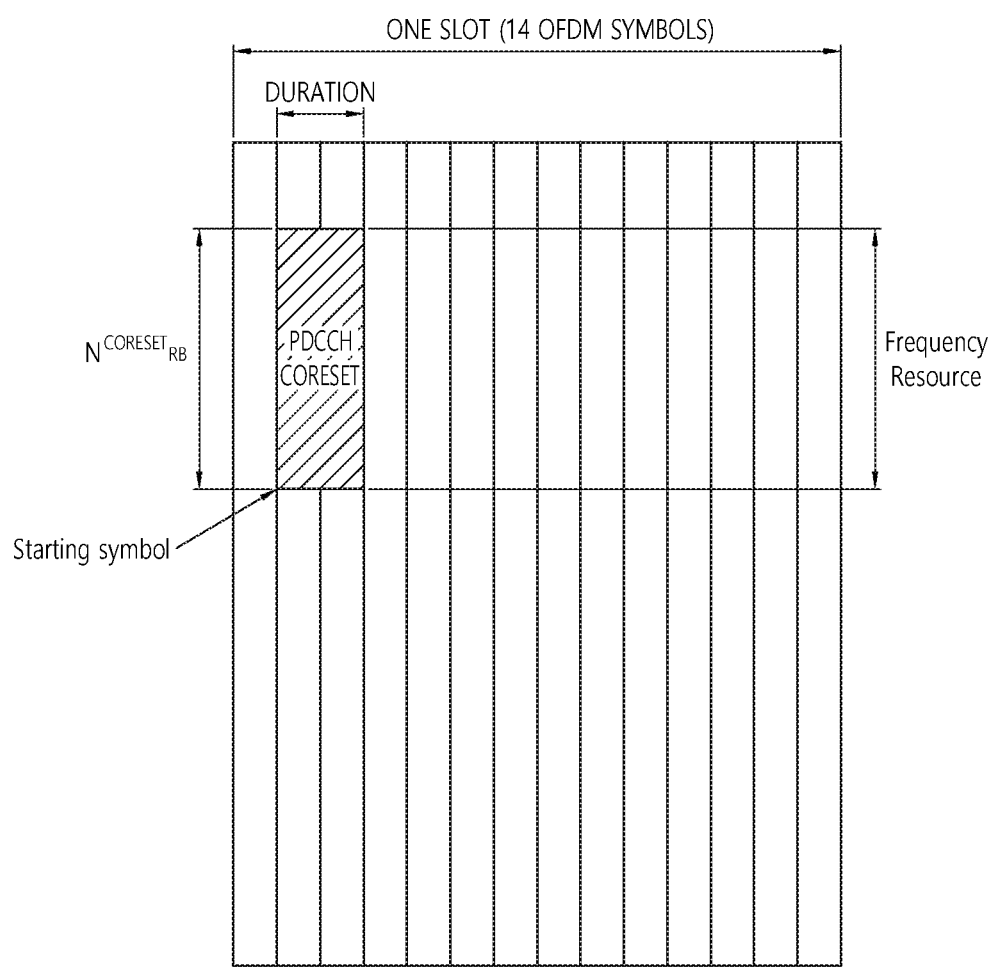
FIG. 6 illustrates CORESET.

FIG. 6 illustrates CORESET.

Referring to FIG. 6, the CORESET includes $N^{CORESET}_{RB}$ number of resource blocks in the frequency domain, and $N^{CORESET}_{symb} \in \{1, 2, 3\}$ number (just an example) of symbols in the time domain. The $N^{CORESET}_{RB}$ and $N^{CORESET}_{symb}$ may be provided by a base station through a higher layer signal. A plurality of control channel elements (CCEs) (or resource element groups (REGs)) may be included in the CORESET. A duration, a staring symbol, and the like of the CORESET may be set or predetermined.

The UE may attempt to detect a PDCCH in units of 1, 2, 4, 8, or 16 CCEs in the CORESET. One or a plurality of CCEs in which PDCCH detection can be attempted may be referred to as PDCCH candidates.

A plurality of CORESETs may be configured for the terminal.

Figure 7:
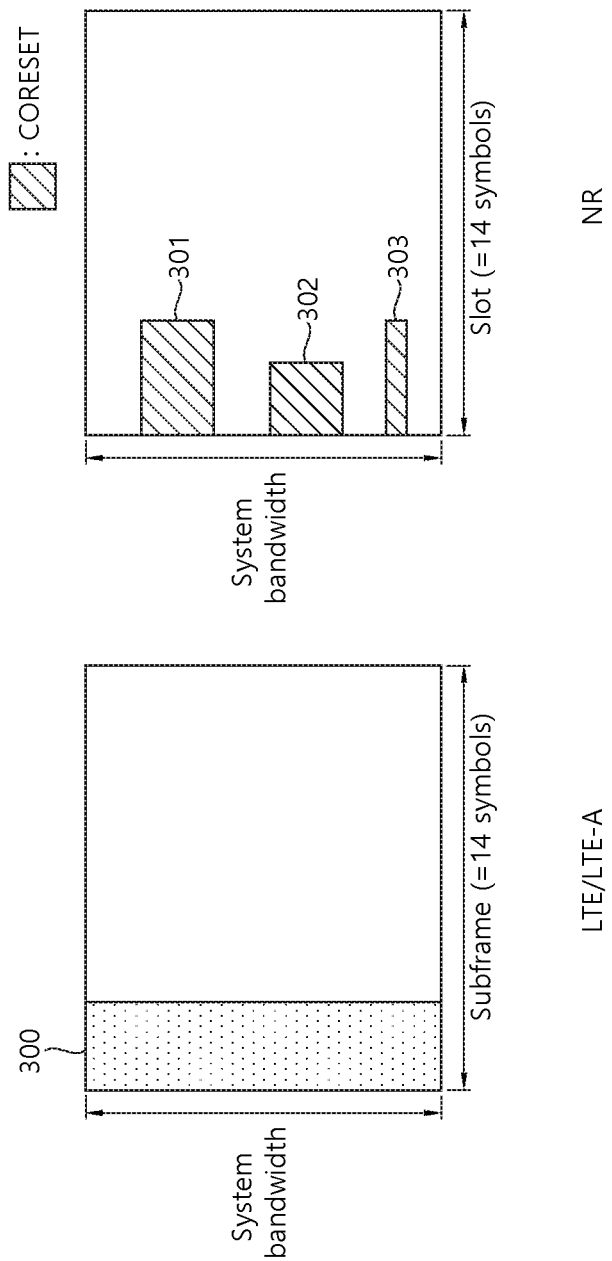
FIG. 7 is a diagram illustrating a difference between a related art control region and the CORESET in NR.

FIG. 7 is a diagram illustrating a difference between a related art control region and the CORESET in NR.

Referring to FIG. 7, a control region 300 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

In contrast, the future wireless communication system introduces the CORESET described above. CORESETs 301, 302, and 303 are radio resources for control information to be received by the terminal and may use only a portion, rather than the entirety of the system bandwidth. The BS may allocate the CORESET to each UE and may transmit control information through the allocated CORESET. For example, in FIG. 7, a first CORESET 301 may be allocated to UE 1, a second CORESET 302 may be allocated to UE 2, and a third CORESET 303 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Figure 8:
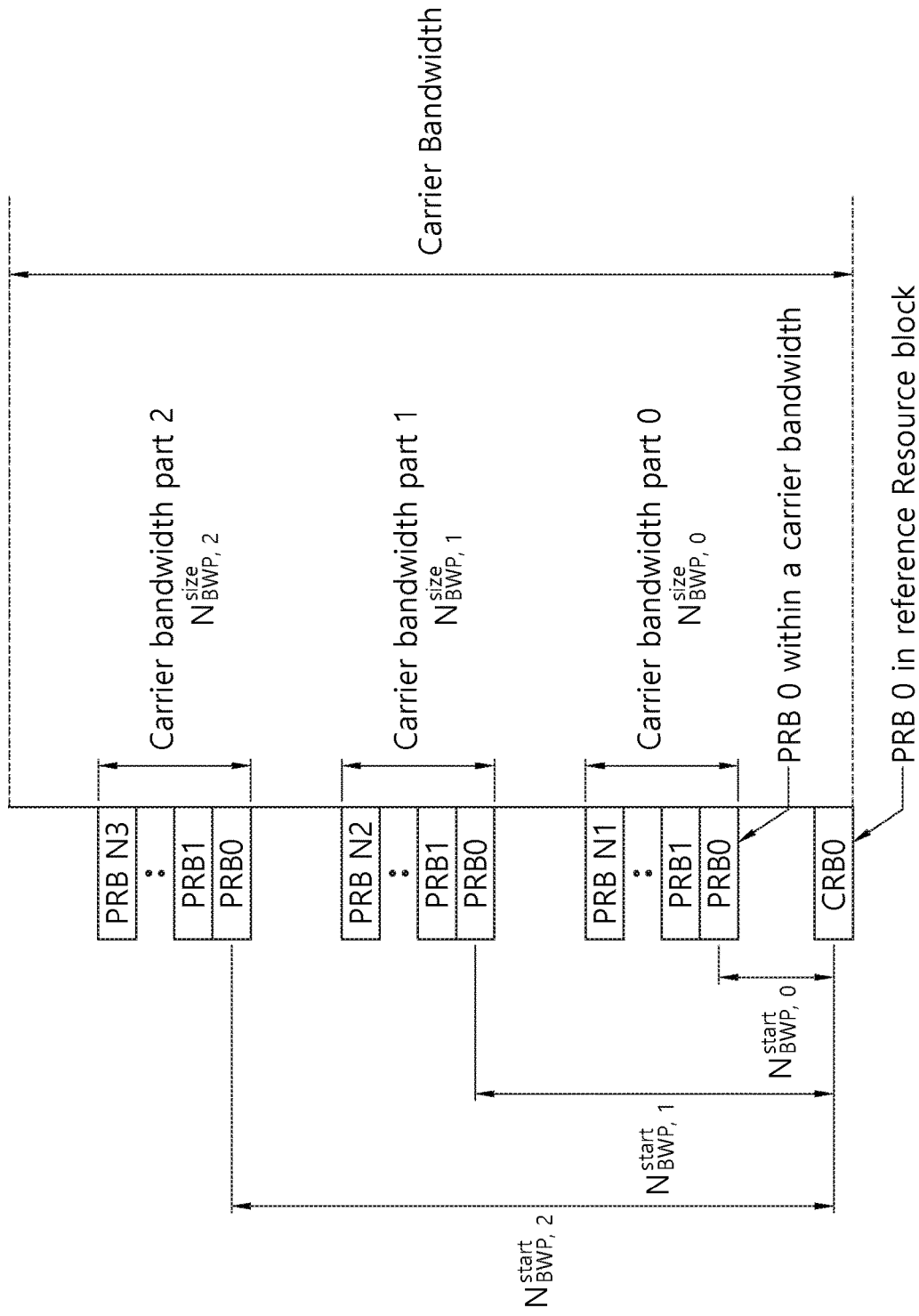
FIG. 8 illustrates carrier bandwidth part newly introduced to NR.

FIG. 8 illustrates carrier bandwidth part newly introduced to NR.

Referring to FIG. 8, the carrier bandwidth part may be simply called bandwidth part (BWP). As described above, in a future wireless communication system, various numerologies (for example, various subcarrier spacings) may be supported for the same subcarrier. NR may define a Common Resource Block (CRB) for a given numerology at a particular subcarrier.

The bandwidth part is a set of contiguous physical resource blocks (PRBs) selected among contiguous sub-sets of common resource blocks (CRBs) for a given numerology at a given subcarrier.

As shown in FIG. 8, a common resource block may be determined according to a numerology for particular subcarrier bandwidth, namely according to which subcarrier spacing is used. A common resource block may be indexed (from 0) from the lowest frequency of the subcarrier bandwidth, and a resource grid (which may be referred to as a common resource block resource grid) that uses the common resource block as its constituting unit may be defined.

The bandwidth part may be indicated with reference to a CRB that has the lowest index (let this be CRB 0). CRB 0 having the lowest index may also be called point A.

For example, for a given numerology at a particular subcarrier, the i-th bandwidth part may be indicated by $N_{BWP,i}^{start}$ and $N_{BWP,i}^{size}$. $N_{BWP,i}^{start}$ may indicate a start CRB of the i-th BWP with reference to CRB 0, and $N_{BWP,i}^{size}$ may indicate the size of the i-th BWP in the frequency domain (for example, in PRB units). PRBs within each BWP may be indexed from 0. The index of a CRB within each BWP may be mapped to the index of a PRB. For example, the CRB index may be mapped so that $n_{CRB}=n_{PRB}+N_{BWP,i}^{start}$.

Although a UE may be configured with up to 4 downlink bandwidth parts for downlink transmission, only one downlink bandwidth part may be activated at a given time point. A UE does not expect to receive PDSCH, PDCCH, or CSI-RS except for the activated downlink bandwidth part among the downlink bandwidth parts. Each downlink bandwidth part may include at least one CORESET.

Although a UE may be configured with up to 4 uplink bandwidth parts for uplink transmission, only one uplink bandwidth part may be activated at a given time point. A UE does not transmit PUSCH or PUCCH except for the activated uplink bandwidth part among the uplink bandwidth parts.

Compared with conventional systems, NR operates on broadband; however, not all of UEs may be able to support the broadband communication. BWP may be regarded as a feature that enables a UE incapable of supporting the broadband communication to operate on the broadband.

A UE configured to operate in the BWP of a serving cell may be configured with up to 4 bandwidth part (BWP) sets by an upper layer for the serving cell.

An initial activation DL BWP may be defined by the positions and the number of PRBs adjacent to a control resource set for type 0-PDCCH common search space, subcarrier spacing, and CP. For the operation in the primary cell, a UE may receive upper layer parameters for a random access procedure.

In the case of unpaired spectrum operation, a UE may expect that the center frequency of DL BWP is the same as the center frequency of UL BWP.

In what follows, resource allocation type will be described. Resource allocation type specifies a method for a scheduler (for example, gNB) to allocate resource blocks for each transmission. For example, when a gNB allocates a band composed of a plurality of resource blocks to a UE, the gNB may inform of resource blocks allocated to the UE through a bitmap consisting of bits corresponding to the respective resource blocks of the band. In this case, a disadvantage is obtained that although flexibility of resource allocation is improved, the amount of information required for the resource allocation is increased.

Taking into account the advantage and disadvantage, the following 3 resource allocation types may be defined/used.

1) Resource allocation type 0 refers to a method that allocates resources by using a bitmap, where each bit of the bitmap indicates a resource block group (RBG) rather than a resource block. In other words, in the resource allocation type 0, resource allocation is performed in resource block group units rather than at the resource block level. The table below shows the size of an employed RBG when the system bandwidth comprises $N_{RB}^{DL}$ resource blocks.

TABLE 5

| System Bandwidth $N_{RB}^{DL}$ | RBG Size (P) |
|---|---|
| ≤10 | 1 |
| 11-24 | 2 |
| 25-63 | 6 |
| 64-110 | 12 |

2) Resource allocation type 1 refers to a method that allocates resources in RBG subset units. One RBG subset may be composed of a plurality of RBGs. For example, RBG subset #0 may consist of RBG #0, 3, 6, 9, . . . ; RGB subset #1 may consist of RBG #1, 4, 7, 10, . . . ; and RGB subset #2 may consist of RBG #2, 5, 8, 11, . . . . The number of RBGs belonging to one RBG subset is set to be the same as the number of resource blocks (RBs) belonging to one RBG. The resource allocation type 1 informs of which RBG subset is used among RBG subsets and which RB is used within an employed RBG subset.

3) Resource allocation type 2 refers to a method that allocates resources by informing of the start position (RB number) of an allocated band and the number of contiguous resource blocks. The contiguous resource blocks may be started from the start position. However, contiguous resource blocks are not necessarily limited to physical contiguity; rather, it may also indicate contiguity of a logical or virtual resource block index.

In a future wireless communication system, the number of resource blocks comprising an RBG (or a group of RBs) may be changed flexibly. At this time, information about the corresponding RBG, for example, information that indicates the number of resource blocks comprising an RBG may be transmitted through an upper layer signal such as scheduling DCI or a third physical layer (L1) signaling or an RRC message.

Also, in a future wireless communication system, resource allocation information (for example, the information about RBG) may include information about the time domain in addition to the frequency domain; and which information is included or in which way the information is included in the resource allocation information may also be changed flexibly.

In what follows, a physical channel and signal transmission process will be described.

Figure 9:
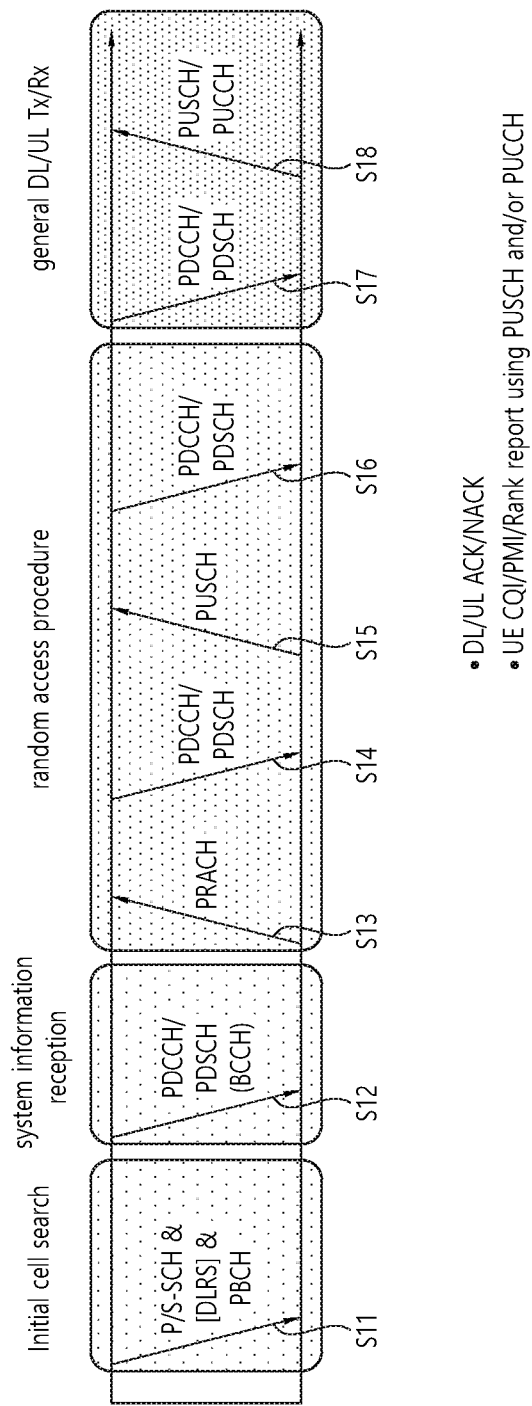
FIG. 9 illustrates physical channels and a normal signal transmission process in the 3GPP system.

FIG. 9 illustrates physical channels and a normal signal transmission process in the 3GPP system.

In a wireless communication system, a UE receives information through a downlink (DL) from a gNB, and the UE transmits information to the gNB via an uplink (UL). Information transmitted and received between the gNB and UE includes data and various pieces of control information; and various physical channels are employed according to the type/intended use of the information transmitted and received between them.

When a UE wakes up from the power-off state or newly enters a cell, the UE performs an initial cell search operation such as synchronization to a gNB S11. To this purpose, the UE may synchronize to the gNB by receiving Primary Synchronization Channel (PSCH) and Secondary Synchronization Channel (SSCH) from the gNB and obtain information such as cell identity (ID). Also, the UE may obtain information broadcast within the cell by receiving a Physical Broadcast Channel (PBCH) from the gNB. Also, the UE may check the downlink channel state by receiving a Downlink Reference Signal (DL RS) at the initial cell search phase.

A UE that has complete the initial cell search may obtain more specific system information by receiving a Physical Downlink Control Channel (PDCCH) and a Physical Downlink Shared Channel (PDSCH) corresponding to the PDCCH.

Afterwards, the UE may perform a random access procedure to complete access to the gNB S13-S16. More specifically, the UE may transmit a preamble through a Physical Random Access Channel (PRACH) S13 and receive a Random Access Response (RAR) with respect to the preamble through the PDCCH and the PDSCH corresponding to the PDCCH S14. Afterwards, the UE may transmit a Physical Uplink Shared Channel (PUSCH) by using scheduling information within the RAR S15 and perform a contention resolution procedure by using the PDCCH and the PDSCH corresponding to the PDCCH S16.

The UE that has performed the procedure above may subsequently perform PDCCH/PDSCH reception S17 and PUSCH/Physical Uplink Control Channel (PUCCH) transmission S18 as a normal uplink/downlink signal transmission procedure. The control information transmitted to the gNB by the UE is called Uplink Control Information (UCI). UCI includes Hybrid Automatic Repeat and reQuest Acknowledgement/Negative-ACK (HARQ ACK/NACK), scheduling request (SR), channel state information (CSI), and so on. CSI includes Channel Quality Indicator (CQI), Precoding Matrix Indicator (PMI), Rank Indication (RI), and so on. UCI is usually transmitted via a PUCCH but may also be transmitted through a PUSCH when both of control information and data needs to be transmitted simultaneously. Also, according to a request/indication of the network, the UE may transmit the UCI non-periodically through the PUSCH.

In what follows, cell search will be described.

Cell search is a procedure in which a UE obtains time and frequency synchronization with respect to a cell and detects a physical layer cell ID of the cell. To perform the cell search, the UE receives a Primary Synchronization Signal (PSS) and a Secondary Synchronization Signal (SSS).

The UE may assume that reception occasions of a PBCH, PSS, and SSS are distributed over contiguous symbols and form an SS/PBCH block. The UE may assume that SSS, PBCH DM-RS, and PBCH data have the same EPRE. The UE may assume that the ratio of SSS EPRE to PSS EPRE is 0 dB or 3 dB in an SS/PBCH block of the corresponding cell.

The cell search procedure of the UE may be summarized as shown in Table A.

TABLE A

| | Signal Type | Operation |
|---|---|---|
| Step 1 | PSS | Acquisition of SS/PBCH block (SSB) symbol timing<br>Search cell ID group for cell ID (3 hypothesis) |
| Step 2 | SSS | Detect cell ID group (336 hypothesis) |
| Step 3 | PBCH DMRS | SSB index and half-frame index (Detect slot and frame boundary) |
| Step 4 | PBCH | Time information (80 ms, SFN, SSB index, HF)<br>Configure RMSI CORESET/search space |
| Step 5 | PDCCH and PDSCH | Cell access information<br>RACH configuration |

Figure 10:
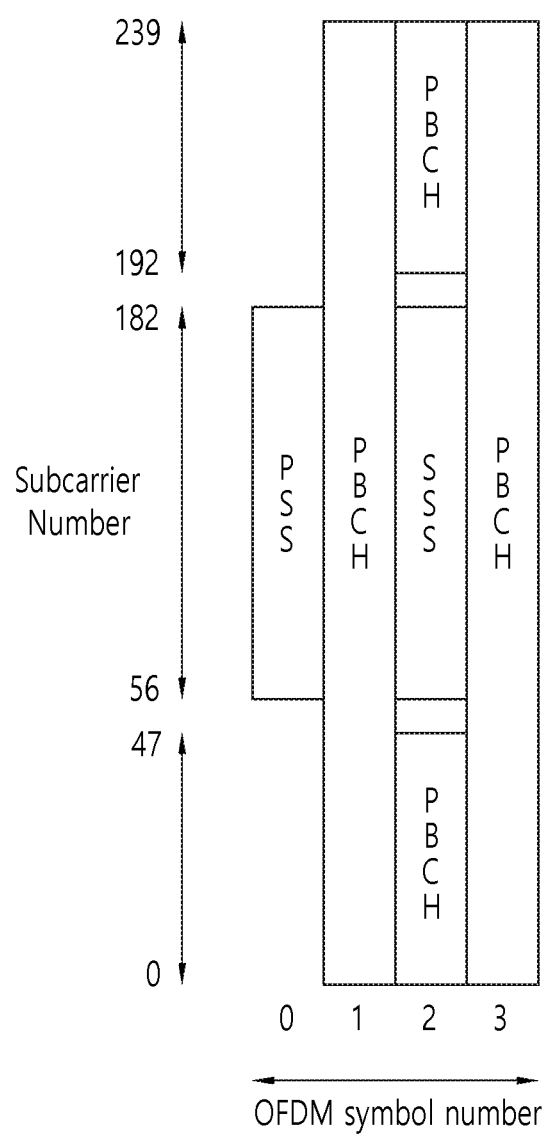
FIG. 10 illustrates a synchronization signal and PBCH (SS/PBCH) block.

FIG. 10 illustrates a synchronization signal and PBCH (SS/PBCH) block.

According to FIG. 10, an SS/PBCH block spans a PSS and SSS, which occupies one symbol and 127 subcarriers respectively, 3 OFDM symbols, and 240 subcarriers; however, on one symbol, the remaining PBCH may occupy the unused part of the SSS. Periodicity of an SS/PBCH block may be configured by the network, and the time point at which an SS/PBCH block may be transmitted is determined by subcarrier spacing.

Polar coding may be applied to the PBCH. Unless the network configures a UE to assume that a different subcarrier spacing is used, the UE may assume that a band-specific subcarrier spacing is used for the SS/PBCH block.

PBCH symbols may carry their own frequency-multiplexed DMRS. QPSK modulation may be used for the PBCH.

1008 unique physical layer cell IDs may be given by the equation 1 below.

$$N_{ID}^{cell} = 3N_{ID}^{(1)} + N_{ID}^{(2)}, \text{ where } N_{ID}^{(1)} \in \{0,1,\ldots,335\} \text{ and } N_{ID}^{(2)} \in \{0,1,2\}. \quad [\text{Eq. 1}]$$

Meanwhile, a PSS sequence $d_{PSS}(n)$ for the PSS may be defined by the equation 2 below.

$$d_{PSS}(n) = 1 - 2x(m)$$

$$m = (n + 43N_{ID}^{(2)}) \mod 127, \quad 0 \le n < 127, \quad [\text{Eq. 2}]$$

where $x(i+7) = (x(i+4) + x(i)) \mod 2$ and $[x(6)\ x(5)\ x(4)\ x(3)\ x(2)\ x(1)\ x(0)] = [1\ 1\ 1\ 0\ 1\ 1\ 0]$.

The sequence may be mapped to the physical resource shown in FIG. 10.

Meanwhile, an SSS sequence $d_{SSS}(n)$ for the SSS may be defined by the equation 3 below.

[Eq. 3]

$$d_{SSS}(n) = [1 - 2x_0((n+m_0) \mod 127)][1 - 2x_1((n+m_1) \mod 127)]$$

$$m_0 = 15\left\lfloor \frac{N_{ID}^{(1)}}{112} \right\rfloor + 5N_{ID}^{(2)}$$

$$m_1 = N_{ID}^{(1)} \mod 112$$

$$0 \le n < 127$$

$$x_0(i+7) = (x_0(i+4) + x_0(i)) \mod 2$$

$$x_1(i+7) = (x_1(i+1) + x_1(i)) \mod 2 \text{ and}$$

(Here, $$[x_0(6)\ x_0(5)\ x_0(4)\ x_0(3)\ x_0(2)\ x_0(1)\ x_0(0)] = [0\ 0\ 0\ 0\ 0\ 0\ 1]$$

$$[x_1(6)\ x_1(5)\ x_1(4)\ x_1(3)\ x_1(2)\ x_1(1)\ x_1(0)] = [0\ 0\ 0\ 0\ 0\ 0\ 1].)$$

The sequence may be mapped to the physical resource shown in FIG. 10.

For a half frame having an SS/PBCH block, the first symbol indexes for candidate SS/PBCH blocks may be determined according to the subcarrier spacing of the SS/PBCH blocks described later.

Case A—subcarrier spacing 15 kHz: First symbols of candidate SS/PBCH blocks have an index of $\{2, 8\} + 14*n$. For a subcarrier frequency below 3 GHz, n=0, 1. For a subcarrier frequency above 3 GHz and below 6 GHz, n=0, 1, 2, 3.

Case B—subcarrier spacing 30 kHz: First symbols of candidate SS/PBCH blocks have an index of $\{4, 8, 16, 20\} + 28*n$. For a subcarrier frequency below 3 GHz, n=0. For a subcarrier frequency above 3 GHz and below 6 GHz, n=0, 1.

Case C—subcarrier spacing 30 kHz: First symbols of candidate SS/PBCH blocks have an index of $\{2, 8\} + 14*n$. For a subcarrier frequency below 3 GHz, n=0, 1. For a subcarrier frequency above 3 GHz and below 6 GHz, n=0, 1, 2, 3.

Case D—subcarrier spacing 120 kHz: First symbols of candidate SS/PBCH blocks have an index of $\{4, 8, 16, 20\} + 28*n$. For a subcarrier frequency above 6 GHz, n=0, 1, 2, 3, 5, 6, 7, 8, 10, 11, 12, 13, 15, 16, 17, 18.

Case E—subcarrier spacing 240 kHz: First symbols of candidate SS/PBCH blocks have an index of $\{8, 12, 16, 20, 32, 36, 40, 44\} + 56*n$. For a subcarrier frequency above 6 GHz, n=0, 1, 2, 3, 5, 6, 7, 8.

Candidate SS/PBCH blocks within a half frame may be indexed from 0 to L-1 in the ascending order along the time axis. A UE has to determine 2 LSB bits of the SS/PBCH block index when L=4 and 3 LSB bits when L>4 for each half frame from one-to-one mapping to the index of the DM-RS sequence transmitted within the PBCH. When L=64, the UE has to determine 3 MSB bits of the SS/PBCH block index for each half frame according to the PBCH payload bit $\bar{a}_{\bar{A}+5}, \bar{a}_{\bar{A}+6}, \bar{a}_{\bar{A}+7}$.

The UE may be configured by an upper layer parameter SSB-transmitted-SIB1 with indexes of SS/PBCH blocks in which the UE is unable to receive other signals or channels within REs overlapped with the REs corresponding to the SS/PBCH blocks. Also, the UE may be configured by an upper layer parameter SSB-transmitted with indexes of SS/PBCH blocks for each serving cell in which the UE is unable to receive other signals or channels within REs overlapped with the REs corresponding to the SS/PBCH blocks. Configuration by the SSB-transmitted may precede the configuration by the SSB-transmitted-SIB1. The UE may be configured with periodicity of a half frame with respect to reception of SS/PBCH blocks for each serving cell by an upper layer parameter SSB-periodicityServingCell. If the periodicity of a half frame with respect to reception of SS/PBCH blocks is not configured for the UE, the UE may assume periodicity of the half frame. The UE may assume that the periodicity is the same for all of SS/PBCH blocks within a serving cell.

Figure 11:
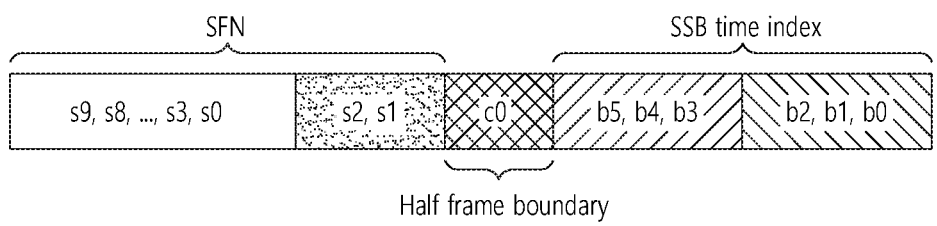
FIG. 11 illustrates a method for a UE to obtain timing information.

FIG. 11 illustrates a method for a UE to obtain timing information.

First, the UE may obtain 6-bit SFN information through a Master Information Block (MIB) received within the PBCH. Also, the UE may obtain 4-bit SFN within the PBCH transmission block.

Second, the UE may obtain a 1-bit half frame indicator as part of the PBCH payload. Below 3 GHz, the half frame indicator may be implicitly signaled as part of a PDBH DMRS with respect to $L_{max}=4$.

Lastly, the UE may obtain an SS/PBCH block index from a DMRS sequence and PBCH payload. In other words, the UE may obtain 3 LSB bits of the SS block index from the DM-RS sequence during the period of 5 ms. Also, (above 6 GHz) 3 MSB bits of timing information may be carried explicitly within the PBCH payload.

In the initial cell selection process, the UE may assume that a half frame having SS/PBCH blocks are generated with periodicity of 2 frames. If an SS/PBCH block is detected, and $k_{SSB} \leq 23$ for FR1 and $k_{SSB} \leq 11$ for FR2, the UE determines that there exists a control resource set for Type0-PDCCH common search space. If $k_{SSB} > 23$ for FR1 and $k_{SSB} > 11$ for FR2, the UE determines that there does not exist a control resource set for Type0-PDCCH common search space.

For a serving cell that does not transmit SS/PBCH blocks, the UE obtains time and frequency synchronization to the serving cell based on reception of SS/PBCH blocks on a Pcell or PSCell of a cell group to which the serving cell belongs.

In what follows, random access (RA) will be described.

Before starting a physical random access procedure, layer 1 has to receive a set of SS/PBCH block indexes and provide a set of RSRP measurements to the upper layer.

Before starting the physical random access procedure, the layer 1 has to receive the following information from the upper layer:

Configuration of PRACH transmission parameter (PRACH preamble format, time resource, and frequency resource for PRACH transmission) and Parameter for determination of a root sequence and cyclic shift within a PRACH preamble sequence set with respect to the parameter (index of a logical root sequence table, cyclic shift (NCS), and set type (unrestricted set, restricted set A, or restricted set B).

In view of the physical layer, the L1 random access procedure includes a random access preamble (Msg1) within a PRACH, random access response (RAR) at the PDCCH/PDSCH (Msg2), and transmission of the PDSCH for transmission of the PUSCH and resolution of contention if applicable (Msg3).

If the random access procedure is started by a PDCCH order from the UE, transmission of a random access preamble may have the same subcarrier spacing with that for transmission of a random access preamble initiated by the upper layer.

If the UE is configured with two uplink carriers with respect to a serving cell and the UE detects the PDCCH order, the UE may use an UL/SUL indicator field value from the PDCCH order detected for determining an uplink subcarrier for transmission of the corresponding random access preamble.

The random access procedure of the UE may be summarized as shown in Table 6.

TABLE 6

| | Signal type | Operation/Obtained information |
|---|---|---|
| Step 1 | PRACH preamble of uplink | Initial acquisition of beam Random election of RA-preamble ID |
| Step 2 | Random access response on DL-SCH | Timing array information RA-preamble ID Initial uplink grant, temporary C-RNTI |
| Step 3 | Uplink transmission on UL-SCH | RRC connection request UE identifier |
| Step 4 | Contention resolution of downlink | C-RNTI on the PDCCH with respect to the initial access C-RNTI on the PDCCH with respect to the UE in RRC_CONNECTED state |

Figure 12:
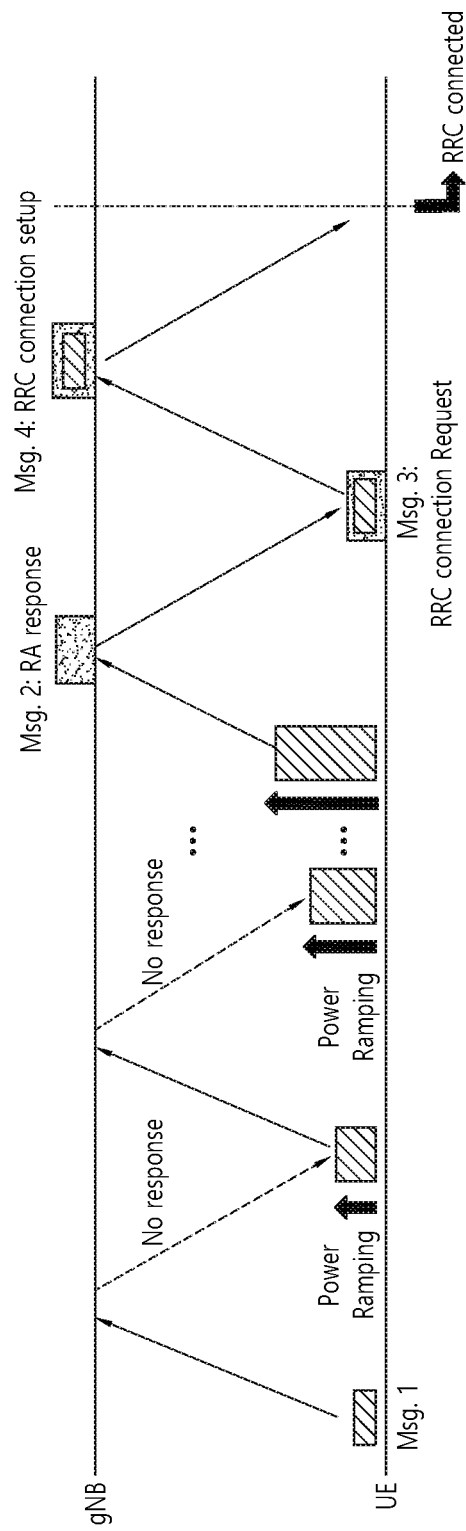
FIG. 12 illustrates a random access procedure.

FIG. 12 illustrates a random access procedure.

Referring to FIG. 12, first, the UE may transmit a PRACH preamble to the uplink as message 1 (Msg 1) of the random access procedure.

A random access preamble sequence having two different lengths may be supported. A long sequence having a length of 839 is applied to the subcarrier spacing of 1.25 kHz and 5 kHz; and a short sequence having a length of 139 is applied to the subcarrier spacing of 15, 30, 60, and 120 kHz. The long sequence may support an unrestricted set and restricted sets of type A and B while the short sequence may support only the unrestricted set.

A plurality of PACH preamble formats are defined by one or more RACH OFDM symbols, different cyclic prefix (CP), and guard time. Configuration of a PRACH preamble to be used is transmitted to the UE as system information.

If there is no response for Msg 1, the UE may retransmit a power-wrapped PRACH preamble within a specified number of trials. The UE calculates PRACH transmission power for retransmission of a preamble based on the most recent estimated path loss and power ramping counter. If the UE performs beam switching, the power ramping counter does not change.

Figure 13:
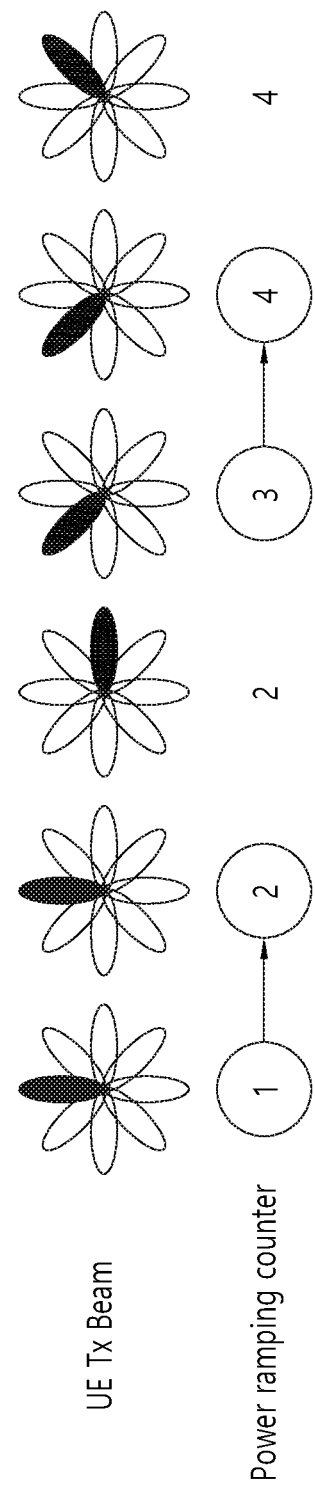
FIG. 13 illustrates a power ramping counter.

FIG. 13 illustrates a power ramping counter.

The UE may perform power ramping for retransmission of a random access preamble based on the power ramping counter. Here, as described above, the power ramping counter does not change when the UE performs beam switching at the time of retransmission of a PRACH.

According to FIG. 13, if the UE retransmits a random access preamble for the same beam as when the power ramping counter is increased from 1 to 2 and 3 to 4, the UE increases the power ramping counter by 1. However, if the beam is changed, the power ramping counter may not change at the time of retransmission of the PRACH.

Figure 14:
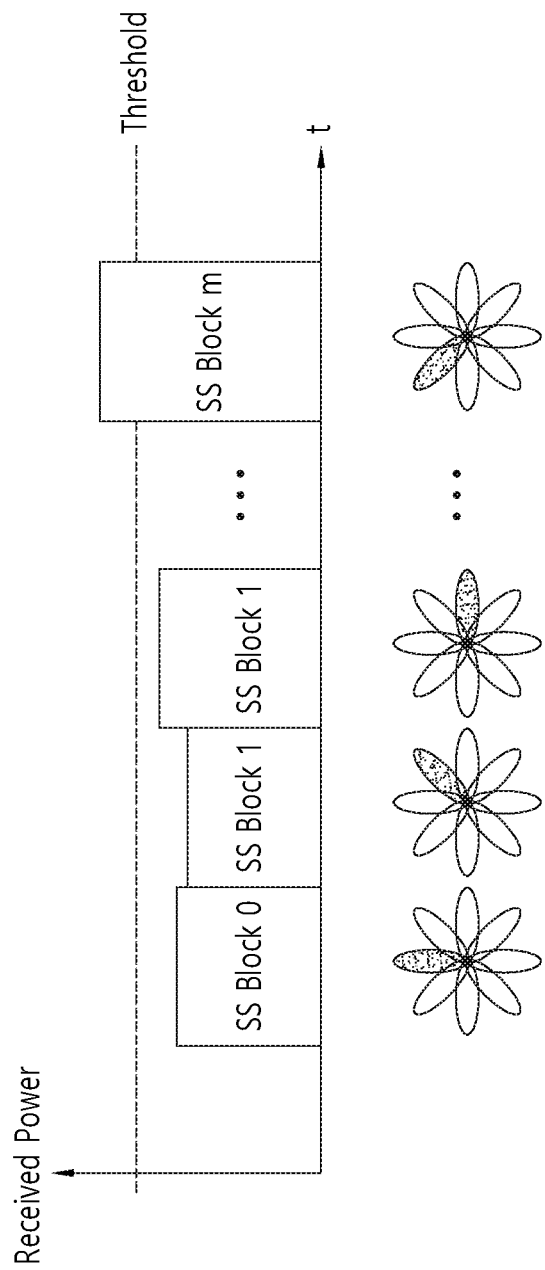
FIG. 14 illustrates a threshold for an SS block with respect to an RACH resource relationship.

FIG. 14 illustrates a threshold for an SS block with respect to an RACH resource relationship.

System information about a relationship between SS blocks and RACH resources may be informed to the UE. A threshold for an SS block with respect to an RACH resource relationship may be based on the RSRP and network configuration. Transmission or retransmission of an RACH preamble may be based on an SS block satisfying the threshold. Therefore, in the example of FIG. 14, since SS block m exceeds a threshold for reception power, the RACH preamble may be transmitted or retransmitted based on the SS block m.

Afterwards, if the UE receives a random access response on the DL-SCH, the DL-SCH may provide timing arrangement information, RA-preamble ID, initial uplink grant, and temporary C-RNTI.

Based on the information, the UE may perform uplink transmission of message 3 (Msg3) of the random access procedure on the UL-SCH. Msg3 may include an RRC connection request and UE identifier.

In response to the transmission, the network may transmit Msg4, which may be treated as a contention resolution message, to the downlink. By receiving the message, the UE may enter the RRC connection state.

In what follows, the random access preamble will be described in more detail.

In the random access preamble transmission step, the physical random access procedure may be triggered by an upper layer, PDCCH order, or request for PRACH transmission. Configuration of PRACH transmission by the upper layer may include the following:

Configuration about PRACH transmission; and
Preamble index, preamble subcarrier spacing, $P_{PRACH,target}$, corresponding RA-RNTI, and PRACH resource.

The preamble may be transmitted according to a selected PRACH format having transmission power of $P_{PRACH,b,f,c}(i)$ on the indicated PRACH resource.

A plurality of SS/PBCH blocks related to one PRACH occasion may be provided to the UE by the upper layer parameter SSB-perRACH-Occasion. If SSB-perRACH-Occasion is smaller than 1, one SS/PBCH block may be mapped to contiguous PRACH occasions 1/SSB-perRACH-Occasion. A plurality of preambles are provided to the UE for each SS/PBCH by the upper layer parameter cb-preamblePerSSB, and the UE may determine a multiple of SSB-perRACH-Occasion and the value of cb-preamblePerSSB as the total number of preambles for each PRACH and SSB.

The SS/PBCH block index may be mapped to the PRACH occasions according to the following order:

First, ascending order of a preamble index within a single PRACH occasion,
Second, ascending order of frequency resource index with respect to frequency multiplexed PRACH occasions,
Third, ascending order of time resource index with respect to time multiplexed PRACH occasions within the PRACH slot, and
Fourth, ascending order of index with respect to PRACH slots.

The period that starts from frame 0, at which SS/PBCH blocks are mapped to PRACH occasions, is the minimum value of the PRACH configuration periods $\{1, 2, 4\}$, which is larger than or equal to $[N_{Tx}^{SSB}/N_{PRACHperiod}^{SSB}]$; here, the UE obtains $N_{Tx}^{SSB}$ by the upper layer parameter SSB-transmitted-SIB1, and $N_{PRACHperiod}^{SSB}$ represents the number of SS/PBCH blocks that may be mapped to one PRACH configuration period.

If the random access procedure is started by the PDCCH order and is requested by the upper layer, the UE has to transmit the PRACH within the first available PRACH occasion, where the time difference between the last symbol at which the PDCCH order is received and the first symbol of PRACH transmission is larger than or equal to $N_{T,2}+\Delta_{BWPSwitching}+\Delta_{Delay}$ msec. Here, $N_{T,2}$ represents duration of $N_2$ symbols corresponding to PUSCH preparation time with respect to PUSCH processing capability 1, $\Delta_{BWPSwitching}$ is a predefined value, and $\Delta_{Delay}>0$.

In what follows, the random access response will be described in more detail.

In response to the PRACH transmission, the UE may attempt to detect a PDCCH having the corresponding RA-RNTI during a window controlled by the upper layer. The window may start from the first symbol of the earliest control resource set configured for the UE with respect to the Type1-PDCCH common search space comprising at least $ceil[(\Delta \cdot N_{slot}^{subframe} \cdot N_{symb}^{slot})/T_{sf}]$ symbols after the last symbol of preamble sequence transmission. The length of the windows as expressed in terms of the number of slots may be provided by the upper layer parameter rar-WindowLength based on the subcarrier spacing with respect to the Type0-PDCCH common search space.

If the UE detects a PDCCH having the corresponding RA-RNTI and the corresponding PDSCH including a DL-SCH transmission block within the window, the UE may transmit the transmission block to the upper layer. The upper layer may parse the transmission block with respect to the random access preamble identity (RAPID) related to the PRACH transmission. If the upper layer identifies RAPID within an RAR message(s) of the DL-SCH transmission block, the upper layer may indicate an uplink grant to the physical layer. This may be referred to as a random access response (RAR) uplink grant in the physical layer. If the upper layer fails to identify the RAPID related to the PRACH transmission, the upper layer may instruct the physical layer to transmit the PRACH. The minimum time difference between the last symbol at which the PDSCH is received and the first symbol of the PRACH transmission is the same as $N_{T,1}+\Delta_{new}+0.5$, where $N_{T,1}$ represents the duration of $N_{T,1}$ symbols corresponding to the PDSCH reception time with respect to the PDSCH processing capability 1 when an additional PDSCH DM-RS is configured, and $\Delta_{new} \geq 0$.

For a detected SS/PBCH block or received CSI-RS, the UE may have to receive the corresponding PDSCH including a PDCCH having the corresponding RA-RNTI and a DL-SCH transmission block having the same DM-RS antenna port Quasi Co-Location (QCL) characteristics. If the UE attempts to detect a PDCCH having the corresponding RA-RNTI as a response to PRACH transmission initiated by the PDCCH order, the UE may assume that the PDCCH and PDCCH order have the same DM-RS antenna port QCL characteristics.

The RAR uplink grant schedules PUSCH transmission of the UE (Msg3 PUSCH). Configuration of the RAR uplink grant, which starts from the MSG and ends at the LSB, may be given as shown in Table 7. Table 7 shows the size of a random access response grant configuration field.

TABLE 7

| RAR grant field | Number of bits |
|---|---|
| Frequency hopping flag | 1 |
| Msg3 PUSCH frequency resource allocation | 14 |
| Msg3 PUSCH time resource allocation | 4 |
| MCS | 4 |
| TPC command for Msg3 PUSCH | 3 |
| CSI request | 1 |
| Reserved bits | 3 |

Msg3 PUSCH frequency resource allocation is related to uplink resource allocation type 1. In the case of frequency hopping, based on the indication of the frequency hopping flag field, the first or first two bits $N_{UL,hop}$ of the Msg3 PUSCH frequency resource allocation field may be used as hopping information bits.

MCS may be determined by the first 16 indexes of the MCS index table applicable to the PUSCH.

The TPC command $\delta_{msg2,b,f,c}$ may be used for power configuration of the Msg3 PUSCH and may be interpreted according to Table 8 below.

TABLE 8

| TPC Command | Value [dB] |
|---|---|
| 0 | −6 |
| 1 | −4 |
| 2 | −2 |
| 3 | 0 |
| 4 | 2 |
| 5 | 4 |
| 6 | 6 |
| 7 | 8 |

In a non-contention based random access procedure, the CSI request field is interpreted to determine whether a non-periodic CSI report is included in the corresponding PUSCH transmission. In the contention-based random access procedure, the CSI request field may be reserved.

As long as the UE does not configure the subcarrier spacing, the UE receives a subsequent PDSCH by using the subcarrier spacing that is the same as PDSCH reception that provides an RAR message.

If the UE does not detect a PDCCH having the corresponding RA-RNTI within a window and the corresponding DL-SCH transmission block, the UE performs a random access response reception failure procedure.

In what follows, the Msg3 PUSCH transmission will be described in more detail.

With respect to Msg3 PUSCH transmission, the upper layer parameter msg3-tp indicates whether the UE has to apply a transform precoding for the Msg3 PUSCH transmission. If the UE applies a transform precoding for Msg3 PUSCH transmission employing frequency hopping, the frequency offset for the second hop may be given as shown in Table 9. Table 9 illustrates a frequency offset of the second hop with respect to the Msg3 PUSCH transmission employing frequency hopping.

TABLE 9

| Number of PRBs in initial active UL BWP | Value of $N_{UL,hop}$ Hopping Bits | Frequency offset for 2nd hop |
|---|---|---|
| $N_{BWP}^{size} < 50$ | 0 | $N_{BWP}^{size}/2$ |
|  | 1 | $N_{BWP}^{size}/4$ |
| $N_{BWP}^{size} \geq 50$ | 00 | $N_{BWP}^{size}/2$ |
|  | 01 | $N_{BWP}^{size}/4$ |
|  | 10 | $-N_{BWP}^{size}/4$ |
|  | 11 | Reserved |

The subcarrier spacing for Msg3 PUSCH transmission may be provided by the upper layer parameter msg3-scs. The UE has to transmit the PRACH and Msg3 PUSCH on the same uplink carrier of the same serving cell. The uplink BWP for the Msg3 PUSCH transmission may be indicated by SystemInformationBlockType1.

When the PDSCH and PUSCH have the same subcarrier spacing, the minimum time difference between the last symbol at which the PDSCH carrying the RAR is received and the first symbol of the corresponding Msg3 PUSCH transmission scheduled by the RAR within the PDSCH with respect to the UE may be the same as $N_{T,1}+N_{T,2}+N_{TA,max}+0.5$ msec. Here, $N_{T,1}$ represents the duration of $N_1$ symbols corresponding to the PDSCH reception with respect to the PDSCH processing capability 1 when an additional PDSCH DM-RS is configured, $N_{T,2}$ represents the duration of $N_2$ symbols corresponding to the PUSCH preparation time with respect to the PUSCH processing capability 1, and $N_{TA,max}$ represents the maximum timing adjustment value that may be provided by the TA command field within the RAR.

In what follows, contention resolution will be described in more detail.

If the UE fails to receive C-RNTI, the UE attempts to detect a PDCCH having the corresponding TC-RNTI that schedules a PDSCH including UE contention resolution identity in response to the Msg3 PUSCH transmission. In response to the reception of the PDSCH having the UE contention resolution identity, the UE transmits HARQ-ACK information within the PUCCH. The minimum time difference between the last symbol at which the PDSCH is received and the first symbol of the corresponding HARQ-ACK transmission is $N_{T,1}+0.5$ msec. $N_{T,1}$ represents the duration of $N_1$ symbols corresponding to the PDSCH reception with respect to the PDSCH processing capability 1 when an additional PDSCH DM-RS is configured.

In what follows, power saving will be described.

The battery life of a UE is an important factor of user experience that affects selection of a particular 5G handset and/or service. Since the NR system is capable of high speed data transfer, user data is expected to increase explosively and be provided in a very short time period.

Meanwhile, energy efficiency of a device is related to support for two aspects of efficient data transmission in the presence of a load and low energy consumption in the absence of data. Here, efficient data transmission in the presence of a load may be checked by average spectrum efficiency while low energy consumption in the absence of data may be estimated by a sleep ratio.

As power saving techniques for a UE, UE adaptation to traffic and power consumption pattern, adaption to the change of frequency/time, adaptation to antenna, adaptation to DRX configuration, adaptation to UE processing capability, adaptation for reduction of PDCCH monitoring/decoding, power saving signal/channel/procedure for triggering adaptation to UE power consumption, power consumption reduction in the RRM measurement, and so on may be taken into account.

Here, with respect to the adaptation to DRX configuration, a downlink-shared channel (DL-SCH) characterized by support for UE DRX that enables power saving and paging channel (PCH) (where a DRX period may be indicated by the network to the UE) characterized by support for UE DRX that enables power saving may be taken into account.

Also, with respect to the adaption to UE processing capability, the UE may report static UE wireless access capability at least when requested by the network. An gNB may inform the UE of which UE capability has to be reported based on band information. If allowed by the network, the UE may transmit, to the gNB, a temporary capability limit request for signaling possibility of a limited use of part of the capability (for example, due to hardware sharing, interference, or overheating). Afterwards, the gNB may confirm or reject the request. The temporary capability limit has to be transparent to 5GC. Static capabilities are mainly stored in the 5GC.

Also, with respect to the adaptation for reduction of PDCCH monitoring/decoding, the UE monitors a set of PDCCH candidates in the monitoring occasions configured within one or more CORESETs according to the corresponding search space configuration. A CORESET is composed of a set of PRBs having duration spanning 1 to 3 OFDM symbols. Resource Element Groups (REGs) and Control Channel Elements (CCEs), which are composed of resource units, are defined within a CORESET where each CCE is composed of one set of REGs. Control channels are formed by aggregation of CCEs. Different code rates for the control channels are implemented by aggregation of using a different number of CCEs. Mapping between interleaved and non-interleaved CCEs and REGs is supported within the CORESET.

Also, with respect to the power saving signal/channel/ procedure for triggering adaptation to UE power consumption, when carrier aggregation (CA) is configured, to realize reasonable UE battery consumption, an activation/deactivation mechanism of cells is supported. If a cell is deactivated, the UE does not have to receive the corresponding PDCCH or PDSCH, and the UE is made incapable of transmitting the corresponding uplink transmission and does not have to perform CQI measurement, either. On the contrary, if a cell is activated, the UE has to receive the PDCCH and PDSCH (when the UE is configured to monitor the PDCCH from the SCell) and is expected to perform CQI measurement. NG-RAN ensures that SCells mapped to the PUCCH SCell are deactivated before the PUCCH SCell is modified or removed.

Also, with respect to the power consumption reduction in the RRM measurement, if two types of measurement are available, RRM configuration may include SSB about a reported cell(s) and beam measurement information related to CSI-RS (about layer 3 mobility).

Also, if carrier aggregation is configured, RRM configuration may include a list of best cells at the respective frequencies available with measurement information. Also, RRM measurement information may include beam measurement about listed cells belonging to a target gNB.

Meanwhile, a new RAT system such as NR may use the OFDM transmission scheme or a similar transmission scheme. The new RAT system may follow OFDM parameters different from the OFDM parameters of the LTE. Or the new RAT system may adopt the numerology of the conventional LTE/LTE-A system but may employ larger system bandwidth (for example, 100 MHz). Or in the new RAT system, one cell may support a plurality of numerologies. In other words, UEs operating under different numerologies may coexist in one cell.

In the NR system, OFDM(A) numerology (for example, SCS, CP length, and so on) may be configured differently among a plurality of cells aggregated into one UE. Accordingly, the (absolute time) period of a time resource (for example, subframe, slot, or TTI) (for the sake of convenience, it is called a Time Unit (TU)) composed of the same number of symbols may be configured differently among aggregated cells.

Figure 15:
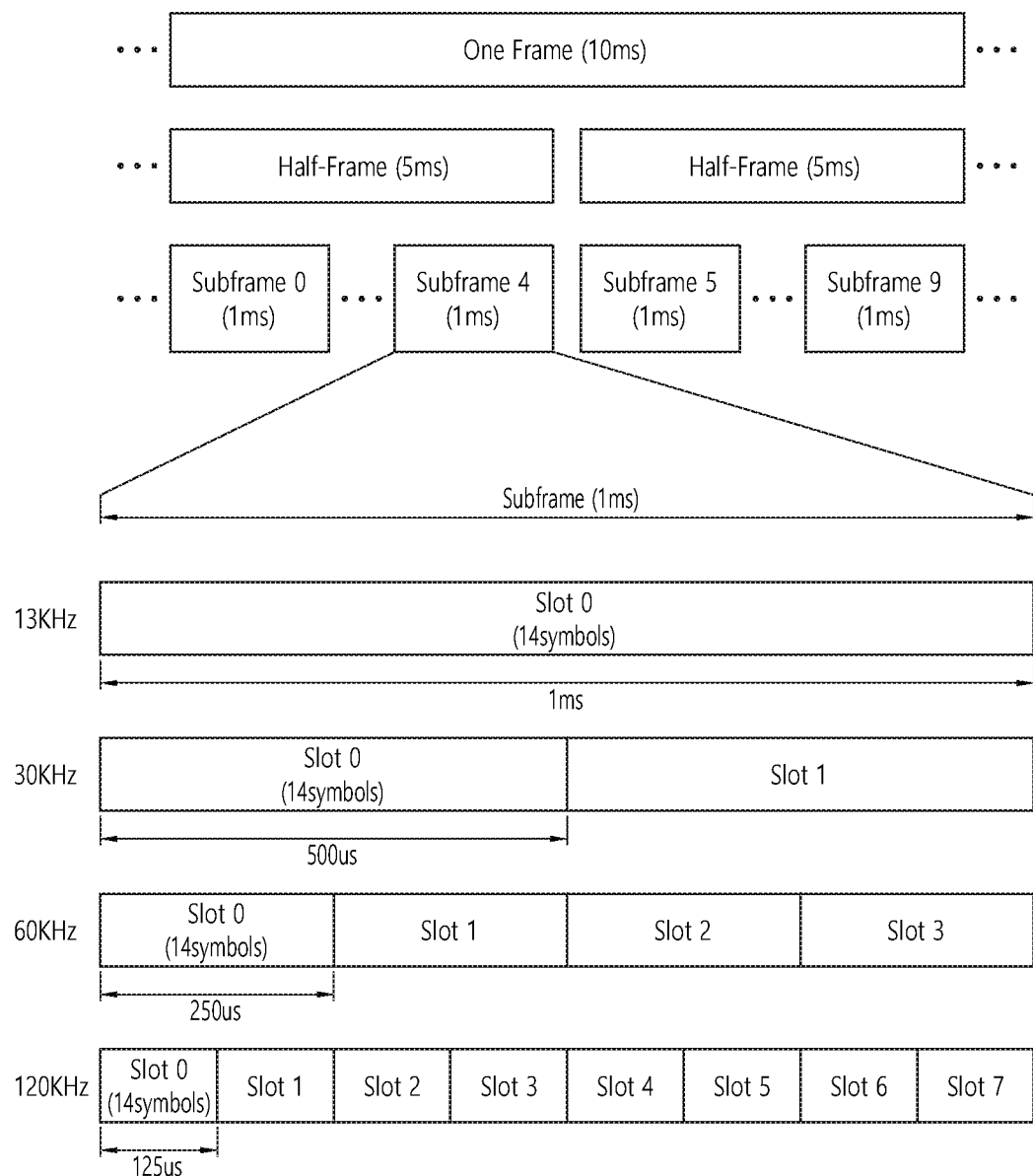
FIG. 15 illustrates a structure of a radio frame that may be used in the next-generation communication.

FIG. 15 illustrates a structure of a radio frame that may be used in the next-generation communication.

A radio frame has a length of 10 ms and may be defined by two half frames (HFs) of 5 ms. A half frame may include five subframes (SFs) of 1 ms. A subframe may be divided into one or more slots, and the number of slots within a subframe may be determined by subcarrier spacing (SCS). Each slot may include 12 or 14 OFDM(A) symbols according to the Cyclic Prefix (CP) employed.

When the normal CP is used, each slot may include 14 symbols. When the extended CP is used, each slot may include 12 symbols. Here, a symbol may include OFDM symbols (or CP-OFDM symbols) and SC-FDMA symbols (or DFT-s-OFDM symbols).

Figure 16:
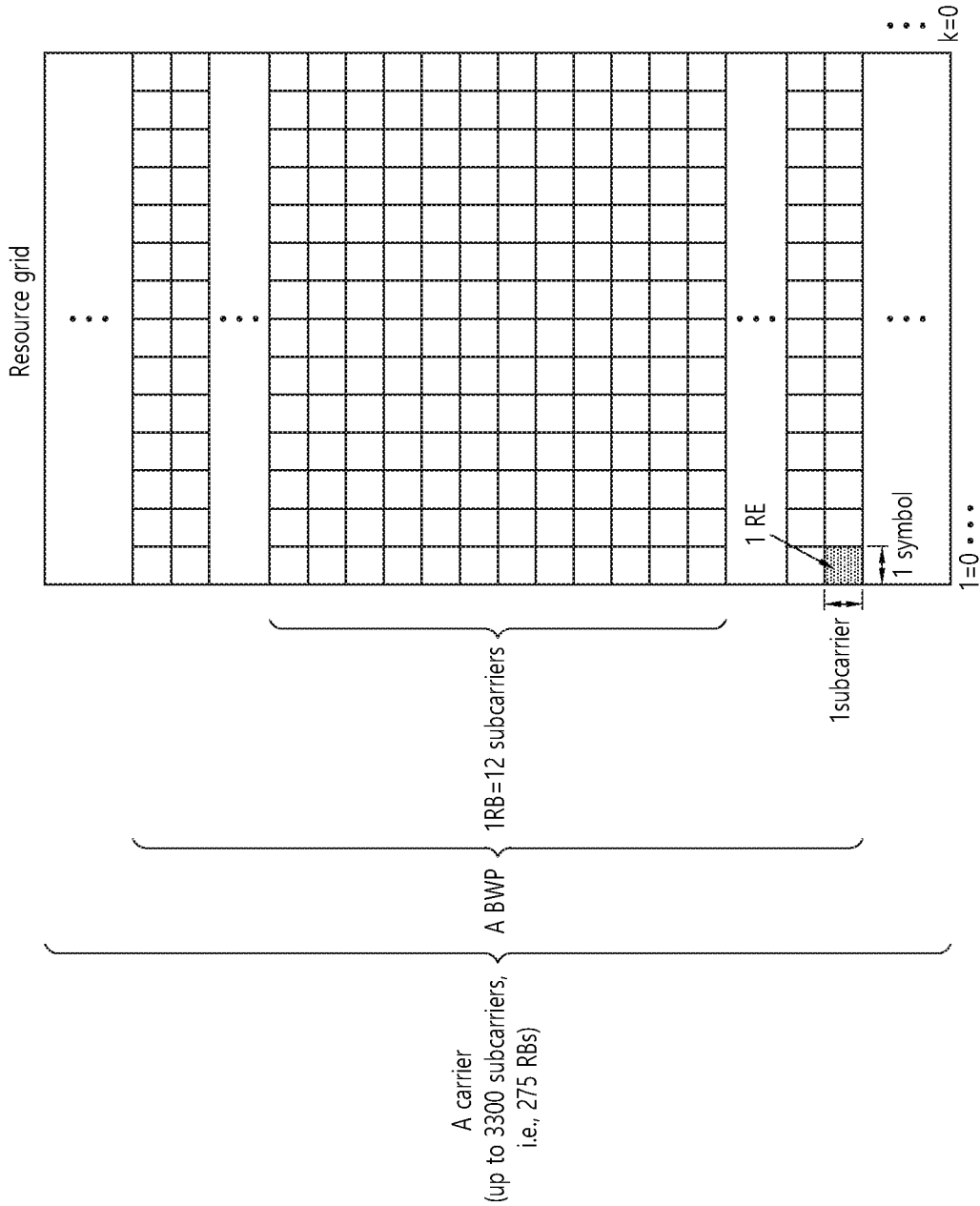
FIG. 16 illustrates a slot structure of a frame used in the next-generation communication.

FIG. 16 illustrates a slot structure of a frame used in the next-generation communication.

A slot includes a plurality of symbols in the time domain. For example, in the case of normal CP, one slot includes 14 symbols; in the case of extended CP, one slot may include 12 symbols. Or in the case of normal CP, one slot may include 7 symbols; in the case of extended CP, one slot may include 6 symbols. Configuration of a slot may be set differently according to the standard specification.

A carrier component includes a plurality of subcarriers in the frequency domain. A resource block (RB) may be defined by a plurality of contiguous subcarriers in the frequency domain. Bandwidth part (BWP) may be defined by a plurality of contiguous (P)RBs in the frequency domain and may correspond to one numerology (for example, SCS and CP length). A carrier component may include up to N (for example, 5) BWPs. Data communication is performed through an activated BWP, and one BWP may be activated for one UE. In the resource grid, each element is referred to as a resource element (RE), and one complex symbol may be mapped to each individual element.

Figure 17:
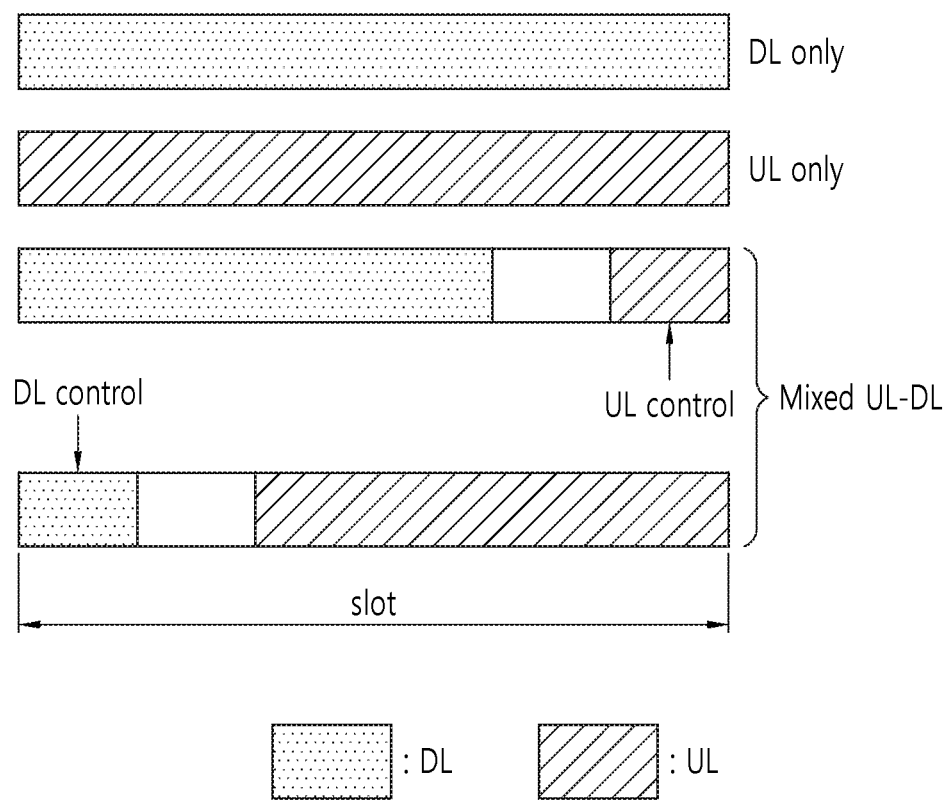
FIG. 17 illustrates a structure of self-contained slot.

FIG. 17 illustrates a structure of self-contained slot.

Referring to FIG. 17, a self-contained structure may be supported, in which one slot includes all of a DL control channel, DL or UL data channel, UL control channel, and so on. For example, the first N symbols in a slot may be used for transmitting a DL control channel (in what follows, DL control region), and the last M symbols in the slot may be used for transmitting an UL control channel (in what follows, UL control region). N and M are each an integer of 0 or larger. A resource region located between the DL and UL control regions (in what follows, a data region) may be used for transmission of DL data or UL data.

As one example, one slot may correspond to one of the following configurations. Each period is listed in the time order.

1. DL only configuration
2. UL only configuration
3. Mixed UL-DL configuration
   DL region+Guard Period (GP)+UL control region
   DL control region+GP+UL region Here, a DL region may correspond to (i) a DL data region or (ii) DL control region plus DL data region while a UL region may correspond to (i) an UL data region or (ii) UL data region plus UL control region.

In the DL control region, a PDCCH may be transmitted, and in the DL data region, a PDSCH may be transmitted. In the UL control region, a PUCCH may be transmitted, and in the UL data region, a PUSCH may be transmitted. In the PDCCH, Downlink Control Information (DCI), for example, DL data scheduling information or UL data scheduling data may be transmitted. In the PUCCH, Uplink Control Information (UCI), for example, ACK/NACK (Positive Acknowledgement/Negative Acknowledgement) information with respect to DL data, Channel State Information (CSI) information, or Scheduling Request (SR) may be transmitted. A GP provides a time gap during a process where a gNB and a UE transition from the transmission mode to the reception mode or a process where the gNB and UE transition from the reception mode to the transmission mode. Part of symbols belonging to the occasion in which the mode is changed from DL to UL within a subframe may be configured as the GP. In what follows, a method for determining (configuring) a resource direction in the Integrated Access and Backhaul (IAB) system will be proposed.

First, abbreviations are defined.
IAB: Integrated Access and Backhaul
CSI-RS: Channel State Information Reference Signal
SFI: Slot Format related Information
CORESET: Control resource set
IAB: Integrated Access & Backhaul
DgNB: Donor gNB
RN: Relay node
D: downlink
U: uplink
F (or X): flexible
AC: Access
BH: Backhaul
DU: Distributed Unit
MT: Mobile terminal
CU: Centralized Unit In what follows, an IAB-node refers to a node capable of supporting wireless access of a UE and transferring access traffic to another node (for example, a gNB, relay, or other UE).

IAB-donor refers to a node that provides a UE with an interface to the core network and provides an IAB-node with a wireless backhaul function.

Technologies mentioned below may be used for various wireless access systems such as CDMA, FDMA, TDMA, OFDMA, and SC-FDMA. CDMA may be implemented by a radio technology such as Universal Terrestrial Radio Access (UTRA) or CDMA2000. TDMA may be implemented by a radio technology such as Global System for Mobile communications (GSM)/General Packet Radio Service (GPRS)/Enhanced Data Rates for GSM Evolution (EDGE). OFDMA may be implemented by a radio technology such as the IEEE 802.11 (Wi-Fi), IEEE 802.16 (WiMAX), IEEE 802-20, and E-UTRA (Evolved UTRA). UTRA is part of Universal Mobile Telecommunications System (UMTS). 3rd Generation Partnership Project (3GPP) Long Term Evolution (LTE) is part of Evolved UMTS (E-UMTS) that uses E-UTRA, and LTE-Advanced (LTE-A)/LTE-A pro is an evolved version of the 3GPP LTE. 3GPP New Radio or New Radio Access Technology (NR) is an evolved version of the 3GPP LTE/LTE-A/LTE-A pro.

To clarify descriptions, the present disclosure is described based on the 3GPP communication system (for example, LTE-A, NR), but the technical principles of the present disclosure are not limited to the specific system. LTE refers to the technology after the 3GPP TS 36.xxx Release 8. More specifically, the LTE technology after the 3GPP TS 36.xxx Release 10 is referred to as the LTE-A, and the LTE technology after the 3GPP TS 36.xxx Release 13 is referred to as the LTE-A pro. The 3GPP NR refers to the technology after the TS 38.xxx Release 15. LTE/NR may be referred to as the 3GPP system. "xxx" denotes a specific number of the standard document. LTE/NR may be collectively called the 3GPP system. The background technology, terminologies, and acronyms used in the description of the present disclosure may reference those specified in the standard documents published prior to the present disclosure.

In what follows, integrated access and backhaul (IAB) will be described.

One of potential technologies that enable cellular network disposition scenarios and applications in the future disposes NR cells flexibly and densely without causing congestion of transfer networks by supporting wireless backhaul and relay links.

NR may use/dispose a massive MIMO or multi-beam system by default, and the bandwidth expected to be used in the NR is larger than that for the LTE. Therefore, an integrated access and backhaul (IAB) link is needed, through which a plurality of control and data channels/procedures defined for providing access to UEs may be constructed.

In the IAB environment, to prevent interference among a plurality of nodes and UEs, collision in the resource direction has to be minimized. For example, suppose a resource allocated by a first UE to transmit an uplink signal to a first node at the same occasion and in the same frequency band is a resource for uplink (U) and a resource allocated by a second UE to receive a downlink signal from a second node is a resource for downlink (D). In this case, an uplink signal that the first UE transmits by using the allocated resource may act as interference on the resource allocated to the second UE.

There may be various factors causing interference in the IAB environment; however, if the resource direction may be at least defined to minimize interference between nodes/UEs, stability and performance of an IAB system will be further ensured.

Figure 18:
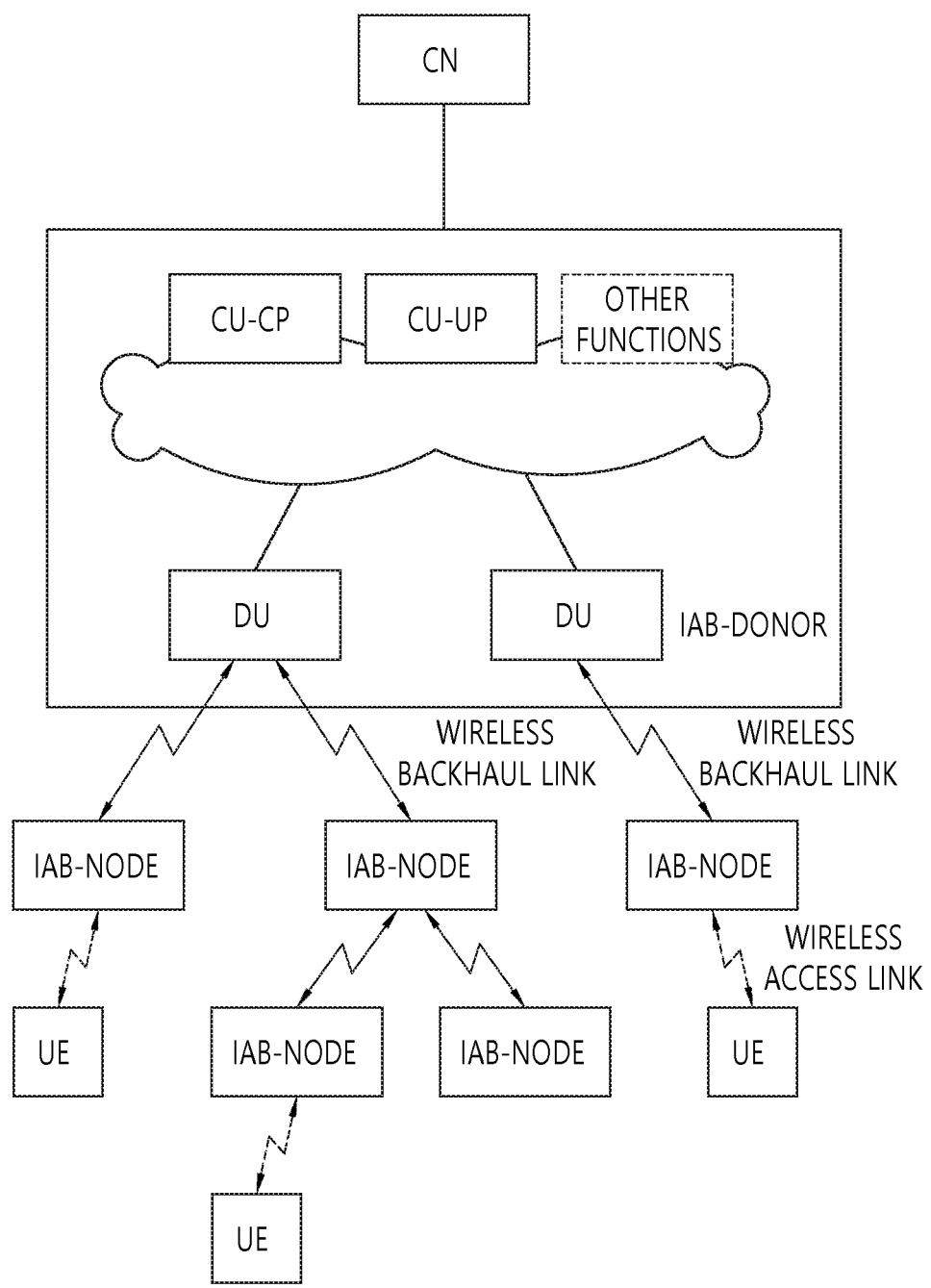
FIG. 18 illustrates one example of a network including integrated access and backhaul (IAB) links.

FIG. 18 shows an example of a network with an integrated access and backhaul (IAB) link.

A wireless link between a UE 191 and a relay node 192 (IAB node) may be referred to as a (wireless) access link, and a wireless link between the relay node 192 and (another relay node or) a base node 193 may be referred to a (wireless) backhaul link. A wireless link between a relay node and another relay node may also be referred to as a backhaul link. At least one base station node or relay node may be connected to a core network (CN) by wire.

The access link and the backhaul link may use the same frequency band or may use different frequency bands.

The IAB node may reuse existing features and interfaces defined for the access link. In particular, not only a corresponding interfaces NRUu (i.e., between MT and gNB), F1, NG, X2 and N4, but also the mobile terminal (MT), gNB-DU, gNB-CU, UPF, AMF and SMF may be used as baseline for the IAB structure. An additional function, such as multihop forwarding, may require some understanding of IAB operation and standardization in a certain aspect.

A mobile termination (MT) function may be defined as a component of mobile equipment. The MT is a function that resides in the IAB node to terminate a wireless interface layer of a backhaul Uu interface toward an IAB-donor or another IAB node.

In FIG. 18, one IAB-donor and multiple IAB nodes are included. The IAB donor may be considered as a single logical node consisting of a series of functions, such as gNB-DU, gNB-CU-CP, gNB-CU-UP, and other potential functions. The IAB-donor may be split according to these functions. These functions may be all deployed or may not partially be deployed.

Meanwhile, operating an NR system in the millimeter wave spectrum may cause severe blocking (short-term blocking effect) that may not be reduced by the current RRC-based handover mechanism. To overcome the blocking effect, a RAN-based mechanism may be needed so that fast switching occurs among relay nodes (or gNB nodes hereinafter the same).

To this purpose, it is necessary to develop an integrated framework that enables fast switching of access and backhaul links. Over-the-Air (OTA) coordination among relay nodes may be regarded as relieving interference and supporting end-to-end path selection and optimization.

IAB for NR has to consider the following requirements and aspects.

1) Efficient and flexible operation for in-band and out-of-band relay in indoor and outdoor scenarios, 2) multi-hop and redundant connections, 3) end-to-end path selection and optimization, 4) support of backhaul links with a high spectrum efficiency, and 5) support for legacy NR UEs.

Figure 19:
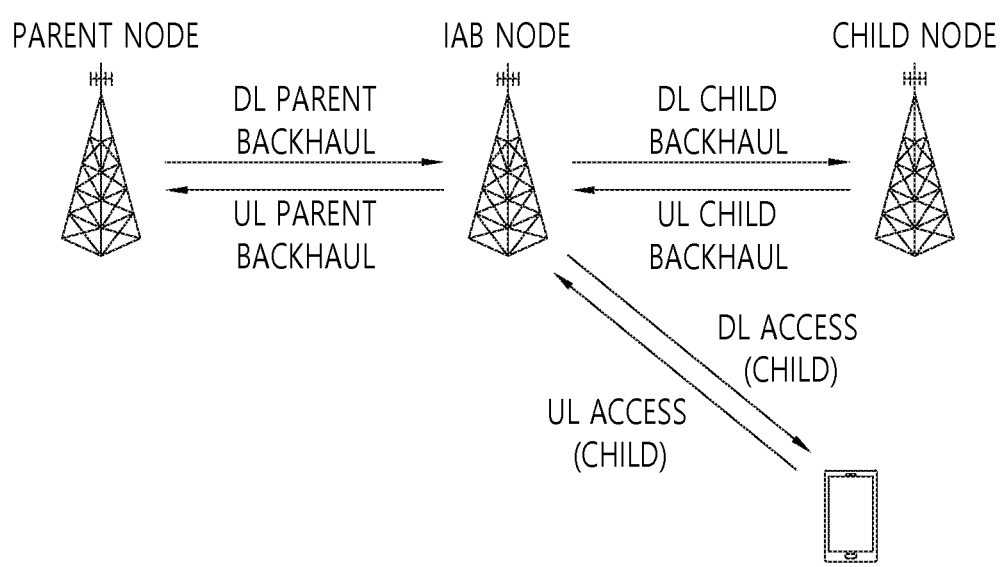
FIG. 19 illustrates a system including a parent node, an IAB node, a child node, and a UE in an IAB environment.

FIG. 19 illustrates a system including a parent node, an IAB node, a child node, and a UE in an IAB environment.

Referring to FIG. 19, a link between the parent node (e.g., a base station) and the IAB node may be referred to as a backhaul link, and more specifically, as a DL parent backhaul link or a UL parent backhaul depending on a transmission direction. A link between the IAB node and the child node may also be referred to as a backhaul link, and more specifically, as a DL child backhaul link or a UL child backhaul link depending on the transmission direction. Here, the child node may be another IAB node, not a UE. A link between the IAB node and the UE may be referred to as an access link, and more specifically, as a DL access link or a UL access link depending on the transmission direction. If the child node is a UE, the link between the IAB node and the child node may also be referred to as an access link.

In the IAB scenario, half-duplex may be supported. In the IAB scenario, full-duplex may also be supported.

In a functional term, the IAB node may also be referred to as a relay node (RN). If each relay node (RN) is not capable of scheduling, the base station (DgNB) should schedule all links between the base station, relevant relay nodes, and relevant UEs. In other words, the base station may collect traffic information from all relevant relay nodes, determine scheduling for all the links, and then inform each relay node of the scheduling information.

The base station may receive not only a scheduling request for UE 1 but also scheduling requests for UE2 and UE3. Thereafter, the base station may determine scheduling for the backhaul links and the access links, and inform the scheduling result. The centralized scheduling may include delayed scheduling and latency time issues.

Meanwhile, distributed scheduling may be accomplished if each relay node has scheduling capability, thereby enabling immediate scheduling in response to an uplink scheduling request from the UE, and reflecting the surrounding traffic situation. As a result, the backhaul/access links may be more flexibly utilized.

<Backhaul Link Discovery and Measurement>
IAB Node Initial Access

An IAB node may follow the same initial access procedure including cell search, acquisition of system information, and random access, as done by a UE to establish a connection to a parent IAB node or IAB donor at the initial step. SSB/CSI-RS based RRM measurement may be the starting point for IAB node discovery and measurement.

To prevent configuring a colliding SSB among IAB nodes and implement CSI-RS based IAB node discovery, a discovery procedure for IAB nodes may be considered according to a half-duplex restriction condition and multi-hop topologies. When cell ID used for a given IAB node is considered, the following two cases may be taken into account.

Case 1: The case where an IAB donor and IAB node share the same cell ID.

Case 2: The case where an IAB donor and IAB node maintain separate cell IDs.

Also, a mechanism for multiplexing RACH transmission from a UE and RACH transmission from an IAB node has to be considered.

<Backhaul Link Measurement>

Multi-backhaul links have to be measured for link management and path selection. From the viewpoint of a given IAB node, to support the half-duplex restriction condition, IAB may support for search and measurement of candidate backhaul links (after the initial access) that use resources used by an access UE for cell search and measurement and resources orthogonal to each other in the time domain. Related to the above, the following factors may be further considered.

1) TDM of SSB (which differs according to a hop order or cell ID, for example), 2) SSB muting among IAB nodes, 30 multiplexing of an access UE and SSBs for IAB for a half frame or over half frames, 4) IAB node discovery signal (for example, CSI-RS) TDMed with the Rel-15 SSB transmission, and 6) transmission period for backhaul link detection and measurement, different from the period used by the access UE.

A mechanism for transmission of a reference signal to IAB nodes and coordination of measurement occasions has to be considered. SMTC and CSI-RS structure for supporting RRM measurement of IAB nodes may have to be improved.

<Backhaul Link Management>

An IAB node may support a mechanism for detecting/recovering a backhaul link failure based on the Rel-15 mechanism. Improvement of the RLM RS and IAB-related procedure may be further considered.

<Path Switching or Transmission/Reception Mechanism for Multi-Backhaul Links>

A mechanism (for example, multi-TRP operation and dual connectivity within the frequency) for efficient path switching or transmission and reception may have to be considered simultaneously for multi-backhaul paths.

<Scheduling and Resource Allocation/Coordination>

1. Backhaul and Access Link Scheduling

Downlink IAB node transmission (in other words, backhaul link transmission from an IAB node to a child IAB node and access link transmission from the IAB node to UEs) may be scheduled by the IAB node itself. Uplink IAB transmission (in other words, transmission from an IAB node to a parent IAB node or transmission to an IAB donor) may be scheduled by the parent IAB node or IAB donor.

2. Multiplexing of Access and Backhaul Link

IAB may support TDM, FDM and/or SDM between an access link and backhaul link from the IAB node and may apply the half duplex restriction condition.

An efficient TDM/FDM/SDM multiplexing mechanism of access/backhaul traffic through multi-hop with respect to the half-duplex restriction of an IAB node may have to be considered.

The following factors may be considered for various multiplexing options.

1) A mechanism for orthogonally dividing time slots or frequency resources between access and backhaul link at one or multiple hops, 2) utilization of different DL/UL slot structure for the access and backhaul link, 3) DL and UL power control improvement and timing condition that allow FDM and SDM within the panel of the backhaul and access link, and 4) interference management including mutual interference.

3. Resource Coordination

A mechanism for scheduling coordination across an IAB node/IAB donor and multi-backhaul hops, resource allocation, and route selection may have to be considered. For resources (frequency and time in view of slot/slot format) among IAB nodes, a semi-static configuration method may be supported (at the time scale of the RRC signal). The following aspects may be further considered.

1) Distributed or central coordination mechanism, 2) granularity of signaling resources required (for example, TDD configuration pattern), 3) exchange of L1 and/or L3 measurement values among IAB nodes, 4) exchange (for example, hop order) of topology-related information that affects research on design of the physical layer of the backhaul link, 5) coordination of resources (time and frequency resource in view of slot/slot format) faster than semi-static coordination.

4. IAB Node Synchronization and Timing Alignment

The effect of feasibility of over-the-air (OTA) synchronization and timing misalignment exerted on the IAB performance (for example, the number of hops that may be supported) may have to be considered. A mechanism for timing alignment in the multi-hop NR-IAB network may have to be considered. IAB may support synchronization based on timing advanced (TA) among IAB nodes including multi-backhaul hops. Improvement of the conventional timing alignment mechanism may also be considered.

The following examples for transmission timing alignment among IAB nodes and IAB donors may be considered:

1) Case 1: DL transmission timing alignment across IAB nodes and IAB donors,

2) Case 2: Alignment of DL and UL transmission timing within an IAB node,

3) Case 3: Alignment of DL and UL reception timing within an IAB node,

4) Case 4: The case where transmission is performed according to the Case 2 within the IAB node, and reception is performed according to the Case 3, and 5) Case 5: The case where the Case 1 is applied for access link timing, and the Case 4 is applied for backhaul link timing in a different time slot within the IAB node.

IAB nodes/IAB donors or IAB node may consider alignment at the following levels:

1) Slot level alignment, 2) symbol level alignment, and 3) no alignment.

5. Cross link interference (CLI) measurement and management

The effect of cross link interference (CLI) exerted on the access and backhaul link (including multi-hops) may be considered.

1) CLI Mitigation Technique

A CLI mitigation technique including advanced coordination of a receiver and transmitter may be considered. At this time, priority may have to be determined from the complexity and performance aspects. The CLI mitigation technique needs to be able to manage inter-IAB interference scenarios as follows: i) Case 1: The case where a victim IAB node is in the middle of reception through an MT from the DL, and an interference IAB node is in the middle of transmission through the MT using the UL, ii) Case 2: The case where a victim IAB node is in the middle of reception through its own MT from the DL, and an interference IAB node is in the middle of transmission through a DU using the DL, iii) Case 3: the case where a victim IAB node is in the middle of reception through a DU from the UL, and an interference IAB node is in the middle of transmission through the MT using the UL, and iv) Case 4: The case where a victim IAB node is in the middle of reception through a DU from the UL, and an interference IAB node is in the middle of transmission through the DU using the DL.

When FDM/SDM reception is performed between an access and backhaul links in a given IAB node, the interference experienced at the IAB node may be considered.

2) CLI Measurement Technique

If CLI is to be mitigated in the IAB environment, CLI measurement such as short-term and long-term measurement; and multi-antenna and beamforming has to be considered.

For a backhaul link, 1024 QAM may be supported.

In what follows, based on the descriptions given above, the present disclosure will be described in more detail.

In the present disclosure, access may be a gNB-UE, and backhaul may be a gNB-gNB or gNB-core network. In NR, access and backhaul may use different radio resources/radio channels but may also use the same radio resources and/or radio channels. For example, a radio resource and radio channel used for a first gNB to serve UEs connected through an access link may also be used for a backhaul link between the first gNB and a second gNB.

In the descriptions above, terms such as a gNB and UE are used for the purpose of convenience and may be replaced with another term such as a node. For example, suppose the second eNB controls/schedules a UE connected to the first gNB through an access link via a backhaul link to the first gNB (a link connecting the second gNB via the first gNB to a UE). In this case, the second gNB may be referred to as a parent node or donor node from the viewpoint of the first gNB while the UE may be referred to as a child node. And the first gNB may also be referred to as a relay node or IAB node. Also, from the viewpoint of the second gNB, the first gNB may be called a child node.

Figure 20:
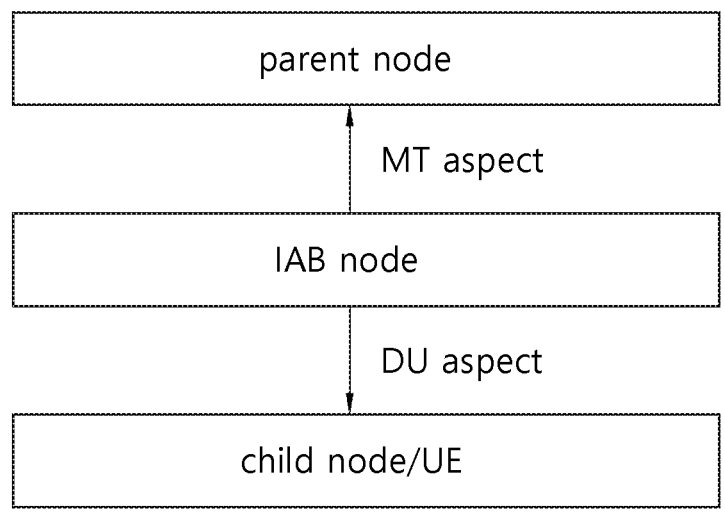
FIG. 20 illustrates nodes in the IAB environment.

FIG. 20 illustrates nodes in the IAB environment.

Referring to FIG. 20, the IAB node may be similar to a UE in the relationship with the parent node, and the parent node may be viewed in a mobile terminal (MT) aspect from the IAB node. In this aspect, communication of the IAB node with the parent node may be an MT operation of the IAB node. When the IAB node is in the MT operation, the IAB node may be referred to as MT.

In addition, the IAB node may be similar to a distributed unit (DU), such as a base station or a relay, in the relationship with the child node, and the child node may be viewed in a distributed unit (DU) aspect from the IAB node. In this aspect, communication of the IAB node with the child node may be a DU operation of the IAB node. When the IAB node is in the DU operation, the IAB node may be referred to as DU.

Meanwhile, in the IAB environment, each node or UE may defined either in common or individually as to a symbol direction. That is, specific units (e.g., the above-described symbols) of radio resources may be defined either in common or individually. Some of the nodes may be relay nodes (relays).

1. Operation Direction Indication

Instead of informing of the symbol format in terms of a link direction such as D, U, or X, the symbol format may be defined to provide a 'direction of operation' of a node or UE receiving the format (for example, transmission or reception).

In other words, the symbol format may be given at least by one of transmission (Tx or denoted by T), reception (Rx or denoted by R), and none (denoted by N), where the corresponding formats may be interpreted as follows.

i) Transmission (Tx or T): It indicates a period in which a node or UE transmits a signal irrespective of a link.

ii) Reception (Rx or R): It indicates a period in which a node or UE receives a signal irrespective of a link.

iii) None (N): It indicates a period in which a node or UE performs no operation.

2. Formats for Access Link and Backhaul Link

In the IAB environment, a new symbol format may be needed to clearly distinguish resources of an access and backhaul links. For example, if symbol formats are denoted by A and B, they may be interpreted as follows:

i) A: symbol that may be used only for an access link, and
ii) B: symbol that may be used only for a backhaul link.

When the slot format is informed to a node or UE, not only D, X, and U but also the A and B may be additionally informed or used.

3. Entry for Access Link and/or Backhaul Link

Instead of defining a separate format, the entry itself of a slot format defined in the standard specification may be defined as an entry that may indicate a resource for an access link or backhaul link.

For example, Table 3 above illustrates formats having an index ranging from 0 to 255, where the formats with an index from 56 to 255 are in the 'reserved' state. In Table 3, each slot format may be termed as an entry. If the entry 253 of the standard specification (for example, Table 3) is informed to a node/UE as one of slot formats, the node/UE may recognize the entry as a slot format indicating availability only for a backhaul link. Similarly, if the entry 254 of the standard specification (for example, Table 3) is informed as one of slot formats, the node/UE may recognize the entry as a slot format indicating availability only for an access link. It should be noted that the entry number may have a different number from the example above. The main point of the present disclosure is that an entry indicating a resource (for example, slot) for a dedicated use of a backhaul and access links may be specified in the standard specification.

4. Search Space for Access Link and/or Backhaul Link

Information about a slot format (slot format information) may be relayed from an upper node (which may be called a parent node or simply a parent) to a lower node (which may be called a child node or simply a child). Or the slot format information may be relayed from each to UEs connected to the corresponding node. A search space to which the slot format information is transmitted may be configured; the following options may be considered as a method for configuring the search space:

i) Option 1: Individual search spaces for a control channel that relay the slot format information in an access and backhaul links may be disposed so that they are not overlapped with each other. This way of disposition may also include a case where resources of the CORESET of each link are not overlapped with each other;

ii) Option 2: The monitoring periods of individual search spaces for a control channel that relay the slot format information in an access and backhaul links may be (unconditionally) set to be different from each other;

Option 2-1: When the monitoring period of each search space overlaps and resources thereof also overlap, it may be assumed that only the search space for a backhaul link is monitored; and Option 2-2: When the monitoring period of each search space overlaps and resources thereof also overlap, it may be assumed that only the search space for a backhaul link is monitored.

5. Format Structure

The format structure of normal resources (for example, symbols in a slot) may have D-X-U in time order. The format structure indicates a resource direction of symbol sets in one slot, and D-X-U indicates a structure where a symbol set D (which may include one or more symbols. Hereinafter the same) is first disposed within the slot, then a symbol set X, and then a symbol set U is finally disposed. Since a time period for preparing for uplink transmission and a guard period (GP) are needed for a UE to transmit an upper link, a flexible resource is inevitably required between D and U.

Meanwhile, in the IAB environment, even if the resource direction of a particular child node (IAB node) is 'reception', the resource direction may be a downlink from a parent node while it may be an upper link from a UE.

Figure 21:
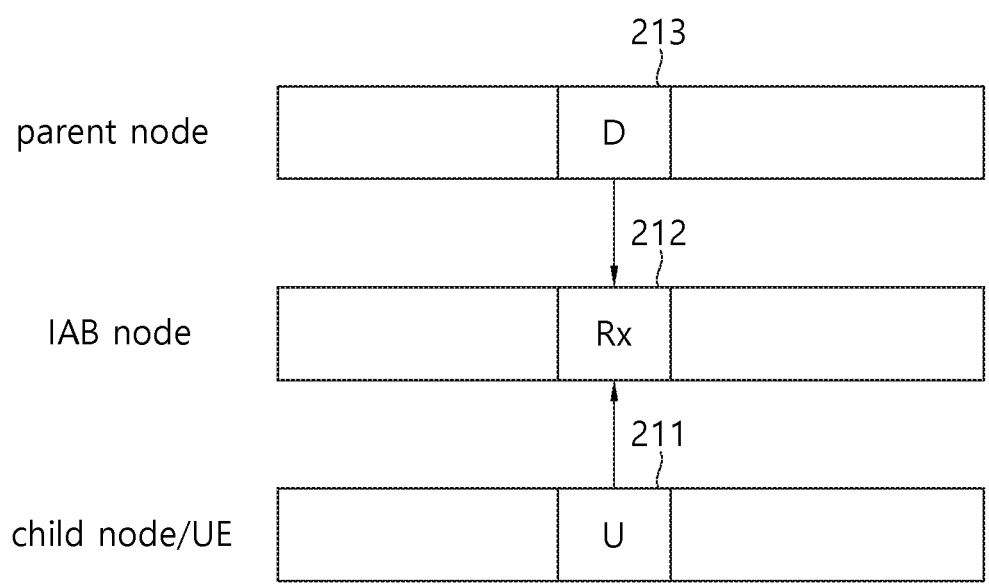
FIG. 21 illustrates a resource direction of an IAB node and resource directions of a parent node and a UE in the IAB environment.

FIG. 21 is a diagram showing a resource direction of the IAB node, and a resource direction of each of the parent node and the UE with respect to the IAB node.

Referring to FIG. 21, with respect to the resource 212 of the IAB node whose direction is set as 'receive (Rx)', the resource 213 of the parent node corresponding to that of the IAB node may be set as a downlink (D) resource and the corresponding resource 211 of the UE connected to the IAB node may be set as an uplink (U) resource.

Although the resource should be received when viewed from one node, a direction of the resource (a link direction or a resource direction, hereinafter referred to in the same way) may be different when viewed from another relevant node/UE. When a specific node is informed of the above-described operation direction (e.g., Rx) for a specific resource, the specific node may recognize the operation direction of the specific resource, but both an uplink and a downlink may coexist in the specific resource.

Figure 22:
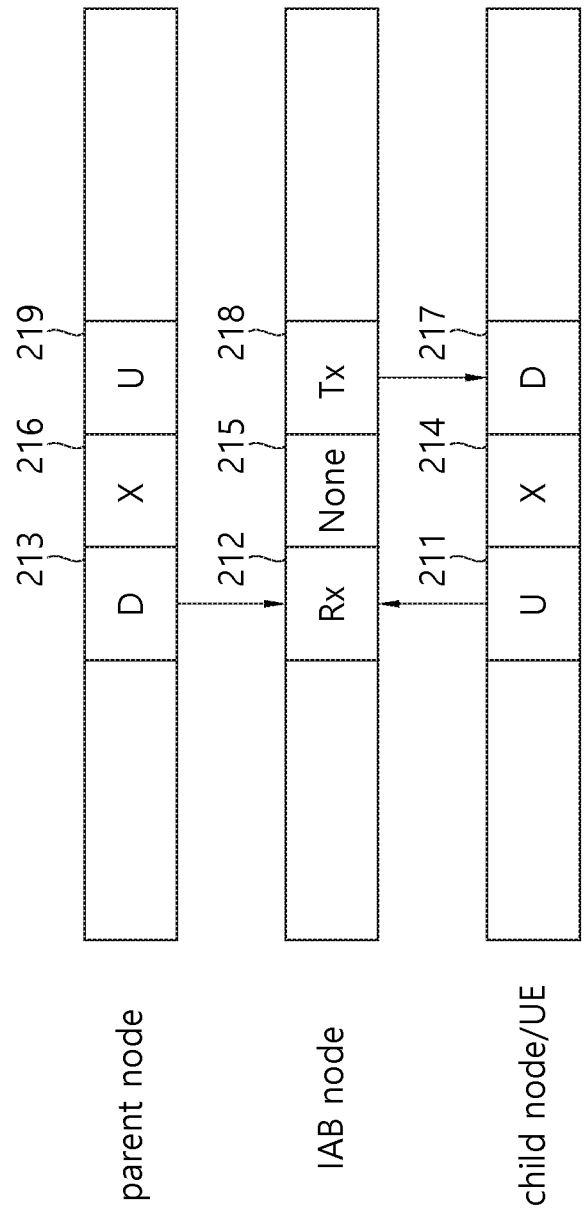
FIG. 22 is another example illustrating a resource direction of an IAB node and resource directions of a parent node and a UE in the IAB environment.

FIG. 22 is a diagram showing another example of a resource direction of the IAB node, and a resource direction of each of the parent node and the UE with respect to the IAB node.

Referring to FIG. 22, assume that the IAB node has been set such that operation directions of resources 212, 215 and 218 are 'Rx'-'None'-'Tx'. At this time, the Rx resource 212 may receive a downlink transmission from the parent node or an uplink transmission from the child node/UE. That is, the resource 212 set as Rx resource when viewed from the IAB node may be a downlink resource 213 when viewed from the parent node and an uplink resource 211 when viewed from the child node/UE. The IAB node may inform the child node or the UE of a resource direction. At this time, the IAB node may inform a format structure for the resources 211, 214 and 217 in the form of 'U'-'X'-'D'. As such, it is required to create a format structure in the form of 'U'-'X'-'D', and the following options may be considered for an additional format structure (i.e., as a format structure for one slot).

i) Option 1: The format structure starts with X, ii) Option 2: The format structure is so formed that X lies between U and D in the form of 'U-D', iii) Option 3: The format structure is so formed that X precedes D, iv) Option 4: The format structure is so formed that X follows U, v) Option 5: The format structure is so formed that X is located before and after the slot format shown in Table 3.

By reflecting at least one of the options, various format structures may be considered as shown in the table below.

TABLE 12

| | |
|---|---|
| U - X - D | X - D - X - U - X - D |
| U - D | X - U - D |
| U - D - X | X - U - D - X |
| D - X - U - D | X - U - X - D |
| D - X - U - D - X | X - U - X - D - X |
| D - X - U - X | U - X - D - X |
| D - X - U - X - D | U - D - X |
| D - X - U - X - U | |
| X - D - X - U | |
| X - D - X - U - D | |
| X - D - X - U - D - X | |

TABLE 12-continued

X - D - X - U - D - X - U
X - D - X - U - D - X - U - X
X - D - X - U - X - D
X - D - X - U - X - D - X

6. Slot Format Indication Method

For example, when dynamic slot format related information (dynamic SFI) is provided, a slot format combination may be informed based on predetermined (for example, defined in the standard specification) slot formats.

In addition to the method above, a slot in the resource direction and the number of symbols may also be informed by using a method for providing dynamic slot format indicator or slot format information (SFI).

In other words, a slot corresponding to D (downlink) and the number of symbols; a slot corresponding to X and the number of symbols; and a slot corresponding to U (uplink) and the number of symbols may be informed. Also, since each direction has priority of order, an order of parameters for each direction may also be defined together.

7. Slot Format Application Timing

If the index of a slot to which information related to the slot format is transmitted from a gNB is denoted by n, a slot format transmission and reception slot of each node and UE may be denoted by slot n+k. In other words, if slot format-related information is received from the slot n, a node or UE may apply the slot format determined based on the information from the slot n+k or n+k+1. Similarly, the slot format may be applied from the slot n+k+a, where a may be determined according to the standard specification or configured by RRC/upper layer signaling.

If a gNB defines and transmits slot formats for all of the child nodes and UEs, since it may take time until information informing of the corresponding slot format is transmitted to reach each node and UE, the procedure above may be needed.

8. Soft Type Time Resource

Directions of a time resource usually include downlink (D), flexible (F), and uplink (U). In the IAB environment, a donor node may perform resource allocation for all of its child nodes (namely, all of the IAB nodes connected to the donor).

One of the resource allocation methods is that the donor node determines all of semi-static D/U of individual IAB nodes and informs the determined directions to the respective IAB nodes. At this time, since it is not easy to predict future data load on each IAB node from the viewpoint of the donor node, the donor node may allocate resources conditionally available for each IAB node while informing of D/F/U. This type of resources may be defined as 'soft' resources. 'Hard' resources may also be defined as a corresponding concept of the soft resources. Hard resources may have hard D/F/U while soft resources may have soft D/F/U. A hard and soft resources may be defined as follows:

i) Hard D/F/U: A resource that may be used without any restriction as a D/F/U resource when each IAB node operates as a DU, and ii) Soft D/F/U: A resource that may be activated by a parent node of an IAB node. If activated, this resource may be used in the same way as a hard resource when the IAB node operates as a DU.

More specific definitions for the hard and soft resources will be described in the corresponding part of the document below.

A soft resource may be allocated by a donor node together with a hard resource.

1) Location of Source Resource

A donor node may dispose a soft resource arbitrarily if no particular rule is applied for disposition of the soft resource. However, since availability of a soft resource is determined according to a current data load and data load in a near future, waste of resource may be reduced from the viewpoint of the IAB node by placing the soft resource at a location appropriate for use. A donor node may dispose a soft resource according to the following rule.

i) Soft D:

Option 1: A soft resource may be disposed between hard D and hard F. Or, Option 2: a soft resource may be disposed between hard D and soft F.

ii) Soft F: Option 1: A soft resource may be disposed between soft D and soft U. Or, Option 2: a soft resource may be disposed within hard F (for example, to be overlapped with hard F).

iii) Soft U: Option 1: A soft resource may be disposed between hard F and hard U. Or, Option 2: a soft resource may be disposed between soft F and hard U.

2) Resource Type Indication

A method for indicating a soft resource to an IAB node may include an indication method through an RRC parameter and a method using a slot format defined in the standard specification.

i) Method for Using RRC Parameter

Semi-static D/U assignment informed to a UE by a gNB includes a cell-specific, semi-static D/U assignment and/or UE-specific, semi-static D/U assignment.

A method for informing of D/U assignment in a cell-specific manner informs of a semi-static period, the number (x1) of D slots starting from the start of the period, the number (x2) of D symbols in the next slot, the number (y1) of U slots starting in a reverse order from the end of the period, and the number (y2) of U symbols in the next slot.

A method for informing of D/U assignment in a UE-specific manner designates a particular slot within a semi-static period and informs of the number of D symbols or U symbols starting from the start of the slot. Since the method for informing of D/U assignment in a UE-specific manner may defines a resource direction for one slot, a plurality of UE-specific indications may be defined to inform of resource directions to a plurality of slots in a UE-specific manner.

By using the method above, a method for defining a soft resource may be considered.

The first option (Opt1) applies the cell-specific method, assumes an order of 'hard D-soft D-F-soft U-hard U' when semi-static D/U assignment is informed, and informs of the number of slots and the number of symbols in the next slot for each resource direction.

At this time, in a slot to which the x2 and y2 have been indicated (informed), there may be some symbols for which directions have not been determined yet, and soft D/U may be defined for those symbols. For example, if x2 and y2 are indicated by a number larger than 0 and soft D/U is configured from the next slot, the corresponding symbols may all be defined as soft D/U.

Like hard D/U, soft D/U may also inform of the number of slots and symbols by using two parameters.

The second option (Opt2) applies the UE-specific method and defines RRC signaling that informs only of soft D/F/U when semi-static D/U assignment is informed. The second option may designate one slot and inform of the number of soft D/F/U symbols (index, number of symbols) within the corresponding slot.

ii) Method for Using Slot Format Table

As shown in Table 3 above, the proposed method may define a slot format in slot units by including not only hard D/F/U but also soft D/F/U, where soft D/F/U is defined as a donor node informs an IAB node of the slot format.

<Activation of Soft Resource>

1. Activation Signaling

If a soft resource is defined by a donor node, a parent node of an IAB node may activate the soft resource according to its own data load and the data load status of a child node. A method for activating a soft resource for this case will be described.

Activation of a Single Soft Resource

Resources designated as soft may be defined in particular units and may be activated according to one soft resource unit. 'One' soft resource set may be regarded as a group of contiguous soft resource symbols. A parent node may determine an index for each soft resource set and by separately informing its child node of a specific index, convert a soft resource set corresponding to the specific index to a resource that may be used when the child node operates as a DU. At this time, a method for separately informing of an index may use a new DCI format or inform of the index by adding a field to an existing DCI format. The SFI index is transmitted in the DCI format 2.0, which may be used to activate a soft resource set.

2) Activation of the Entire Soft Resources

If an activation signal is received, a soft resource may be activated only for one period. Or, a period to be activated may also be signaled.

Similarly, soft resources may be activated for a period of N. At this time, the N may be informed through an activation signal or predefined through separate RRC signaling. A method for separately informing of a period through an activation signal may use a new DCI format or inform of the period by adding a field to an existing DCI format 2. Activation Through Slot Format Indication Signaling A parent node may indicate, to a child node, a slot format that defines a resource direction clearly together with a soft region. A method for indicating a slot format may apply a method that uses the DCI format 2.0.

<Priority Rules for IAB Node>

The IAB node may get both mobile terminal (KT)-aspect downlink/uplink (D/U) allocation and distributed unit (DU)-aspect downlink/uplink (D/U) allocation.

FIG. 23 illustrates resource types included in the MT-aspect D/U allocation and the DU-aspect D/U allocation that the IAB node gets.

Referring to FIG. 23, the MT-aspect D/U allocation includes D (downlink), F (flexible), and U (uplink) as the resource types. The resource denoted by F may be a flexible resource that is usable as D or U. In terms of the MT-aspect D/U allocation, D, U and F based on the MT-aspect D/U allocation may also be expressed hereinbelow as MT-D, MT-U and MT-F, respectively.

For the DU-aspect D/U allocation, hard D/F/U, soft D/F/U, and not-available (NA) types may be indicated as resources types. That is, one of the seven resource types may be indicated for a specific resource.

The hard resource may be a resource that is available always in a direction as indicated for the IAB node and the child node, that is, a DU-child link.

The soft resource may be a resource for the IAB node to be explicitly and/or implicitly controlled by the parent node as to availability for the DU-child link.

For example, the hard downlink (H-D) resource may denote a resource that is always available for the IAB node to transmit a signal to its child node, while the soft downlink (S-D) resource may denote a resource for the IAB node to be controlled by its parent node in transmitting a signal to its child node. It can indicate that the transmission is a resource controlled by its parent node.

The hard uplink (H-U) resource may denote a resource that is always available for the IAB node to receive a signal from the child node, and the soft uplink (S-U) resource may denote a resource for the IAB node to be controlled by the parent node in receiving a signal from the child node.

The hard flexible (H-F) resource may denote a resource that is always flexible in the relationship between the IAB node and the child node, and the soft flexible (S-F) resource may denote a resource that is controlled by the parent node as to whether the resource is flexible in the relationship between the IAB node and the child node.

The not-available (NA) resource may denote a resource that is not available in the relationship between the IAB node and the child node.

Although D/U assignment in terms of an MT and D/U assignment in terms of a DU may be defined by the same numerology and parameters, they may be defined independently from each other. Even if the D/U assignment may be defined dependently or independently, it may be impossible for a donor node allocating resources to allocate resource directions that do not cause interference (that implements zero interference) completely to all of the nodes to which resources are allocated.

Therefore, if collision occurs between the D/U assignment in terms of an MT and the D/U assignment in terms of a DU, it is necessary to define a rule on which assignment an IAB node has to put priority for operation.

In the case of D (MT-D) of D/U assignment in terms of an MT, the following options may be considered.

1) Option 1: Method that does not Count all of Semi-Static Flexible (F) Resources.

This option is related to a case where dynamic SFI is not configured, more specifically, a case where downlink resources are configured through RRC signaling while it is semi-static DL or semi-static flexible (F).

When dynamic SFI is configured, the option describes a case where semi-static DL or semi-static flexible (F) is configured with downlink resources through RRC signaling. At this time, when dynamic SFI is cancelled, the corresponding resources may be regarded as not-available (NA) or may still be regarded as MT-D. And in the case of a resource converted dynamically to D while it is semi-static flexible (F), since the aforementioned conversion may be unnoticed, the resource may not be regarded as MT-D.

2) Option 2: Method that Regards all of the Semi-Static F/D as MT-D

Similar to the above, in the case of MT-U, F resource may include only the resource which has been changed to UL by RRC signaling or the F resource may be regarded as U. Or if the F resource is not informed by RRC signaling, all of the resources may be regarded as DL. Or MT-D and MT-U may be regarded as semi-static D or U, and MT-F (flexible) may be considered. Here, although descriptions are given with respect to the Option 1, the descriptions may also be applied to the Option 2 or to the case where only the semi-static D/U is taken into account.

Hard DU resources may have higher priority than the resources according to D/U assignment in terms of an MT and soft DU resources. In other words, if resources (or soft resources) according to D/U assignment in terms of an MT are configured with different directions from the hard resources, the hard resources may have higher priority, and a node or UE may perform an operation suitable for the directions of the hard resources.

Implicit determination of resources directions of soft resources may be performed as follows.

If a soft resource is not explicitly allocated to a UE by an RRC configuration or dynamic scheduling, the soft resource may be assumed to be used for a DU.

If a soft resource is explicitly allocated to a UE by an RRC configuration or dynamic scheduling, the soft resource may be assumed to be used for a UE.

<Rule 1>

Figure 24:
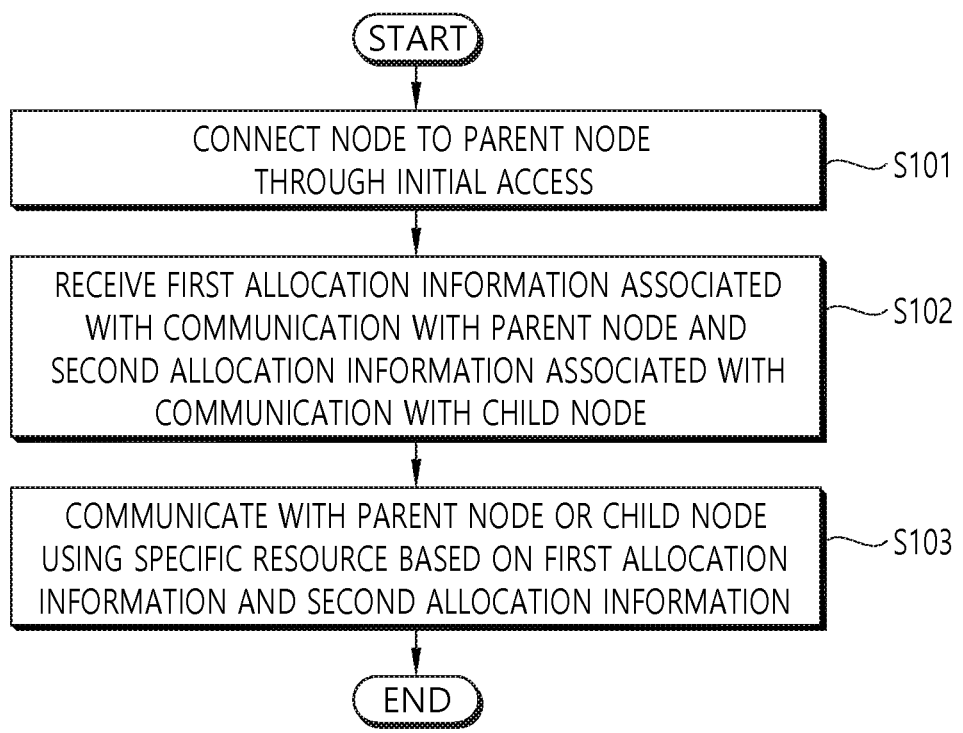
FIG. 24 shows a method of operating a node (IAB node) according to an embodiment of the present disclosure.

FIG. 24 shows a method of operating a node (IAB node) according to an embodiment of the present disclosure. In FIG. 24, a connection state in an IAB environment is assumed, such as parent node—node (IAB node)—child node.

Referring to FIG. 24, the IAB node may be connected to the parent node through an initial access process (S101).

Thereafter, the IAB node (hereinafter abbreviated to "the node") receives first allocation information associated with communication with the parent node and second allocation information associated with communication with the child node (S102). The first allocation information and the second allocation information may be received either separately or through one message. When separately received, the first allocation information may be received through a higher layer signal (a higher layer signal such as an RRC message, an F1 application protocol), and the second allocation information may be received through a physical layer signal (a DCI received through a PDCCH). Alternatively, both the first and second allocation information may be received through higher layer signals or through physical layer signals (DCIs). When the first and second allocation information is received through one message, they may be received through, for example, a higher layer signal such as an RRC message or a DCI that is received through a PDCCH.

The first allocation information may be information (semi-statically/explicitly) indicating resource availability, and the second allocation information may be information (dynamically/explicitly) indicating soft resource availability.

The first allocation information may indicate a specific resource as one of three resource types, and the second allocation information may indicate the specific resource as one of seven resource types. For example, the first allocation information may be the MT-aspect D/U allocation described above, and the second allocation information may be the DU-aspect D/U allocation described above. As described above, the MT-aspect D/U allocation may indicate the specific resource as any one of the D (downlink), F (flexible), and U (uplink) resource types. In addition, the DU-aspect D/U allocation may indicate the specific resource as any one of the seven types of resources including hard D/F/U, soft D/F/U, and not-available (NA) resources. This may also be expressed as follows. That is, in the DU aspect of the IAB node, the child link may have the following types of (time) resources: 1) a downlink time resource, 2) an uplink time resource, 3) a flexible time resource, 4) a not-available time resource, 5) a hard time resource that is always available for the DU-child link, and 6) a soft time resource that is explicitly and/or implicitly controlled by the parent node as to availability for the DU-child link. The node may receive the first allocation information and the second allocation information from the parent node (donor node).

The hard downlink (hard D) type may indicate that the specific resource is a resource that is always available for the node to transmit a signal to the child node and the soft downlink (soft D) type may indicate that the specific resource is a resource for the node to be controlled by the parent node in transmitting a signal to the child node. When the second allocation information indicates the specific resource as the hard downlink type, although the first allocation information indicates the specific resource as a downlink resource or an uplink resource, the specific resource may be used to transmit a signal to the chide node.

The hard uplink (hard U) type may indicate that the specific resource is a resource that is always available for the node to receive a signal from the child node, and the soft uplink (soft U) type may indicate that the specific resource is a resource for the node to be controlled by the parent node in receiving a signal from the child node. When the second allocation information indicates the specific resource as the hard uplink type, although the first allocation information indicates the specific resource as a downlink resource or an uplink resource, the specific resource may be used to receive a signal from the chide node.

The hard flexible (hard F) type may indicate that the specific resource is an always flexible resource in the relationship between the node and the child node, and the soft flexible (soft F) type may indicate that the specific resource is a resource that is controlled by the parent node as to whether or not the specific resource is a flexible resource in the relationship between the node and the child node.

The not-available (NA) type may indicate that the specific resource is a resource that is not available in the relationship between the node and the child node.

When the second allocation information indicates the resource as a soft downlink, soft uplink, or soft flexible resource, if the resource is allocated to the node based on the first allocation information, the resource may be considered as being used for communication with the parent node.

When the second allocation information indicates the resource as a soft downlink, soft uplink, or soft flexible resource, if the resource is not allocated to the node based on the first allocation information, the resource may be considered as being used for communication with the child node.

The node communicates with the parent node or the child node using a specific resource based on the first allocation information and the second allocation information (S103).

At this time, for the specific resource, the resource type indicated by the first allocation information and the resource type indicated by the second allocation information may not be always the same. That is, for the specific resource, the resource type indicated by the first allocation information and the resource type indicated by the second allocation information may be different from or conflict with each other. In this case, it will be an issue how to deal with the difference or conflict According to the present disclosure, for example, when the second allocation information indicates the specific resource as a hard resource that is always available for communication with the child node, the specific resource may be used for the node to communicate with the child node regardless of the first allocation information.

In addition, when the second allocation information indicates the resource as a soft downlink, soft uplink, or soft flexible resource, if the resource is allocated to the node based on the first allocation information, the node may be considered as being used for communication with the parent node.

When the second allocation information indicates the resource as a soft resource (e.g., a soft downlink, soft uplink, or soft flexible resource), if it is not explicitly/implicitly indicated/signaled that the resource is available for communication with the child node (i.e., DU operation), the resource may be used for communication with the parent node (MT operation).

It is allowed to perform the MT operation based on the soft resource not only when there is such an explicit indication but also when there is no explicit indication. Then, the IAB node may have more chances to monitor the PDCCH from the parent node.

If it is not allowed to perform the MT operation based on the soft resource when there is no explicit indication, there will be a problem when the DU configuration of the IAB node includes no NA resource. In this case, the IAB node may not be capable of monitoring the PDCCH and receiving an L1 (physical layer) signal for setting a resource that is available for the DU soft resource, which will cause a problem in communication with the parent node.

When the second allocation information indicates the resource as a soft downlink, soft uplink, or soft flexible resource, if the resource is not explicitly allocated to the node based on the first allocation information, the resource may be considered as being used for communication with the child node.

When the second allocation information indicates the resource as a soft resource (e.g., a soft downlink, soft uplink, or soft flexible resource), if it is not explicitly/implicitly indicated/signaled that the resource is available for communication with the parent node (i.e., MT operation), the resource may be used for communication with the child node (DU operation).

For example, in a TDM operation, the DU-aspect transmission and the MT-aspect transmission of the IAB node may not be performed simultaneously, and the DU-aspect reception and the MT-aspect reception of the IAB node may also not be performed simultaneously. The following table illustrates how the node (IAB node) operates in an situation where the DU-aspect D/U allocation (hereinafter abbreviated to DU configuration for convenience) and the MT-aspect D/U allocation (hereinafter abbreviated to MT configuration for convenience) are given.

TABLE 13

| DU Configuration | MT configuration | | |
|---|---|---|---|
| | DL | UL | F |
| DL-H | DU: Tx<br>MT: NULL | DU: Tx<br>MT: NULL | DU: Tx<br>MT: NULL |
| DL-S | When DU resoruce: IA<br>DU: Tx<br>MT: NULL<br>When DU resource: INA<br>DU: NULL<br>MT: Rx | When DU resource: IA<br>DU: Tx<br>MT: NULL<br>When DU resource: INA<br>If DU: NULL<br>MT: Tx | When DU resource: IA<br>DU: Tx<br>MT: NULL<br>When DU resource: INA<br>If DU: NULL<br>MT: Tx/Rx |
| UL-H | DU: Rx<br>MT: NULL | DU: Rx<br>MT: NULL | DU: Rx<br>MT: NULL |
| UL-S | When DU resource: IA<br>DU: Rx<br>MT: NULL | When DU resource: IA<br>DU: Rx<br>MT: NULL | When DU resource: IA<br>DU: Rx<br>MT: NULL |

TABLE 13-continued

| DU Configuration | MT configuration | | |
|---|---|---|---|
| | DL | UL | F |
| | When DU resource: INA<br>DU: NULL<br>MT: Rx | When DU resource: INA<br>DU: NULL<br>MT: Tx | When DU resource: INA<br>DU: NULL<br>MT: Tx/Rx |
| F-H | DU: Tx/Rx<br>MT: NULL | DU: Tx/Rx<br>MT: NULL | DU: Tx/Rx<br>MT: NULL |
| F-S | When DU resource: IA<br>DU: Tx/Rx<br>MT: NULL<br>When DU resource: INA<br>DU: NULL<br>MT: Rx | When DU resource: IA<br>DU: Tx/Rx<br>MT: NULL<br>When DU resource: INA<br>DU: NULL<br>MT: Tx | When DU resource: IA<br>DU: Tx/Rx<br>MT: NULL<br>When DU resource: INA<br>DU: NULL<br>MT: Tx/Rx |
| NA | DU: NULL<br>MT: Rx | DU: NULL<br>MT: Tx | DU: NULL<br>MT: Tx/Rx |

In the table above, DU may indicate an operation between the IAB node and the child node, and MT may indicate an operation between the IAB node and the parent node.

Specifically, in the table above, "MT: Tx" may mean that the UE (MT, child node) should transmit if scheduled. "DU: Tx" may mean that the IAB node (i.e., DU) may transmit. "MT: Rx" may mean that the UE should be able to receive (if there is anything to receive). "DU: Rx" may mean that the IAB node may schedule uplink transmissions from child nodes or UEs. "MT: Tx/Rx" may mean that the UE (child node) should transmit if scheduled and should be able to receive, but the transmission and the reception are not performed simultaneously. "DU: Tx/Rx" may mean that the IAB node may transmit and may schedule uplink transmissions from child nodes or UEs, but the transmission and the scheduling are not performed simultaneously. "IA" may mean that the IAB node (DU) resource is (explicitly or implicitly) indicated as being available.

"INA" may mean that the IAB node (DU) resource is (explicitly or implicitly) indicated as being not available.

"MT: NULL" may indicate that the UE (child node) does not transmit and does not have to be able to receive. "DU: NULL" may mean that the IAB node (DU) does not transmit and does not schedule uplink transmissions from child nodes and UEs.

The table above may be for an IAB environment where a full duplex operation is not available.

Figure 25:
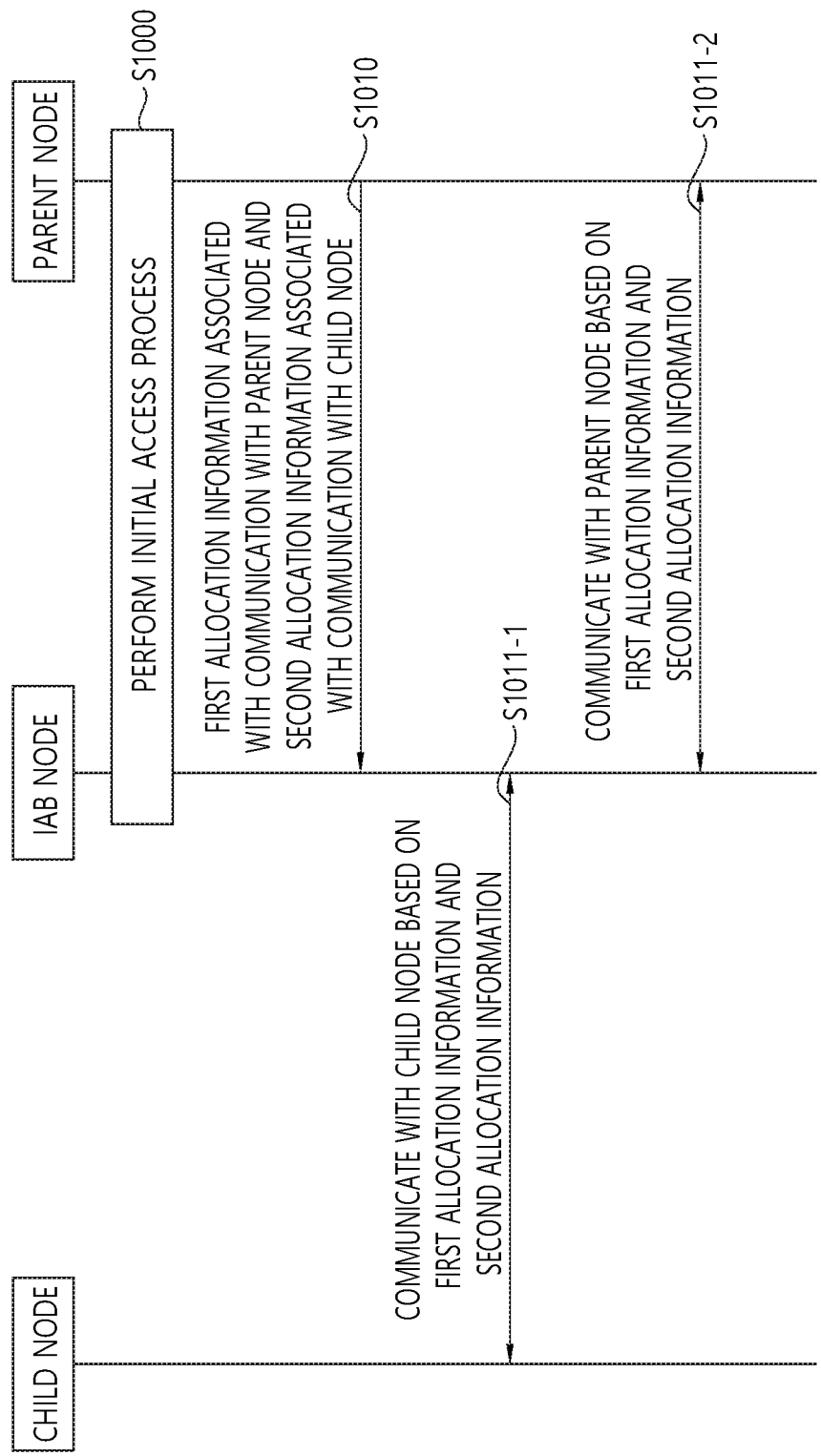
FIG. 25 illustrates a method of operating each node in a wireless communication system including a child node, an IAB node, and a parent node.

FIG. 25 illustrates a method of operating each node in a wireless communication system including a child node, an IAB node, and a parent node.

Referring to FIG. 25, the IAB node is connected to the parent node through an initial access process (S1000). Thereafter, the IAB node receives, from the parent node, first allocation information associated with communication with the parent node and second allocation information associated with communication with the child node (S1010).

Based on the first allocation information and the second allocation information, the IAB node communicates with the child node (S1011-1) or with the parent node (S1011-2).

At this point, as described above with reference to FIG. 24, when the second allocation information indicates a specific resource as a hard resource that is always available for communication with the child node, the specific resource may be used for the node to communicate with the child node regardless of the first allocation information.

In addition, when the second allocation information indicates the resource as a soft downlink, soft uplink, or soft flexible resource, if the resource is allocated to the node based on the first allocation information, the resource may be considered as being used for communication with the parent node.

When the second allocation information indicates the resource as a soft downlink, soft uplink, or soft flexible resource, if the resource is not explicitly allocated to the node based on the first allocation information, the resource may be considered as being used for communication with the child node.

Figure 26:
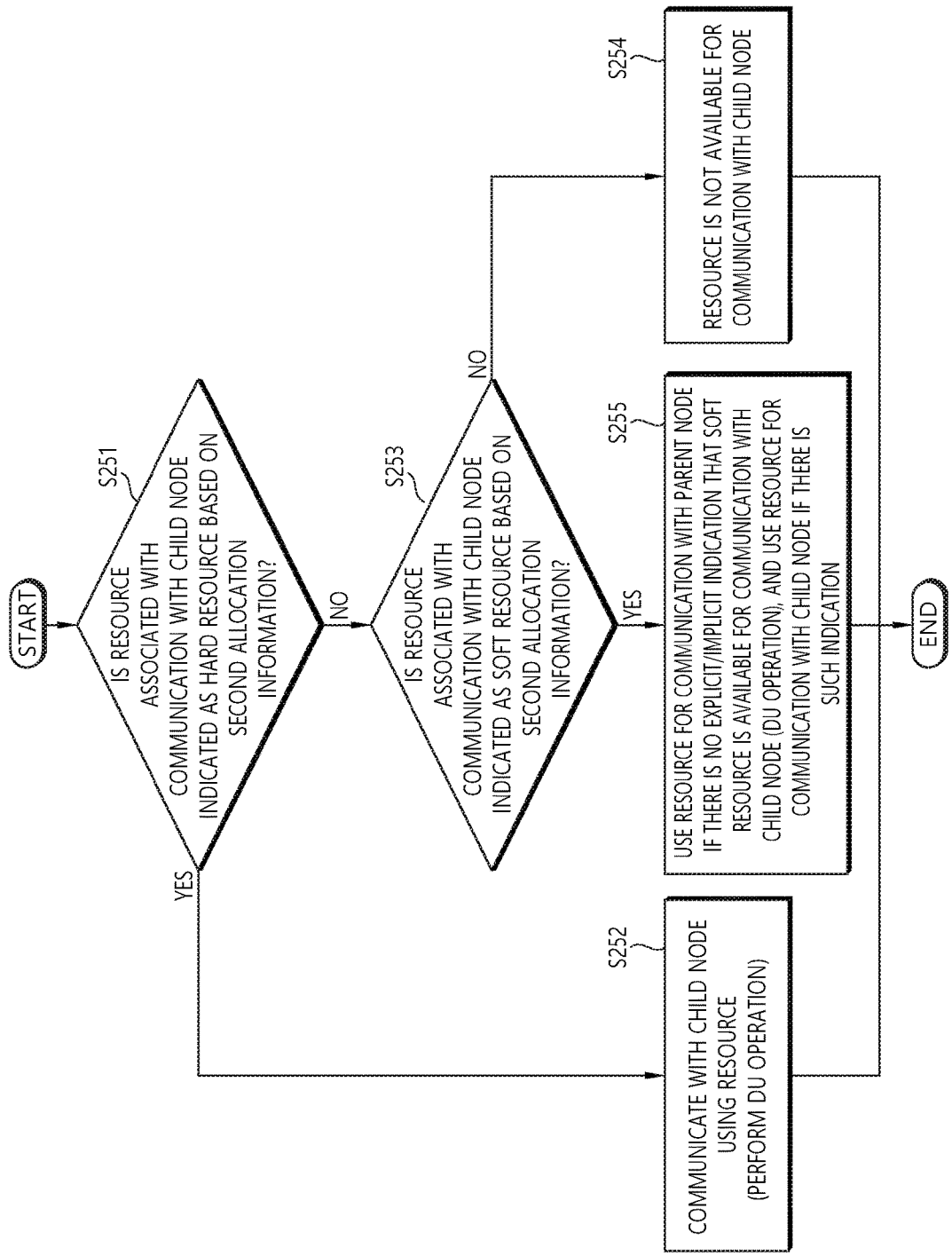
FIG. 26 illustrates a method of using a resource associated with communication with the child node.

FIG. 26 illustrates a method of using a resource associated with communication with the child node.

Referring to FIG. 26, the IAB node determines whether or not the resource associated with communication with the child node is indicated as a hard resource based on resource allocation information (e.g., the second allocation information described above) (S251). The resource allocation information (i.e., DU-aspect D/U allocation) may indicate the resource as any one of the seven types of resources including hard D/F/U, soft D/F/U, and not-available (NA) resources. This may also be expressed as follows. That is, in the DU aspect of the IAB node, the child link may have the following types of (time) resources: 1) a downlink time resource, 2) an uplink time resource, 3) a flexible time resource, 4) a not-available time resource, 5) a hard time resource that is always available for the DU-child link, and 6) a soft time resource that is explicitly and/or implicitly controlled by the parent node as to availability for the DU-child link.

If the resource is indicated as a hard resource, the resource may be used for communication with the child node (i.e., DU operation) (S252).

If the resource is not indicated as a hard resource, it is determined whether the resource is indicated as a soft resource (S253).

If the resource is not indicated as a soft resource, the resource is indicated as a not-available (NA) resource, and the IAB node may not be able to use the resource for communication with the child node (S254).

When the resource is indicated as a soft resource, the resource may be used for communication with the parent node (MT operation) if there is no explicit/implicit indication that the soft resource is available for communication with the child node (DU operation), and the resource may be used for communication with the child node if there is such an explicit/implicit indication (S255).

The same IAB node may be referred to as DU when performing a DU operation, that is, communication with the child node, and may be referred to as MT when performing an MT operation, that is, communication with the parent node. If a certain resource is set as being 'not-available (NA)', it cannot be assumed that the DU uses the resource. In connection with hard DU resources, it can be assumed that the DU may use the hard DU resources regardless of the MT configuration.

In connection with soft DU resources, if the soft DU resource is indicated as being available, it can be assumed that the DU may use the soft DU resource. If the soft resource is not indicated as being available, it cannot be assumed that the DU may use the soft resource. The use of the soft resource may include transmission/reception of specific signals and channels (e.g., PDSCH/PUSCH) in the DU.

For the availability of the soft resource, both implicit indication and explicit indication may be supported. When it is implicitly indicated that the soft DU resource is available, the IAB node is aware that the DU resource may be used, without affecting the transmitting/receiving capability of MT, according to configuration and scheduling based on indirect means. The means may be, for example, 1) lack of uplink scheduling grant in MT, 2) no data available for MT transmission, 3) preset MT search space, 4) preset RS measurement time (e.g., SSB/CSI-RS).

Meanwhile, it may be explicitly indicated that the resource is available, based on DCI indication. At this point, the following options may be considered: 1) SFI-like indication through DCI format 2_0, 2) using two SFI indications (e.g., based on a multi-slot scheduling mechanism), 3) defining and using a new DCI format, and the like.

In summary, the DU operation may be performed if the DU resource is explicitly set as a hard resource, and the MT operation may be performed if the DU resource is set as a non-available resource.

When the DU resource is explicitly set as a soft resource, the DU operation may be performed if the DU resource is explicitly set as an IA resource, and the MT operation may be performed if the DU resource is set as an INA resource.

When the DU resource is explicitly set as a soft resource and is not explicitly set as an IA/INA resource, if the MT operation is required, then the MT operation may be performed. Otherwise, the DU operation may be performed.

In what follows, when collision occurs on the resource type with respect to the same resource by D/U assignment in terms of an MT (first assignment information) and D/U assignment in terms of a DU (second assignment information), in which way the collision is dealt with will be described with reference to more specific examples.

1. The Case of Collision with MT-D

DU-hard D: It may be operated with priority on the DU-hard D. In other words, an MT-D resource may be regarded as unavailable in terms of an MT.

DU-soft D: It may be operated with priority on the MT-D. In other words, a DU-soft D resource may be regarded as unavailable.

DU-hard D: It may be operated with priority on DU-hard U. In other words, an MT-D resource may be regarded as MT-D/DU-U when IAB supports FDM/SDM, otherwise the corresponding resource (MT-D) may be regarded as unavailable.

DU-soft U: It may be operated with priority on MT-D. In other words, an MT-D resource may be regarded as MT-D/DU-U when IAB supports FDM/SDM, otherwise the corresponding resource (DU-soft U) may be regarded as unavailable.

DU-hard F: Since the corresponding resource is flexible at an IAB node, if IAB supports FDM/SDM, it may be configured as MT-D/DU-U according to MT-D, otherwise it is configured as a DU resource, and MT may be assumed to be unavailable.

DU-soft F: The corresponding resource has priority on the MT-D, and if IAB supports FDM/SDM, it may be configured as MT-D/DU-U according to MT-D, otherwise it is configured as an MT resource, and DU may be assumed to be unavailable.

DU-unavailable: The corresponding case may assume an MT function of the MT-D. Since a DU does not use the corresponding resource, the MT function may be performed without priority, which may be applied for those resources corresponding to DU-unavailable. A similar method may also be applied to MT-U.

2. The Case of Collision with MT-U

DU-hard D: It may be operated with priority on DU-hard D.

DU-soft D: It may be operated with priority on MU-U.

DU-hard U: It may be operated with priority on DU-hard U.

DU-soft U: It may be operated with priority on MU-U.

Meanwhile, although D/U assignments may simply collide with each other, they may collide with a CORESET, CSI-RS, grant free resources, and semi-static resource configuration such as PDSCH, PUCCH, and PUSCH configured by an upper layer.

1) The case of collision with MT downlink configuration (for example, CORESET, CSI-RS, and PDSCH configured by an upper layer) in an MT-F DU-hard D: It may be operated with priority on DU-hard D.

DU-soft D: It may be operated with priority on MT-downlink configuration.

DU-hard U: It may be operated with priority on DU-hard U.

DU-soft U: It may be operated with priority on MT-downlink configuration.

2) The case of collision with MT uplink configuration (for example, grant free resource and PUCCH and PUSCH configured by an upper layer) in an MT-F DU-hard D: It may be operated with priority on DU-hard D.

DU-soft D: It may be operated with priority on MT-U.

DU-hard U: It may be operated with priority on DU-hard U.

DU-soft U: It may be operated with priority on MT-uplink configuration.

<Rule 2>

When MT-D collides with DU-hard D/U, and DU-soft D/U, it may be operated so that priority is always set on the MT-D. In other words, it may be regarded as MT-D for operation.

When MT-U collides with DU-hard D/U, and DU-soft D/U, it may be operated so that priority is always set on the MT-U. In other words, it may be regarded as MT-U for operation.

When MT downlink configuration within MT-F (for example, CORESET, CSI-RS, and PDSCH configured by an upper layer) collides with DU-hard D/U and DU-soft D/U, the option 1 always operates with priority on the MT-downlink configuration, and the option 2 always operates with priority on the DU assignment.

When MT uplink configuration within MT-F (for example, grant free resource and PUCCH and PUSCH configured by an upper layer) collides with DU-hard D/U and DU-soft D/U, the option 1 always operates with priority on the MT-uplink configuration, and the option 2 always operates with priority on the DU assignment.

<Rule 3>

When MT D/U collides with DU hard F, the option 1 operates as an MT since availability of DU hard F is not clear. In other words, priority is given to MT D/U. The option 2 ignores D/U of the MT but operates as a DU since the DU may use DU hard F for scheduling.

When MT D/U collides with DU soft F, it may be operated as an MT.

When MT D/U collides with a DU not-available resource, it may be operated as an MT.

<Rule 4>

Between an MT and a node (DU), 1) Option 1: since a connection to a parent node always has higher priority, MT operation may always have priority over DU operation. 2) Option 2: since a connection to a child node always has higher priority for service maintenance, the DU operation may always have priority over the MT operation.

<Rule 5>

Between an MT and a DU soft resource, Option 1: since a soft resource may be considered to be an unavailable resource when DU soft is maintained, MT operation may have priority. Option 2: since it is not known when a parent node activates a soft resource and it may be the case that an activation signal has actually arrived but has been missed, the soft resource may not perform MT operation.

Between an MT and a DU hard resource, Option 1: since a connection to a parent node always has higher priority, MT operation may always have priority over DU operation. Or, Option 2: since a connection to a child node always has higher priority for service maintenance, the DU operation may always have priority over the MT operation.

<Rule 6>

Between MT resource configuration within MT F and a DU soft resource, Option 1: since a connection to a parent node always has higher priority, it may always be operated according to the MT resource configuration. Or, Option 2: since a connection to a child node always has higher priority for service maintenance, the DU operation may always have priority over the MT operation.

Between MT resource configuration and a DU F resource, Option 1: since a connection to a parent node always has higher priority, it may always be operated according to the MT resource configuration. Or, Option 2: since a connection to a child node always has higher priority for service maintenance and scheduling may be performed on the DU F, the MT resource configuration may be ignored.

<Priority Rule for Child Node of DU>

Since it is a soft resource in view of a DU, it is important whether a DU may configure the corresponding resource with the rule. Also, although a DU has a soft resource configuration, it is equally important whether an MT may also check the soft resource configuration.

A soft resource may not be used immediately by a DU but may be regarded as an available resource. Also, since resource configuration itself may be set irrespective of whether the corresponding resource is actually available, it may not be assumed that no configuration is available for a soft resource period. In other words, a DU may configure a semi-static resource such as a CORESET, CSI-RS, grant free resource, and PDSCH, PUCCH, and PUSCH configured by an upper layer separately from a soft resource (or a donor node may provide the configuration on behalf of the corresponding DU), position of the configuration resource may be overlapped with the soft resource.

If a child node (or UE) of the DU knows the D/F/U resource structure to be used by the DU (including soft and NA (not-available)) and also has received the corresponding configuration, operations that may be taken are as follows:

1) A child node (or UE) of a DU may perform the configuration corresponding to the downlink directly for the case of soft D. 2) In the presence of a configuration corresponding to the uplink for the case of soft U, a child node (or UE) of the DU may prepare for transmission of the corresponding uplink. At this time, during the preparation, if there is no indication such as hard D before the transmission (a transmission period taking into account TA), the corresponding uplink is not transmitted but may be transmitted if an indication such as the hard D is given or the corresponding uplink is scheduled.

3) A child node (or UE) of a DU may directly perform the 'configuration corresponding to the downlink' existing in soft F and in the presence of the 'configuration corresponding to the uplink', may prepare for transmission of the corresponding uplink. At this time, during the preparation, if there is no indication such as hard D before the transmission (a transmission period taking into account TA), the corresponding uplink is not transmitted but may be transmitted if an indication such as the hard D is given or the corresponding uplink is scheduled.

<Not-Available Resource>

A not-available resource may be defined as a resource unavailable for a DU when an IAB node operates to perform the role of the DU. Different from a soft resource, a not-available resource may be defined as a resource that may not be used at all even if the DU receives additional signaling. This definition may be made by a donor node and transmitted, where an IAB node may utilize the remaining resources arbitrarily except for the corresponding resource. If there exists a soft resource and the soft resource is activated by its parent node, the soft resource may be used.

1. Location of not-Available Resource

An IAB node may perform both roles of an MT and DU; and D/U assignment in terms of an MT may be different from D/U assignment in terms of a DU. However, it is not necessary to inform of a resource unavailable in terms of the DU through the D/U assignment in terms of the MT. This is so because in the MT operation, it suffices to operate as scheduled by a parent node. Defining a not-available resource in terms of the DU within a resource for which whether an MT operation may be performed or not is unclear may minimize ambiguity in both of the MT and DU operations. In other words, a not-available resource for a DU may be defined by a donor node within a flexible resource in terms of an MT.

Figure 27:
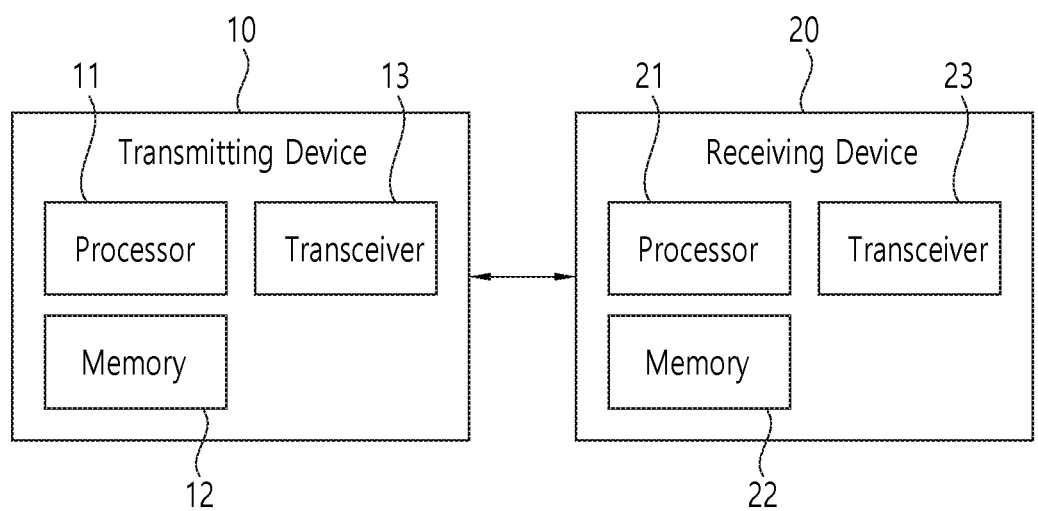
FIG. 27 is a block diagram showing components of a transmitting device 10 and a receiving device 20 for implementing the present disclosure.

FIG. 27 is a block diagram showing components of a transmitting device 10 and a receiving device 20 for implementing the present disclosure. Here, the transmitting device and the receiving device may be a base station and a terminal.

The transmitting device 10 and the receiving device 20 may respectively include transceivers 13 and 23 capable of transmitting or receiving radio frequency (RF) signals carrying information, data, signals and messages, memories 12 and 22 for storing various types of information regarding communication in a wireless communication system, and processors 11 and 21 connected to components such as the transceivers 13 and 23 and the memories 12 and 22 and configured to control the memories 12 and 22 and/or the transceivers 13 and 23 such that the corresponding devices perform at least one of embodiments of the present disclosure.

The memories 12 and 22 can store programs for processing and control of the processors 11 and 21 and temporarily store input/output information. The memories 12 and 22 may be used as buffers.

The processors 11 and 21 generally control overall operations of various modules in the transmitting device and the receiving device. Particularly, the processors 11 and 21 can execute various control functions for implementing the present disclosure. The processors 11 and 21 may be referred to as controllers, microcontrollers, microprocessors, microcomputers, etc. The processors 11 and 21 can be realized by hardware, firmware, software or a combination thereof When the present disclosure is realized using hardware, the processors 11 and 21 may include ASICs (application specific integrated circuits), DSPs (digital signal processors), DSPDs (digital signal processing devices), PLDs (programmable logic devices), FPGAs (field programmable gate arrays) or the like configured to implement the present disclosure. When the present disclosure is realized using firmware or software, the firmware or software may be configured to include modules, procedures or functions for performing functions or operations of the present disclosure, and the firmware or software configured to implement the present disclosure may be included in the processors 11 and 21 or stored in the memories 12 and 22 and executed by the processors 11 and 21.

A processor 11 or 12 control a wireless device to: connect the wireless device to a parent node through an initial access process; receive, from the parent node, first allocation information related with communication with the parent node and second allocation information related with communication with the child node; and communicate with the parent node or the child node using a specific resource based on the first allocation information and the second allocation information. When the second allocation information indicates the specific resource as a hard resource that is always available for communication with the child node, the specific resource may be used to communicate with the child node regardless of the first allocation information.

The processor 11 of the transmitting device 10 can perform predetermined coding and modulation on a signal and/or data to be transmitted to the outside and then transmit the signal and/or data to the transceiver 13. For example, the processor 11 can perform demultiplexing, channel coding, scrambling and modulation on a data string to be transmitted to generate a codeword. The codeword can include information equivalent to a transport block which is a data block provided by an MAC layer. One transport block (TB) can be coded into one codeword. Each codeword can be transmitted to the receiving device through one or more layers. The transceiver 13 may include an oscillator for frequency up-conversion. The transceiver 13 may include one or multiple transmission antennas.

The signal processing procedure of the receiving device 20 may be reverse to the signal processing procedure of the transmitting device 10. The transceiver 23 of the receiving device 20 can receive RF signals transmitted from the transmitting device 10 under the control of the processor 21. The transceiver 23 may include one or multiple reception antennas. The transceiver 23 can frequency-down-convert signals received through the reception antennas to restore baseband signals. The transceiver 23 may include an oscillator for frequency down conversion. The processor 21 can perform decoding and demodulation on RF signals received through the reception antennas to restore data that is intended to be transmitted by the transmitting device 10.

The transceivers 13 and 23 may include one or multiple antennas. The antennas can transmit signals processed by the transceivers 13 and 23 to the outside or receive RF signals from the outside and deliver the RF signal to the transceivers 13 and 23 under the control of the processors 11 and 21 according to an embodiment of the present disclosure. The antennas may be referred to as antenna ports. Each antenna may correspond to one physical antenna or may be configured by a combination of a plurality of physical antenna elements. A signal transmitted from each antenna cannot be decomposed by the receiving device 20. A reference signal (RS) transmitted corresponding to an antenna defines an antenna from the viewpoint of the receiving device 20 and can allow the receiving device 20 to be able to estimate a channel with respect to the antenna irrespective of whether the channel is a single radio channel from a physical antenna or a composite channel from a plurality of physical antenna elements including the antenna. That is, an antenna can be defined such that a channel carrying a symbol on the antenna can be derived from the channel over which another symbol on the same antenna is transmitted. A transceiver which supports a multi-input multi-output (MIMO) function of transmitting and receiving data using a plurality of antennas may be connected to two or more antennas.

Figure 28:
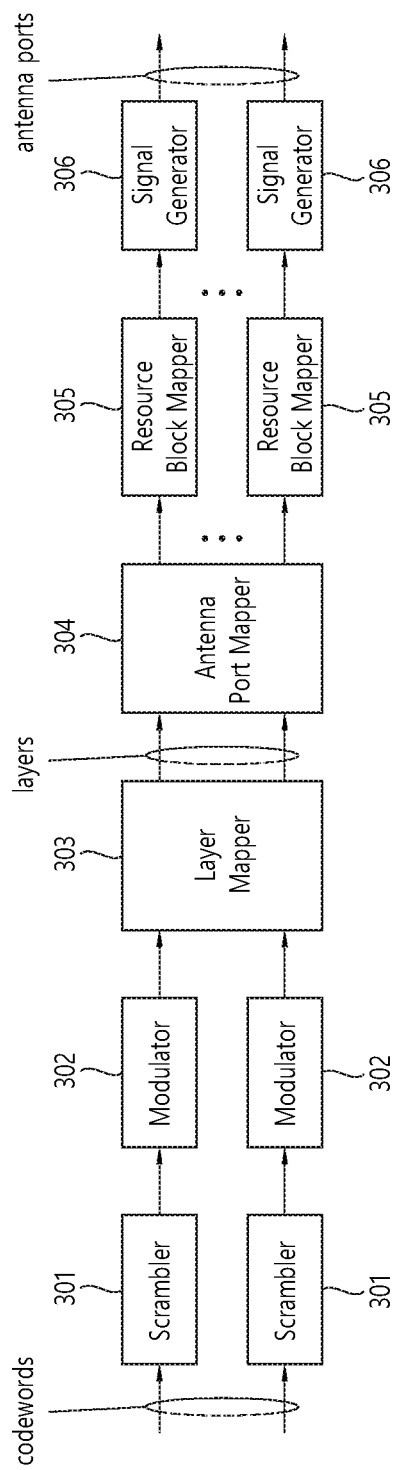
FIG. 28 illustrates an example of a signal processing module structure in the transmitting device 10.

FIG. 28 illustrates an example of a signal processing module structure in the transmitting device 10. Here, signal processing can be performed by a processor of a base station/terminal, such as the processor 11 of FIG. 27.

Referring to FIG. 28, the transmitting device 10 included in a terminal or a base station may include scramblers 301, modulators 302, a layer mapper 303, an antenna port mapper 304, resource block mappers 305 and signal generators 306.

The transmitting device 10 can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Each signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 29:
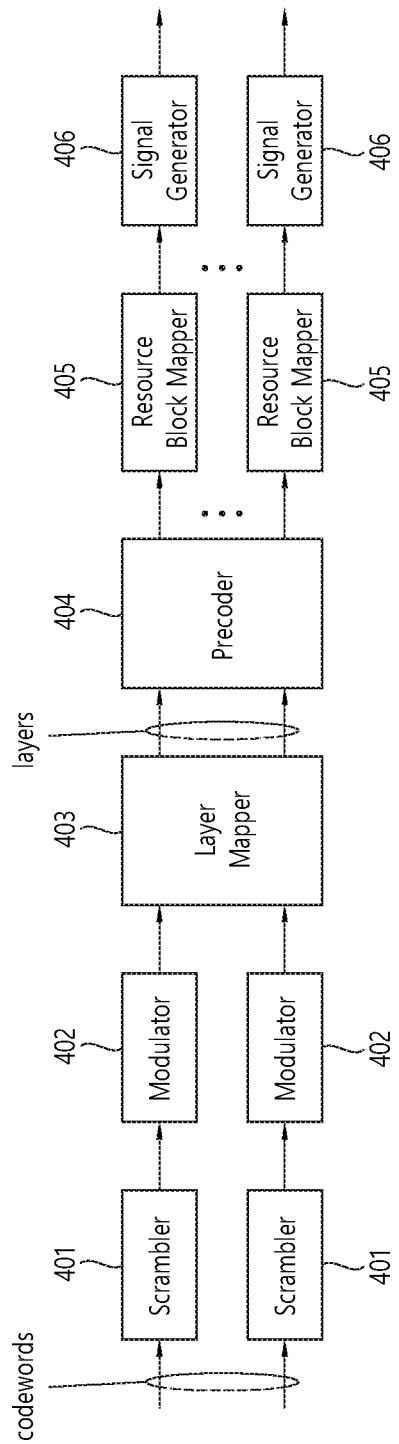
FIG. 29 illustrates another example of the signal processing module structure in the transmitting device 10.

FIG. 29 illustrates another example of the signal processing module structure in the transmitting device 10. Here, signal processing can be performed by a processor of a terminal/base station, such as the processor 11 of FIG. 27.

Referring to FIG. 29, the transmitting device 10 included in a terminal or a base station may include scramblers 401, modulators 402, a layer mapper 403, a precoder 404, resource block mappers 405 and signal generators 406.

The transmitting device 10 can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N×M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Each signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter. The signal processing procedure of the receiving device 20 may be reverse to the signal processing procedure of the transmitting device. Specifically, the processor 21 of the transmitting device 10 decodes and demodulates RF signals received through antenna ports of the transceiver 23. The receiving device 20 may include a plurality of reception antennas, and signals received through the reception antennas are restored to baseband signals, and then multiplexed and demodulated according to MIMO to be restored to a data string intended to be transmitted by the transmitting device 10.

The receiving device 20 may include a signal restoration unit which restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit which removes a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 30:
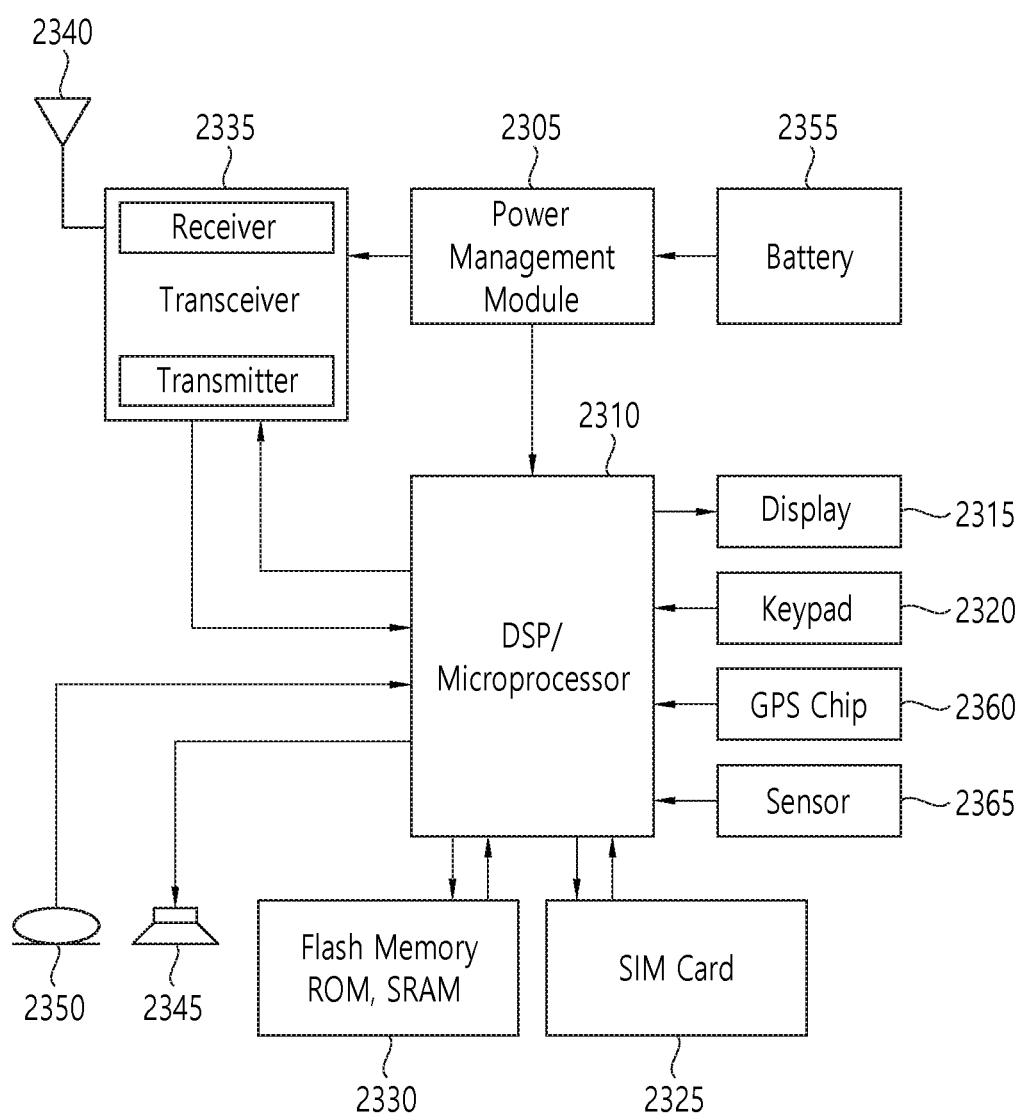
FIG. 30 illustrates an example of a wireless communication device according to an implementation example of the present disclosure.

FIG. 30 illustrates an example of a wireless communication device according to an implementation example of the present disclosure.

Referring to FIG. 30, the wireless communication device, for example, a terminal may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 29 may be the processors 11 and 21 in FIG. 27.

The memory 2330 is connected to the processor 231 and stores information related to operations of the processor. The memory may be located inside or outside the processor and connected to the processor through various techniques such as wired connection and wireless connection. The memory 2330 in FIG. 29 may be the memories 12 and 22 in FIG. 27.

A user can input various types of information such as telephone numbers using various techniques such as pressing buttons of the keypad 2320 or activating sound using the microphone 250. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 30 may be the transceivers 13 and 23 in FIG. 27.

Although not shown in FIG. 30, various components such as a camera and a universal serial bus (USB) port may be additionally included in the terminal. For example, the camera may be connected to the processor 2310.

FIG. 30 is an example of implementation with respect to the terminal and implementation examples of the present disclosure are not limited thereto. The terminal need not essentially include all the components shown in FIG. 30. That is, some of the components, for example, the keypad 2320, the GPS chip 2360, the sensor 2365 and the SIM card 2325 may not be essential components. In this case, they may not be included in the terminal.

A node operation method according to one embodiment of the present disclosure is disclosed.

The IAB node receives first allocation information related to communication with a parent node and second allocation information from the parent node related to communication with a child node S1010.

The IAB node performs communication with the child node S1011-1 and communication with the parent node S1011-2 based on the first and the second allocation information.

At this time, as described earlier with reference to FIG. 25, if the second allocation information indicates a specific resource as a hard resource always available for communication with the child node, the specific resource may be used for communication with the child node irrespective of the first allocation information.

Also, when the second allocation information indicates a resource as soft downlink, soft uplink, or soft flexible, if the resource is allocated to the node according to the first allocation information, the resource may be regarded as being used for communication with the parent node.

Similarly, when the second allocation information indicates a resource as soft downlink, soft uplink, or soft flexible, if the resource is not explicitly allocated to the node according to the first allocation information, the resource may be regarded as being used for communication with the child node.

The above-described methods may be performed by at least one of the devices of FIGS. 27 to 30.

Figure 31:
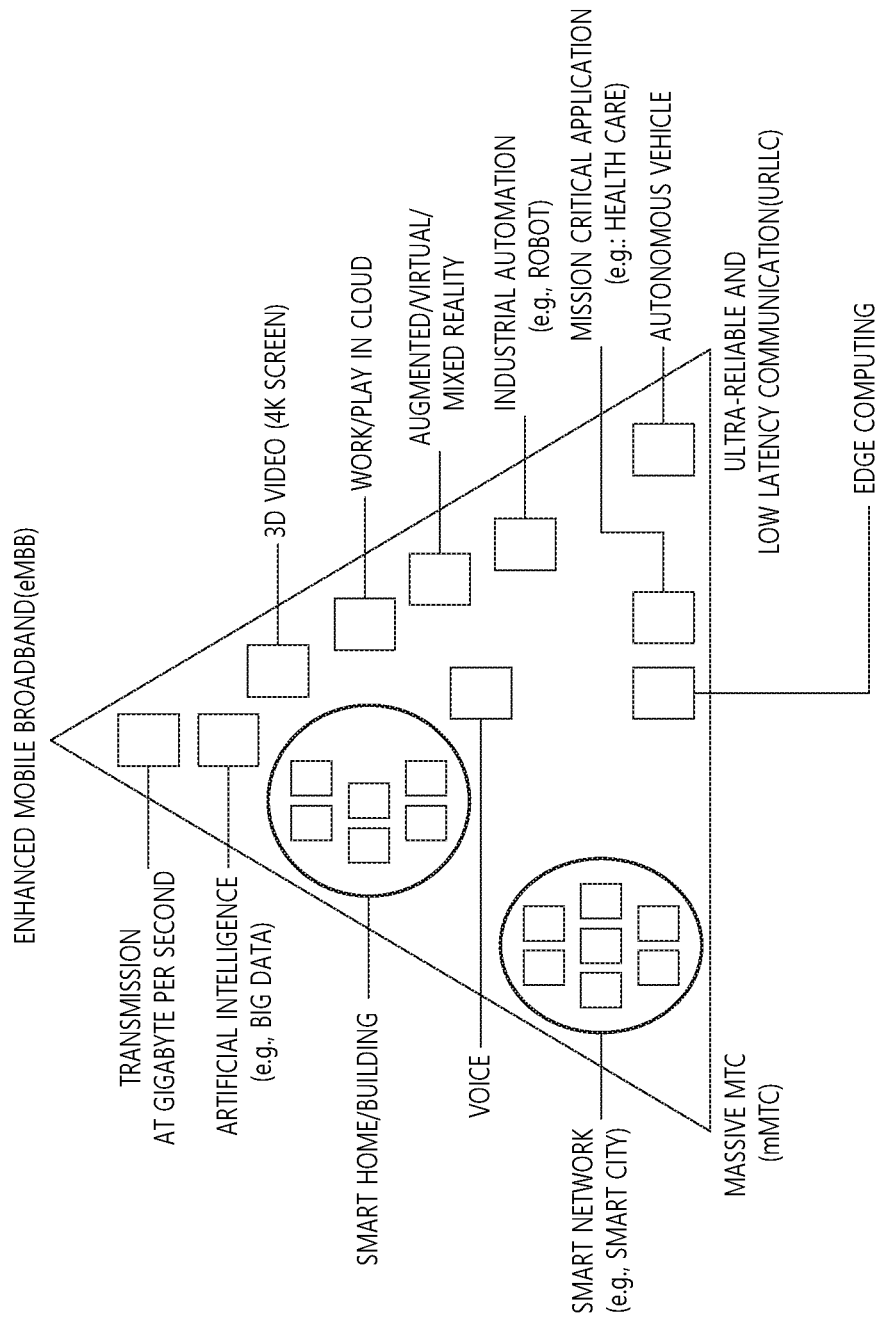
FIG. 31 shows examples of 5G usage scenarios to which the technical features of the present disclosure may be applied.

FIG. 31 shows examples of 5G usage scenarios to which the technical features of the present disclosure may be applied. The 5G usage scenarios illustrated in FIG. 31 are merely exemplary, and the technical features of the present disclosure may also be applied to other 5G usage scenarios that are not illustrated in FIG. 31.

Referring to FIG. 31, three major requirement areas of 5G include: (1) an enhanced mobile broadband (eMBB) area, (2) a massive machine type communication (mMTC) area, and (3) a ultra-reliable and low latency communications (URLLC) area. Some examples of usage may require multiple areas for optimization, while other examples of usage may focus only on one key performance indicator (KPI). The 5G supports these various examples of usage in a flexible and reliable way.

The eMBB focuses generally on improvements in data rate, latency, user density, and capacity and coverage of mobile broadband access. The eMBB aims at a throughput of about 10 Gbps. The eMBB makes it possible to far surpass basic mobile Internet access, and covers full-duplex operations, media in cloud or augmented reality, and entertainment applications. Data is one of the key motives for the 5G, and it will be the 5G era when dedicated voice services may disappear for the first time. In 5G, voice is expected to be processed by an application program simply using data connection provided by a communication system. The main reasons for the increased traffic volume are an increase in content size and an increase in the number of applications requiring high data transmission rates. Streaming services (audio and video), interactive videos, and mobile Internet accesses will become more popular as more devices are connected to the Internet. Many applications need to be activated at all times for connection to provide real-time information and push notifications for users. Cloud storages and applications are growing rapidly in a mobile communication platform, and may be applied to both work and entertainment. The cloud storage is a special usage example leading to a growth in uplink data transmission rate. The 5G is also used for remote tasks in the cloud, and requires much lower end-to-end delays to maintain good user experiences when haptic interfaces are used. In terms of entertainment, for example, cloud gaming and video streaming are other key factors increasing the demand for mobile broadband capability. Entertainment is essential in smartphones and tablets anywhere, including high mobility environments such as trains, cars and airplanes. Other usage examples are augmented reality and information retrieval for entertainment. Here, the augmented reality requires very low latency and instantaneous data rates.

The mMTC, which is designed to enable communication between a large number of low-cost devices powered by batteries, is provided to support smart metering, logistics, fields, and applications such as body sensors. The mMTC aims at about 10-year batteries and/or about one million devices per $km^2$. The mMTC enables smooth connection of embedded sensors in all fields and is expected as one of the most frequent examples of 5G usage. It is potentially predicted that there will be 20.4 billion IoT devices until 2020. Industrial IoT is one of the areas where 5G plays a major role in enabling smart cities, asset tracking, smart utilities, agriculture and security infrastructures.

The URLLC, which enables devices and machines to communicate with high reliability, very low latency, and high availability, are ideal for vehicle communications, industrial control, factory automation, telesurgery, smart grid, and public safety applications. The URLLC aims at a delay of about 1 ms. The URLLC includes new services that will change the industry through ultra-reliable/low-latency links such as remote control of key infrastructures and autonomous vehicles. Levels of reliability and latency are essential for smart grid control, industrial automation, robotics, and drone control and adjustment.

Next, a plurality of usage examples included in the triangle of FIG. 31 will be described in more detail.

The 5G, which is a means of providing streams that are rated as hundreds of megabits per second to a gigabit per second, may complement fiber-to-the-home (FTTH) and cable-based broadband (or data over cable service interface specifications (DOCSIS)). Such a high speed may be required to deliver a TV at a resolution of 4K or higher (6K, 8K and higher) as well as for virtual reality (VR) and augmented reality (AR). VR and AR applications include nearly immersive sporting events. Specific applications may require special network settings. For example, for a VR game, the game company may need to integrate the core server with the edge network server of the network operator to minimize latency.

Automotive vehicles are expected to be a new important motive in terms of 5G, together with many usage examples for mobile communications for vehicles. For example, entertainment for passengers needs both high capacity and high mobile broadband at the same time. This is because future users expect continuous high-quality connections regardless of their locations and speeds. Another usage example in the automatic vehicle field is an augmented reality dashboard. The augmented reality dashboard allows a driver to identify objects in the dark above what the driver are looking at through a front window. The augmented reality dashboard superimposes and displays information to be provided for the driver about the distance and movement of the object. In the future, a wireless module enables communication between vehicles, information exchange between a vehicle and a supporting infrastructure, and information exchange between a vehicle and another connected device (e.g., a device carried by a pedestrian). A safety system provides a guidance to an alternative course of action to help the driver to drive in a safer manner, thereby reducing the risk of an accident. The next step will be a remote controlled vehicle or an autonomous vehicle, which requires very reliable and very fast communication between different autonomous vehicles and/or between a vehicle and an infrastructure. In the future, autonomous vehicles will perform all driving activities, and drivers will focus only on traffic anomalies that the vehicle is not able to identify by itself. The technical requirements for autonomous vehicles are ultra-low latency and ultra-high reliability to increase traffic safety up to a level that cannot be achieved by a person.

Smart cities and smart homes, which are referred to as smart societies, will be embedded into high-density wireless sensor networks. The distributed networks of intelligent sensors will identify the conditions with regard to costs and energy-efficient maintenances of the cities or homes. Similar settings may be made for each home. Temperature sensors, windows, heating controllers, burglar alarms, and appliances are all connected wirelessly. Many of these sensors typically require low data transmission rates, low power consumptions, and low costs. However, for example, real-time HD videos may be required by certain types of devices for surveillance.

The consumption and distribution of energy, including heat or gas, is being highly decentralized, and requires automated control through distributed sensor networks. Smart grids interconnect these sensors using digital information and communication technologies to collect information and serve accordingly. The information may include behaviors of suppliers and consumers, allowing the smart grids to improve efficiency, reliability, economic feasibility, sustainability of production, and distribution of fuel such as electricity in an automated manner. The smart grid may be considered as another sensor network with low latency.

In the health sector, there are many applications that may use the benefits of mobile communications. The communication system may support telemedicine providing clinical care from a faraway place, thereby helping reduce barriers in distance and improving an access to a medical service that is not continuously available in a faraway rural area. The telemedicine is also used to save a life in a critical care situation or in an emergency situation. Wireless sensor networks based on mobile communications may provide remote monitoring and sensors for parameters such as a heart rate and a blood pressure.

Wireless and mobile communications are getting increasingly important in industrial applications. Wiring is expensive to install and maintain. Thus, the possibility of replacement with wireless links, which can reconfigure cables, is an attractive opportunity in various industry fields. To accomplish this, however, it is required that the wireless connection should work with latency, reliability, and capacity similar to the cable connection, and the management thereof should be simplified. Low latency and very low error probability are new requirements, by which 5G-based connection is required.

Logistics and freight tracking is an important usage example for mobile communications that enables the tracking of inventory and packages anywhere using a location-based information system. The usage example for logistics and freight tracking typically requires a low data transmission rate but requires wide-range and reliable location information.

The embodiments of the present disclosure described above may also be applied to the following technology.

<Artificial Intelligence (AI)>

Artificial intelligence refers to a field of studying artificial intelligence or a methodology for creating the same, and machine learning refers to a field of defining various problems dealing in an artificial intelligence field and studying methodologies for solving the same. The machine learning may be defined as an algorithm for improving performance with respect to a certain task through repeated experiences with respect to the task.

An artificial neural network (ANN) is a model used in machine learning, and may refer in general to a model with problem-solving abilities, composed of artificial neurons (nodes) forming a network by a connection of synapses. The artificial neural network may be defined by a connection pattern between neurons on different layers, a learning process for updating model parameters, and an activation function for generating an output value.

The artificial neural network may include an input layer, an output layer, and optionally one or more hidden layers. Each layer includes one or more neurons, and the artificial neural network may include synapses that connect the neurons to one another. In the artificial neural network, each neuron may output a function value of an activation function with respect to the input signals inputted through a synapse, weight, and bias.

A model parameter refers to a parameter determined through learning, and includes weight of synapse connection, bias of a neuron, and the like. Moreover, hyperparameters refer to parameters which should be set before learning in a machine learning algorithm, and include a learning rate, the number of iterations, a mini-batch size, an initialization function, and the like.

The objective of training an artificial neural network is to determine a model parameter for minimizing a loss function. The loss function may be used as an indicator for determining an optimal model parameter in a learning process of an artificial neural network.

The machine learning may be classified into supervised learning, unsupervised learning, and reinforcement learning depending on the learning method.

The supervised learning may refer to a method for training an artificial neural network with training data that has been given a label. In addition, the label may refer to a target answer (or a result value) to be guessed by the artificial neural network when the training data is inputted to the artificial neural network. The unsupervised learning may refer to a method for training an artificial neural network using training data that has not been given a label. The reinforcement learning may refer to a learning method for training an agent defined within an environment to select an action or an action order for maximizing cumulative rewards in each state.

Machine learning implemented by a deep neural network (DNN) including a plurality of hidden layers of the artificial neural network may be referred to as deep learning, and the deep learning is a part of the machine learning. Hereinafter, the meaning of machine learning includes deep learning.

<Robot>

A robot may refer to a machine which automatically handles a given task by its own ability, or which operates autonomously. In particular, a robot that functions to recognize an environment and perform an operation according to its own judgment may be referred to as an intelligent robot.

Robots may be classified into, for example, industrial, medical, household, and military robots, according to the purpose or field of use.

A robot may include an actuator or a driving unit including a motor in order to perform various physical operations, such as moving joints of the robot. Moreover, a movable robot may include, for example, a wheel, a brake, and a propeller in the driving unit thereof, and through the driving unit, may thus be capable of traveling on the ground or flying in the air.

<Self-Driving or Autonomous Driving>

Autonomous driving refers to self-driving technology, and an autonomous vehicle refers to a vehicle that moves without any manipulation by a user or with minimum manipulation by a user.

For example, autonomous driving may include all of a technology for keeping a vehicle within a driving lane, a technology for automatically controlling a speed such as an adaptive cruise control, a technology for automatically driving the vehicle along a determined route, and a technology for, if a destination is set, automatically setting a route and driving the vehicle along the route.

A vehicle includes a vehicle having only an internal combustion engine, a hybrid vehicle having both an internal combustion engine and an electric motor, and an electric vehicle having only an electric motor, and may include not only an automobile but also a train, a motorcycle, or the like.

In this case, an autonomous vehicle may be considered as a robot with an autonomous driving function.

<Extended Reality>

Extended reality collectively refers to virtual reality (VR), augmented reality (AR), and mixed reality (MR). VR technology provides real world objects or backgrounds only in CG images, AR technology provides virtual CG images together with real object images, and MR technology is computer graphic technology for mixing and combining virtual objects with the real world.

The MR technology is similar to the AR technology in that both real and virtual objects are shown together. However, there is a difference in that a virtual object is used to complement a real object in AR technology, whereas a virtual object and a real object are used in an equivalent nature in the MR technology.

XR technology may be applied to a head-mount display (HMD), a head-up display (HUD), a mobile phone, a tablet PC, a laptop, a desktop, a TV, digital signage, etc. A device to which the XR technology is applied may be referred to as an XR device.

What is claimed is:

1. A method of operating a node in a wireless communication system, the method comprising:
   connecting to a parent node through an initial access process;
   receiving, from the parent node, first allocation information related to communication with the parent node and second allocation information related to communication with a child node; and
   communicating with the parent node or the child node using a specific resource based on the first allocation information and the second allocation information,
   wherein the second allocation information informs the specific resource as one of a hard downlink resource, a soft downlink resource, a hard uplink resource, a soft uplink resource, a hard flexible resource, a soft flexible resource, and a not-available resource,
wherein based on the second allocation information informing the specific resource as a hard resource among the hard resource, a soft resource, and the not-available resource: the specific resource is used for communication with the child node regardless of the first allocation information, wherein the hard resource is one of the hard downlink resource, the hard uplink resource, or the hard flexible resource, and
wherein based on the second allocation information informing the specific resource as the hard downlink resource: the specific resource is usable to transmit a signal to the child node regardless of the first allocation information informing the specific resource as a downlink resource or an uplink resource.

2. The method of claim 1, wherein a transmission direction in the specific resource is determined based on both the first allocation information and the second allocation information.

3. The method of claim 1, wherein the first allocation information informs the specific resource as one of three types of resources, and the second allocation information informs the specific resource as one of seven types of resources.

4. The method of claim 1, wherein the first allocation information informs the specific resource as one of a downlink resource, an uplink resource, and a flexible resource.

5. The method of claim 1, wherein the second allocation information informing the specific resource as the hard downlink resource informs that the specific resource is a resource that is always available for the node to transmit a signal to the child node, and
wherein the second allocation information informing the specific resource as the soft downlink resource informs that the specific resource is a resource for the node to be controlled by the parent node in transmitting a signal to the child node.

6. The method of claim 1, wherein the second allocation information informing the specific resource as the hard uplink resource informs that the specific resource is a resource that is always available for the node to receive a signal from the child node, and
wherein the second allocation information informing the specific resource as the soft uplink resource informs that the specific resource is a resource for the node to be controlled by the parent node in receiving a signal from the child node.

7. The method of claim 6, wherein based on the second allocation information informing the specific resource as the hard uplink resource, the specific resource is usable to receive a signal from the child node despite the first allocation information informing the specific resource as a downlink resource or an uplink resource.

8. The method of claim 1, wherein the second allocation information informing the specific resource as the hard flexible resource informs that the specific resource is a resource that is always flexible in a relationship between the node and the child node, and
wherein the second allocation information informing the specific resource as the soft flexible resource informs that the specific resource is a resource that is controlled by the parent node as to whether or not the specific resource is a flexible resource in the relationship between the node and the child node.

9. The method of claim 1, wherein the second allocation information informing the specific resource as the not-available resource informs that the specific resource is a resource that is not available in a relationship between the node and the child node.

10. The method of claim 1, wherein based on the second allocation information informing the specific resource as the soft downlink resource, the soft uplink resource, or the soft flexible resource, and based on the specific resource being allocated to the node based on the first allocation information, the specific resource is considered as being used for communication with the parent node.

11. The method of claim 1, wherein based on the second allocation information informing the specific resource as the soft downlink resource, the soft uplink resource, or the soft flexible resource, and based on the specific resource not being allocated to the node based on the first allocation information, the specific resource is considered as being used for communication with the child node.

12. A node configured to operate in a wireless communication system, the node comprising:
a transceiver transmitting and receiving a wireless signal; and
a processor coupled to the transceiver,
wherein the processor is configured to control the node to perform operations comprising:
connecting to a parent node through an initial access process,
receiving, from the parent node, first allocation information related to communication with the parent node and second allocation information related to communication with a child node, and
communicating with the parent node or the child node using a specific resource based on the first allocation information and the second allocation information,
wherein the second allocation information informs the specific resource as one of a hard downlink resource, a soft downlink resource, a hard uplink resource, a soft uplink resource, a hard flexible resource, a soft flexible resource, and a not-available resource,
wherein based on the second allocation information informing the specific resource as a hard resource among the hard resource, a soft resource, and the not-available resource: the specific resource is used for communication with the child node regardless of the first allocation information, wherein the hard resource is one of the hard downlink resource, the hard uplink resource, or the hard flexible resource, and
wherein based on the second allocation information informing the specific resource as the hard downlink resource: the specific resource is usable to transmit a signal to the child node regardless of the first allocation information informing the specific resource as a downlink resource or an uplink resource.

13. A processor, configured to control a wireless device to operate in a wireless communication system and perform operations comprising:
connecting to a parent node through an initial access process;
receiving, from the parent node, first allocation information related to communication with the parent node and second allocation information related to communication with a child node; and
communicating with the parent node or the child node using a specific resource based on the first allocation information and the second allocation information,
wherein the second allocation information informs the specific resource as one of a hard downlink resource, a soft downlink resource, a hard uplink resource, a soft uplink resource, a hard flexible resource, a soft flexible resource, and a not-available resource, wherein based on the second allocation information informing the specific resource as a hard resource among the hard resource, a soft resource, and the not-available resource: the specific resource is used for communication with the child node regardless of the first allocation information, wherein the hard resource is one of the hard downlink resource, the hard uplink resource, or the hard flexible resource, and wherein based on the second allocation information informing the specific resource as the hard downlink resource: the specific resource is usable to transmit a signal to the child node regardless of the first allocation information informing the specific resource as a downlink resource or an uplink resource.

\* \* \* \* \*